(12) United States Patent
Osborne

(10) Patent No.: US 10,847,992 B2
(45) Date of Patent: Nov. 24, 2020

(54) APPARATUS FOR A SOLAR PATHWAY LIGHT

(71) Applicant: Gary Osborne, Indianapolis, IN (US)

(72) Inventor: Gary Osborne, Indianapolis, IN (US)

( * ) Notice: Subject to any disclaimer, the term of this patent is extended or adjusted under 35 U.S.C. 154(b) by 632 days.

(21) Appl. No.: 15/601,751

(22) Filed: May 22, 2017

(65) Prior Publication Data

US 2018/0337552 A1 Nov. 22, 2018

(51) Int. Cl.
| | |
|---|---|
| *H02S 40/38* | (2014.01) |
| *H02J 7/35* | (2006.01) |
| *F21S 9/03* | (2006.01) |
| *F21V 21/08* | (2006.01) |
| *F21S 8/08* | (2006.01) |
| *F21V 23/04* | (2006.01) |
| *H02J 7/00* | (2006.01) |
| *H05B 47/11* | (2020.01) |
| *F21Y 115/10* | (2016.01) |
| *F21W 111/023* | (2006.01) |
| *F21W 131/107* | (2006.01) |
| *F21W 111/027* | (2006.01) |

(52) U.S. Cl.
CPC ............... *H02J 7/35* (2013.01); *F21S 8/081* (2013.01); *F21S 8/083* (2013.01); *F21S 9/03* (2013.01); *F21V 21/0824* (2013.01); *F21V 23/0464* (2013.01); *H02J 7/0029* (2013.01); *H02J 7/0031* (2013.01); *H02J 7/0068* (2013.01); *H02S 40/38* (2014.12); *H05B 47/11* (2020.01); *F21W 2111/023* (2013.01); *F21W 2111/027* (2013.01); *F21W 2131/107* (2013.01); *F21Y 2115/10* (2016.08); *H02J 7/0072* (2013.01); *H02J 7/00302* (2020.01)

(58) Field of Classification Search
CPC .............. H02J 7/35; H02S 40/38; F21S 8/081
See application file for complete search history.

(56) References Cited

U.S. PATENT DOCUMENTS

| | | |
|---|---|---|
| 6,452,086 B1 | 9/2002 | Muller |
| 6,563,269 B2 | 5/2003 | Robinett et al. |
| 8,348,453 B2 | 1/2013 | Cumberland et al. |

(Continued)

OTHER PUBLICATIONS

Admin, "Diode Power Loss Calculation", Analog Circuit Design Basics, Aug. 27, 2016, pp. 1-5, Power Electronics A to Z, Diode-Power-Loss.pdf, published by Revathy Parirajan, http://www.completepowerelectronics.com/diode-power-loss-calculation/.

*Primary Examiner* — Charlie Y Peng

(57) ABSTRACT

An apparatus includes a light emitting diode for at least illuminating a pathway. A rechargeable storage device provides a discharge current to the light emitting diode. A solar panel supplies a charging current to the rechargeable storage device during exposure of scattered light of at most 900 foot-candles. The ratio of the charging current to the discharge current is greater than 0.5. A safety device protects the rechargeable storage device from substantial overcharging during exposure of direct sunlight. A recharging switch supplies the charging current to the rechargeable storage device during a charging mode. A discharging switch supplies the discharge current to the light emitting diode during an illumination mode. A low light sensor effects a switching between the charging mode and the illumination mode.

20 Claims, 16 Drawing Sheets

(56) References Cited

U.S. PATENT DOCUMENTS

| | | | | |
|---|---|---|---|---|
| 2005/0174776 A1* | 8/2005 | Althaus | .................. | F21V 33/00 |
| | | | | 362/276 |
| 2008/0169784 A1* | 7/2008 | Chung | ..................... | H02J 7/35 |
| | | | | 320/101 |
| 2009/0056698 A1* | 3/2009 | Johnson | ................ | H01L 31/052 |
| | | | | 126/569 |
| 2010/0213761 A1* | 8/2010 | McDonald | ................ | G05F 1/67 |
| | | | | 307/18 |
| 2011/0018448 A1* | 1/2011 | Metchear, III | .......... | F21S 9/035 |
| | | | | 315/152 |
| 2014/0352761 A1 | 12/2014 | Linderman et al. | | |

\* cited by examiner

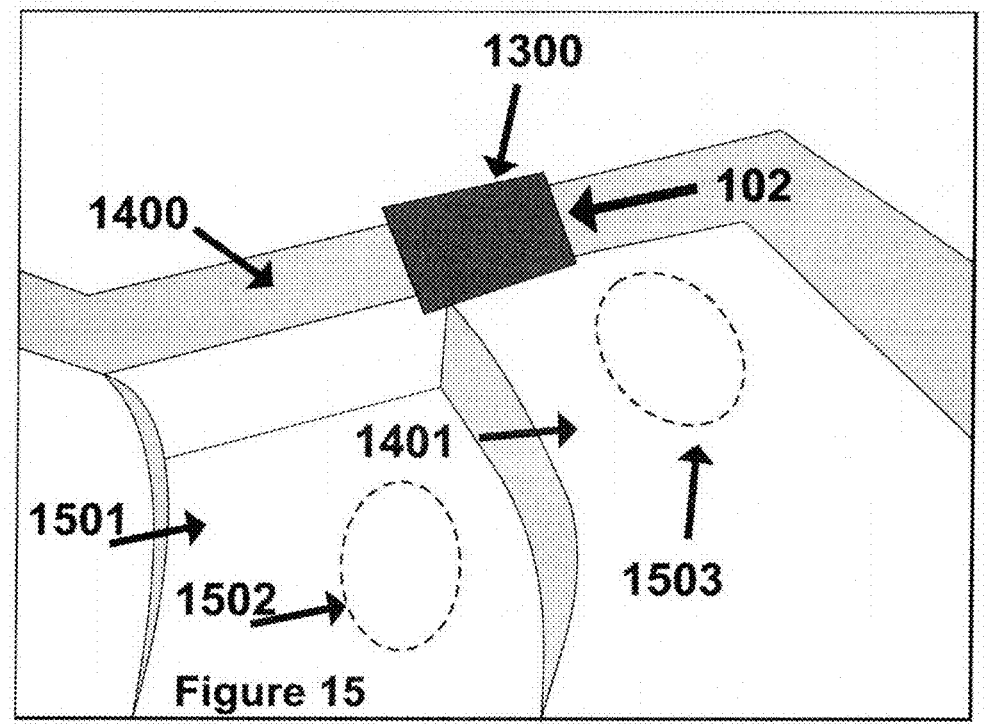
Figure 15
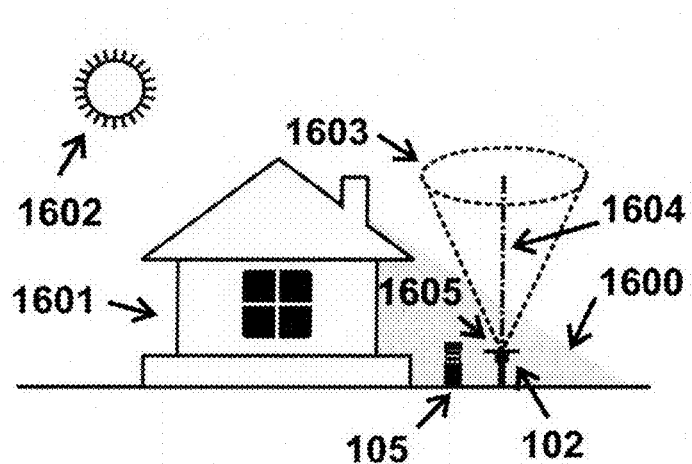
Figure 16 - Category 1 Shade

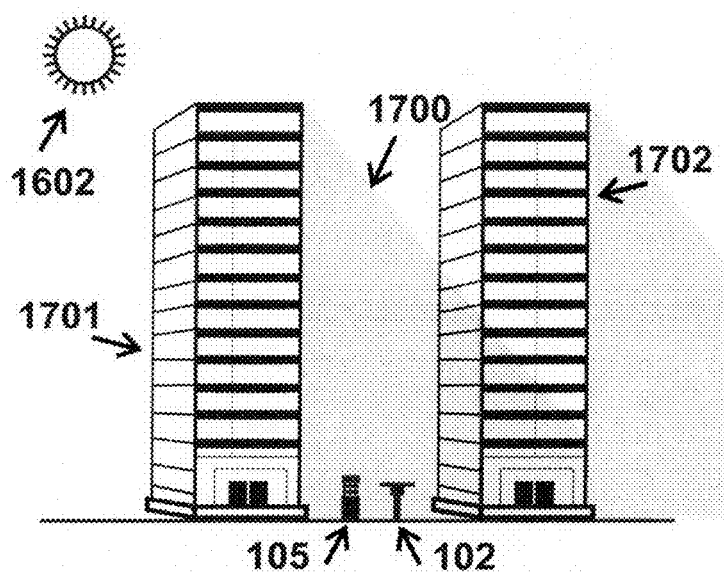
Figure 17 - Category 1 Shade
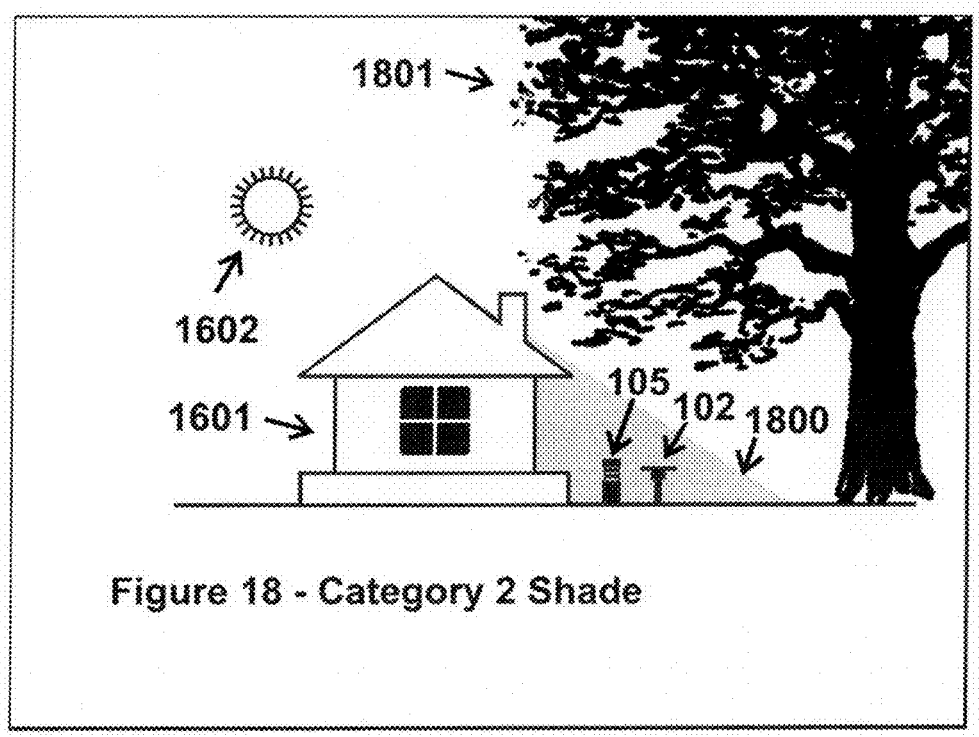
Figure 18 - Category 2 Shade

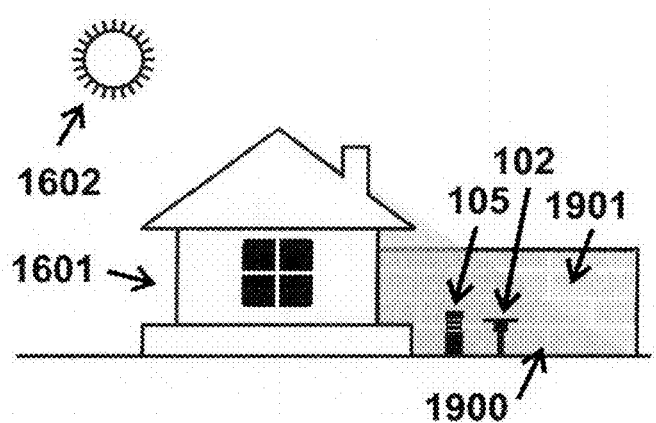
Figure 19 - Category 2 Shade
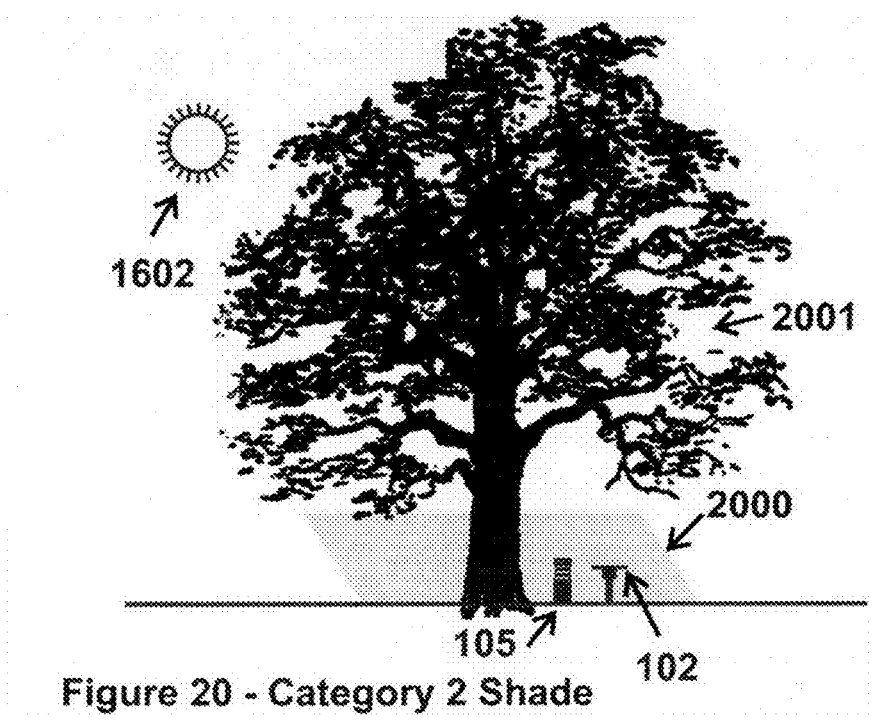
Figure 20 - Category 2 Shade

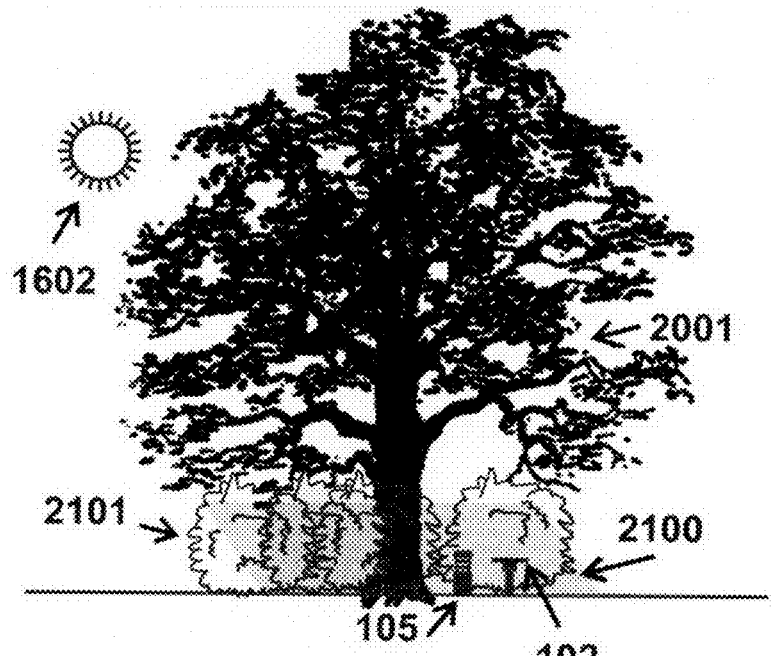
Figure 21 - Category 3 Shade
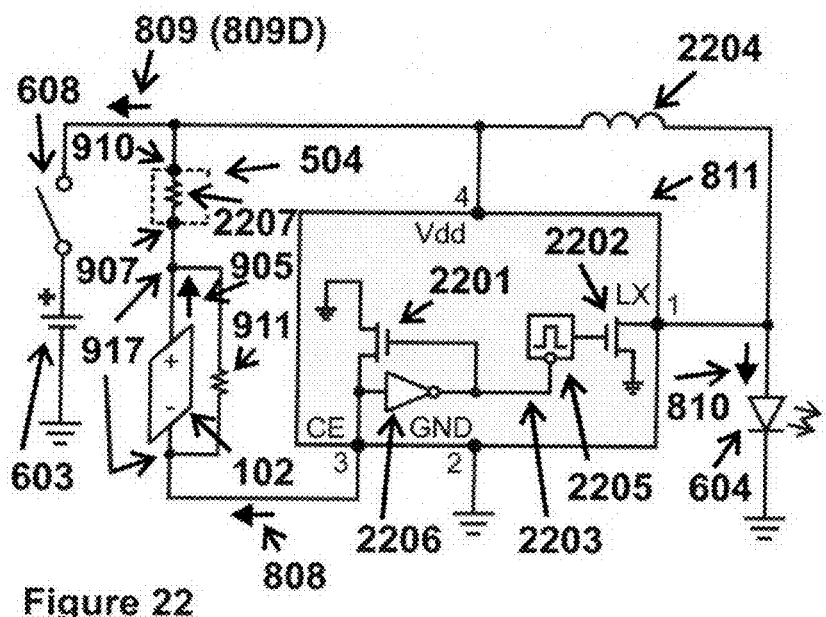
Figure 22

APPARATUS FOR A SOLAR PATHWAY LIGHT

CROSS-REFERENCE TO RELATED APPLICATIONS

Not applicable.

RELATED CO-PENDING U.S. PATENT APPLICATIONS

Not applicable.

COPYRIGHT NOTICE

Not applicable.

BACKGROUND OF THE RELEVANT PRIOR ART

One or more embodiments of the invention generally relate to solar pathway lights. More particularly, certain embodiments of the invention relates to solar pathway lights for shady areas.

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that invention shows a rechargeable portable light having a housing member with an opening for the emission of light, and several possible charging systems including a solar panel, an AC charger, an auto charger, and a hand crank generator charger.

Another example is a system and method for operating an outdoor lighting feature, the outdoor lighting feature including a bollard, a solar panel disposed within a recess on the top of the bollard, a battery disposed within the bollard, the battery being electrically coupled to the solar panel and configured to receive and store energy from the solar panel, and a light source oriented to direct a light beam to a region external to the bollard, the light source being configured to draw an electric load from the battery.

Another example is a light assembly including a globe, an electric grid powered lighting element disposed within the globe, a solar powered lighting element disposed within the globe, a solar panel coupled to the solar powered lighting element for collecting light and generating power for the solar powered lighting element, a rechargeable power source coupled to the solar panel and the solar powered lighting element for storing the power generated by the solar panel and powering the solar powered lighting element, In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which:

FIG. 15 is a perspective view showing the FIG. 13 embodiment in Category 1 shade, in accordance with an embodiment of the present invention;

FIG. 16 is a line drawing showing an example of a Category 1 Shade, in accordance with an embodiment of the present invention;

FIG. 17 is a line drawing showing an example of a Category 1 Shade, in accordance with an embodiment of the present invention;

FIG. 18 is a line drawing showing an example of a Category 2 Shade, in accordance with an embodiment of the present invention;

FIG. 19 is a line drawing showing another example of a Category 2 Shade, in accordance with an embodiment of the present invention;

FIG. 20 is a line drawing showing another example of a Category 2 Shade, in accordance with an embodiment of the present invention;

FIG. 21 shows a line drawing of an example of a Category 3 Shade, in accordance with an embodiment of the present invention;

FIG. 22 is a schematic diagram of a simplified embodiment having a Solar IC and a safety device with an impedance device referred to as a current limiting resistor, in accordance with an embodiment of the present invention;

Figure 1:
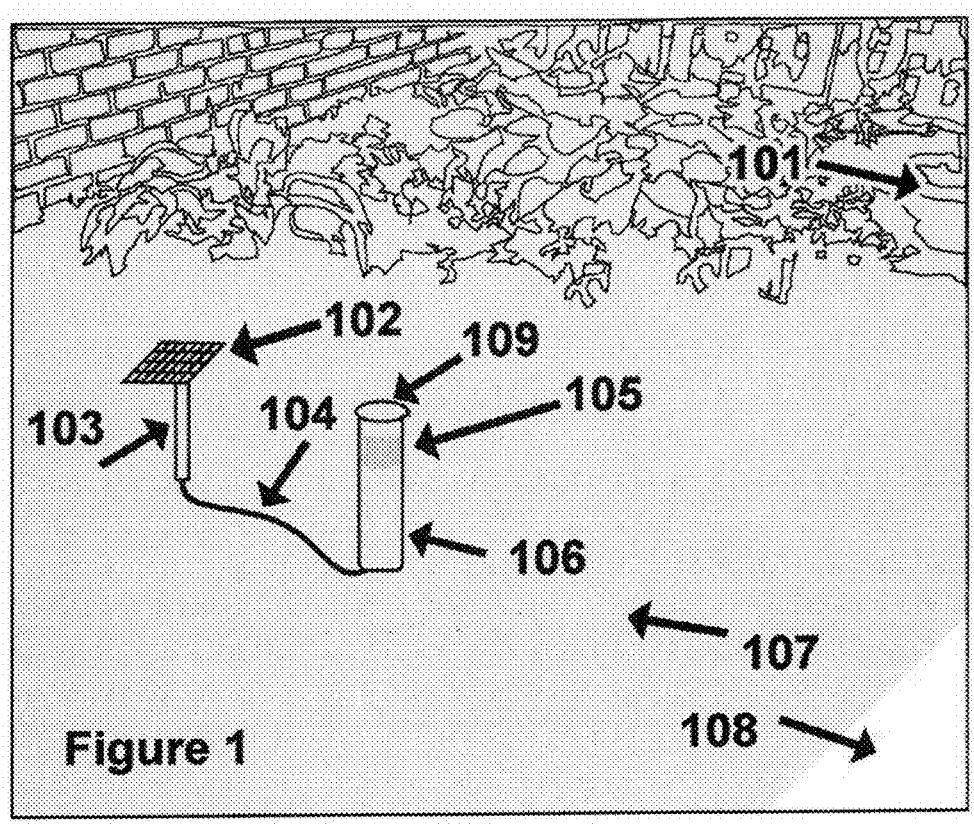
FIG. 1 is a perspective view showing an exemplary solar pathway light in category 3 shade, in accordance with an embodiment of the present invention.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

All words of approximation as used in the present disclosure and claims should be construed to mean "approximate," rather than "perfect," and may accordingly be employed as a meaningful modifier to any other word, specified parameter, quantity, quality, or concept. Words of approximation, include, yet are not limited to terms such as "substantial", "nearly", "almost", "about", "generally", "largely", "essentially", "closely approximate", etc.

As will be established in some detail below, it is well settled law, as early as 1939, that words of approximation are not indefinite in the claims even when such limits are not defined or specified in the specification.

For example, see Ex parte Mallory, 52 USPQ 297, 297 (Pat. Off. Bd. App. 1941) where the court said "The examiner has held that most of the claims are inaccurate because apparently the laminar film will not be entirely eliminated. The claims specify that the film is "substantially" eliminated and for the intended purpose, it is believed that the slight portion of the film which may remain is negligible. We are of the view, therefore, that the claims may be regarded as sufficiently accurate."

Note that claims need only "reasonably apprise those skilled in the art" as to their scope to satisfy the definiteness requirement. See Energy Absorption Sys., Inc. v. Roadway Safety Servs., Inc., Civ. App. 96-1264, slip op. at 10 (Fed. Cir. Jul. 3, 1997) (unpublished) Hybridtech v. Monoclonal Antibodies, Inc., 802 F.2d 1367, 1385, 231 USPQ 81, 94 (Fed. Cir. 1986), cert. denied, 480 U.S. 947 (1987). In addition, the use of modifiers in the claim, like "generally" and "substantial," does not by itself render the claims indefinite. See Seattle Box Co. v. Industrial Crating & Packing, Inc., 731 F.2d 818, 828-29, 221 USPQ 568, 575-76 (Fed. Cir. 1984).

Moreover, the ordinary and customary meaning of terms like "substantially" includes "reasonably close to: nearly, almost, about", connoting a term of approximation. See In re Frye, Appeal No. 2009-006013, 94 USPQ2d 1072, 1077, 2010 WL 889747 (B.P.A.I. 2010) Depending on its usage, the word "substantially" can denote either language of approximation or language of magnitude. Deering Precision Instruments, L.L.C. v. Vector Distribution Sys., Inc., 347 F.3d 1314, 1323 (Fed. Cir. 2003) (recognizing the "dual ordinary meaning of th[e] term ["substantially"] as connoting a term of approximation or a term of magnitude"). Here, when referring to the "substantially halfway" limitation, the Specification uses the word "approximately" as a substitute for the word "substantially" (Fact 4). (Fact 4). The ordinary meaning of "substantially halfway" is thus reasonably close to or nearly at the midpoint between the forwardmost point of the upper or outsole and the rearwardmost point of the upper or outsole.

Similarly, the term 'substantially' is well recognize in case law to have the dual ordinary meaning of connoting a term of approximation or a term of magnitude. See Dana Corp. v. American Axle & Manufacturing, Inc., Civ. App. 04-1116, 2004 U.S. App. LEXIS 18265, *13-14 (Fed. Cir. Aug. 27, 2004) (unpublished). The term "substantially" is commonly used by claim drafters to indicate approximation. See Cordis Corp. v. Medtronic AVE Inc., 339 F.3d 1352, 1360 (Fed. Cir. 2003) ("The patents do not set out any numerical standard by which to determine whether the thickness of the wall surface is 'substantially uniform.' The term 'substantially,' as used in this context, denotes approximation. Thus, the walls must be of largely or approximately uniform thickness."); see also Deering Precision Instruments, LLC v. Vector Distribution Sys., Inc., 347 F.3d 1314, 1322 (Fed. Cir. 2003); Epcon Gas Sys., Inc. v. Bauer Compressors, Inc., 279 F.3d 1022, 1031 (Fed. Cir. 2002). We find that the term "substantially" was used in just such a manner in the claims of the patents-in-suit: "substantially uniform wall thickness" denotes a wall thickness with approximate uniformity.

It should also be noted that such words of approximation as contemplated in the foregoing clearly limits the scope of claims such as saying 'generally parallel' such that the adverb 'generally' does not broaden the meaning of parallel. Accordingly, it is well settled that such words of approximation as contemplated in the foregoing (e.g., like the phrase 'generally parallel') envisions some amount of deviation from perfection (e.g., not exactly parallel), and that such words of approximation as contemplated in the foregoing are descriptive terms commonly used in patent claims to avoid a strict numerical boundary to the specified parameter. To the extent that the plain language of the claims relying on such words of approximation as contemplated in the foregoing are clear and uncontradicted by anything in the written description herein or the figures thereof, it is improper to rely upon the present written description, the figures, or the prosecution history to add limitations to any of the claim of the present invention with respect to such words of approximation as contemplated in the foregoing. That is, under such circumstances, relying on the written description and prosecution history to reject the ordinary and customary meanings of the words themselves is impermissible. See, for example, Liquid Dynamics Corp. v. Vaughan Co., 355 F.3d 1361, 69 USPQ2d 1595, 1600-01 (Fed. Cir. 2004). The plain language of phrase 2 requires a "substantial helical flow." The term "substantial" is a meaningful modifier implying "approximate," rather than "perfect." In Cordis Corp. v. Medtronic AVE, Inc., 339 F.3d 1352, 1361 (Fed. Cir. 2003), the district court imposed a precise numeric constraint on the term "substantially uniform thickness." We noted that the proper interpretation of this term was "of largely or approximately uniform thickness" unless something in the prosecution history imposed the "clear and unmistakable disclaimer" needed for narrowing beyond this simple-language interpretation. Id. In Anchor Wall Systems v. Rockwood Retaining Walls, Inc., 340 F.3d 1298, 1311 (Fed. Cir. 2003)" Id. at 1311. Similarly, the plain language of Claim 1 requires neither a perfectly helical flow nor a flow that returns precisely to the center after one rotation (a limitation that arises only as a logical consequence of requiring a perfectly helical flow).

The reader should appreciate that case law generally recognizes a dual ordinary meaning of such words of approximation, as contemplated in the foregoing, as connoting a term of approximation or a term of magnitude; e.g., see Deering Precision Instruments, L.L.C. v. Vector Distrib. Sys., Inc., 347 F.3d 1314, 68 USPQ2d 1716, 1721 (Fed. Cir. 2003), cert. denied, 124 S. Ct. 1426 (2004) where the court was asked to construe the meaning of the term "substantially" in a patent claim. Also see Epcon, 279 F.3d at 1031 ("The phrase 'substantially constant' denotes language of approximation, while the phrase 'substantially below' signifies language of magnitude, i.e., not insubstantial."). Also, see, e.g., Epcon Gas Sys., Inc. v. Bauer Compressors, Inc., 279 F.3d 1022 (Fed. Cir. 2002) (construing the terms "substantially constant" and "substantially below"); Zodiac Pool Care, Inc. v. Hoffinger Indus., Inc., 206 F.3d 1408 (Fed. Cir. 2000) (construing the term "substantially inward"); York Prods., Inc. v. Cent. Tractor Farm & Family Ctr., 99 F.3d 1568 (Fed. Cir. 1996) (construing the term "substantially the entire height thereof"); Tex. Instruments Inc. v. Cypress Semiconductor Corp., 90 F.3d 1558 (Fed. Cir. 1996) (construing the term "substantially in the common plane"). In conducting their analysis, the court instructed to begin with the ordinary meaning of the claim terms to one of ordinary skill in the art. Prima Tek, 318 F.3d at 1148. Reference to dictionaries and our cases indicates that the term "substantially" has numerous ordinary meanings. As the district court stated, "substantially" can mean "significantly" or "considerably." The term "substantially" can also mean "largely" or "essentially." Webster's New 20th Century Dictionary 1817 (1983).

Words of approximation, as contemplated in the foregoing, may also be used in phrases establishing approximate ranges or limits, where the end points are inclusive and approximate, not perfect; e.g., see AK Steel Corp. v. Sollac, 344 F.3d 1234, 68 USPQ2d 1280, 1285 (Fed. Cir. 2003) where it where the court said [W]e conclude that the ordinary meaning of the phrase "up to about 10%" includes the "about 10%" endpoint. As pointed out by AK Steel, when an object of the preposition "up to" is nonnumeric, the most natural meaning is to exclude the object (e.g., painting the wall up to the door). On the other hand, as pointed out by Sollac, when the object is a numerical limit, the normal meaning is to include that upper numerical limit (e.g., counting up to ten, seating capacity for up to seven passengers). Because we have here a numerical limit—"about 10%"—the ordinary meaning is that that endpoint is included.

In the present specification and claims, a goal of employment of such words of approximation, as contemplated in the foregoing, is to avoid a strict numerical boundary to the modified specified parameter, as sanctioned by Pall Corp. v. Micron Separations, Inc., 66 F.3d 1211, 1217, 36 USPQ2d 1225, 1229 (Fed. Cir. 1995) where it states "It is well established that when the term "substantially" serves reasonably to describe the subject matter so that its scope would be understood by persons in the field of the invention, and to distinguish the claimed subject matter from the prior art, it is not indefinite." Likewise see Verve LLC v. Crane Cams Inc., 311 F.3d 1116, 65 USPQ2d 1051, 1054 (Fed. Cir. 2002). Expressions such as "substantially" are used in patent documents when warranted by the nature of the invention, in order to accommodate the minor variations that may be appropriate to secure the invention. Such usage may well satisfy the charge to "particularly point out and distinctly claim" the invention, 35 U.S.C. § 112, and indeed may be necessary in order to provide the inventor with the benefit of his invention. In Andrew Corp. v. Gabriel Elecs. Inc., 847 F.2d 819, 821-22, 6 USPQ2d 2010, 2013 (Fed. Cir. 1988) the court explained that usages such as "substantially equal" and "closely approximate" may serve to describe the invention with precision appropriate to the technology and without intruding on the prior art. The court again explained in Ecolab Inc. v. Envirochem, Inc., 264 F.3d 1358, 1367, 60 USPQ2d 1173, 1179 (Fed. Cir. 2001) that "like the term 'about,' the term 'substantially' is a descriptive term commonly used in patent claims to 'avoid a strict numerical boundary to the specified parameter, see Ecolab Inc. v. Envirochem Inc., 264 F.3d 1358, 60 USPQ2d 1173, 1179 (Fed. Cir. 2001) where the court found that the use of the term "substantially" to modify the term "uniform" does not render this phrase so unclear such that there is no means by which to ascertain the claim scope.

Similarly, other courts have noted that like the term "about," the term "substantially" is a descriptive term commonly used in patent claims to "avoid a strict numerical boundary to the specified parameter."; e.g., see Pall Corp. v. Micron Seps., 66 F.3d 1211, 1217, 36 USPQ2d 1225, 1229 (Fed. Cir. 1995); see, e.g., Andrew Corp. v. Gabriel Elecs. Inc., 847 F.2d 819, 821-22, 6 USPQ2d 2010, 2013 (Fed. Cir. 1988) (noting that terms such as "approach each other," "close to," "substantially equal," and "closely approximate" are ubiquitously used in patent claims and that such usages, when serving reasonably to describe the claimed subject matter to those of skill in the field of the invention, and to distinguish the claimed subject matter from the prior art, have been accepted in patent examination and upheld by the courts). In this case, "substantially" avoids the strict 100% nonuniformity boundary.

Indeed, the foregoing sanctioning of such words of approximation, as contemplated in the foregoing, has been established as early as 1939, see Ex parte Mallory, 52 USPQ 297, 297 (Pat. Off. Bd. App. 1941) where, for example, the court said "the claims specify that the film is "substantially" eliminated and for the intended purpose, it is believed that the slight portion of the film which may remain is negligible. We are of the view, therefore, that the claims may be regarded as sufficiently accurate." Similarly, In re Hutchison, 104 F.2d 829, 42 USPQ 90, 93 (C.C.P.A. 1939) the court said "It is realized that "substantial distance" is a relative and somewhat indefinite term, or phrase, but terms and phrases of this character are not uncommon in patents in cases where, according to the art involved, the meaning can be determined with reasonable clearness."

Hence, for at least the forgoing reason, Applicants submit that it is improper for any examiner to hold as indefinite any claims of the present patent that employ any words of approximation.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will be described in detail below with reference to embodiments thereof as illustrated in the accompanying drawings.

References to a "device," an "apparatus," a "system," etc., in the preamble of a claim should be construed broadly to mean "any structure meeting the claim terms" exempt for any specific structure(s)/type(s) that has/(have) been explicitly disavowed or excluded or admitted/implied as prior art in the present specification or incapable of enabling an object/aspect/goal of the invention. Furthermore, where the present specification discloses an object, aspect, function, goal, result, or advantage of the invention that a specific prior art structure and/or method step is similarly capable of performing yet in a very different way, the present invention disclosure is intended to and shall also implicitly include and cover additional corresponding alternative embodiments that are otherwise identical to that explicitly disclosed except that they exclude such prior art structure(s)/step(s), and shall accordingly be deemed as providing sufficient disclosure to support a corresponding negative limitation in a claim claiming such alternative embodiment(s), which exclude such very different prior art structure(s)/step(s) way(s).

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present application or of any further application derived therefrom.

References to "one embodiment," "an embodiment," "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" includes the stated particular feature, structure, or characteristic.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred or induced by any pattern(s) of description, embodiments, examples, or referenced prior-art that may (or may not) be provided in the present patent.

References to "end user", or any similar term, as used herein, is generally intended to mean late stage user(s) as opposed to early stage user(s). Hence, it is contemplated that there may be a multiplicity of different types of "end user" near the end stage of the usage process. Where applicable, especially with respect to distribution channels of embodiments of the invention comprising consumed retail products/ services thereof (as opposed to sellers/vendors or Original Equipment Manufacturers), examples of an "end user" may include, without limitation, a "consumer", "buyer", "customer", "purchaser", "shopper", "enjoyer", "viewer", or individual person or non-human thing benefiting in any way, directly or indirectly, from use of. or interaction, with some aspect of the present invention.

In some situations, some embodiments of the present invention may provide beneficial usage to more than one stage or type of usage in the foregoing usage process. In such cases where multiple embodiments targeting various stages of the usage process are described, references to "end user", or any similar term, as used therein, are generally intended to not include the user that is the furthest removed, in the foregoing usage process, from the final user therein of an embodiment of the present invention.

Where applicable, especially with respect to retail distribution channels of embodiments of the invention, intermediate user(s) may include, without limitation, any individual person or non-human thing benefiting in any way, directly or indirectly, from use of, or interaction with, some aspect of the present invention with respect to selling, vending, Original Equipment Manufacturing, marketing, merchandising, distributing, service providing, and the like thereof.

References to "person", "individual", "human", "a party", "animal", "creature", or any similar term, as used herein, even if the context or particular embodiment implies living user, maker, or participant, it should be understood that such characterizations are sole by way of example, and not limitation, in that it is contemplated that any such usage, making, or participation by a living entity in connection with making, using, and/or participating, in any way, with embodiments of the present invention may be substituted by such similar performed by a suitably configured non-living entity, to include, without limitation, automated machines, robots, humanoids, computational systems, information processing systems, artificially intelligent systems, and the like. It is further contemplated that those skilled in the art will readily recognize the practical situations where such living makers, users, and/or participants with embodiments of the present invention may be in whole, or in part, replaced with such non-living makers, users, and/or participants with embodiments of the present invention. Likewise, when those skilled in the art identify such practical situations where such living makers, users, and/or participants with embodiments of the present invention may be in whole, or in part, replaced with such non-living makers, it will be readily apparent in light of the teachings of the present invention how to adapt the described embodiments to be suitable for such non-living makers, users, and/or participants with embodiments of the present invention. Thus, the invention is thus to also cover all such modifications, equivalents, and alternatives falling within the spirit and scope of such adaptations and modifications, at least in part, for such non-living entities.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/components/devices/parameters herein, without limitation. Each term utilized herein is to be given its broadest interpretation given the context in which that term is utilized.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A memory controller comprising a system cache . . . ." Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component can be said to be configured to (or be operable) for perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc. Reciting that a mechanism/unit/circuit/component is "configured to" or "operable for" perform(ing) one or more tasks is expressly intended not to invoke 35 U.S.C. .sctn.112, sixth paragraph, for that mechanism/unit/circuit/component. "Configured to" may also include adapting a manufacturing process to fabricate devices or components that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" and "consisting of" limits the scope of a claim to the specified elements or method steps, plus those that do not materially affect the basis and novel characteristic(s) of the claimed subject matter (see Norian Corp. v Stryker Corp., 363 F.3d 1321, 1331-32, 70 USPQ2d 1508, Fed. Cir. 2004). Moreover, for any claim of the present invention which claims an embodiment "consisting essentially of" or "consisting of" a certain set of elements of any herein described embodiment it shall be understood as obvious by those skilled in the art that the present invention also covers all possible varying scope variants of any described embodiment(s) that are each exclusively (i.e., "consisting essentially of") functional subsets or functional combination thereof such that each of these plurality of exclusive varying scope variants each consists essentially of any functional subset(s) and/or functional combination(s) of any set of elements of any described embodiment(s) to the exclusion of any others not set forth therein. That is, it is contemplated that it will be obvious to those skilled how to create a multiplicity of alternate embodiments of the present invention that simply consisting essentially of a certain functional combination of elements of any described embodiment(s) to the exclusion of any others not set forth therein, and the invention thus covers all such exclusive embodiments as if they were each described herein.

With respect to the terms "comprising," "consisting of" and "consisting essentially of" where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of", and thus, for the purposes of claim support and construction for "consisting of" format claims, such replacements operate to create yet other alternative embodiments "consisting essentially of" only the elements recited in the original "comprising" embodiment to the exclusion of all other elements.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

It is to be understood that any exact measurements/dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

Solar cells may be wired in groups to create solar panels. Recent advancements in conversion efficiency of light to electrical current, as well as lower cost due to higher volume production and better manufacturing techniques, have made powerful solar panels abundant and inexpensive. These advancements have been overlooked or underappreciated as a power source for solar lights located in shaded areas.

There is not much useful information published about solar panel performance characteristics in shade. The highly non-linear output voltage verses current relationship of solar cells makes such characterization difficult.

In solar panels, there is a mismatch of voltage and current outputs among supposedly identical solar cells due to normal manufacturing variations. When mismatched cells are grouped into arrays to form a solar panel, they can consume a portion of each other's output current. This effect is difficult to characterize or predict as it seems to vary significantly with the intensity of light received by the array, and with the amount of mismatch between cells.

In the present invention the solution to the characterization challenge are the shade categories, test procedures, and solar panel output specifications. They enable the output of a solar panel to be measured in direct sunlight, or in shade, to determine if it may conform to specification of the present invention and may be incorporated into embodiment herein.

Many embodiments of the present invention provide a solar pathway light that may operate in direct sunlight or shade. Many embodiments may include a solar panel, a rechargeable battery, an LED, and some circuitry. Many embodiments may be self-contained and may be quickly and easily installed or moved. Many embodiments do not require external wiring for grid power or low-voltage landscape wiring. Many embodiments produce sufficient light to illuminate for example, but not limited to, a foot path, walkway, trail, stair step, landscape or architectural feature. Many embodiments may be for, but not limited to, homeowners, campers, architects, or park operators who desire greater safety and convenience by having these features illuminated at night, without concern over shade, sun, or wiring. Many embodiments may eliminate any requirement for direct sunlight. In many embodiments, the solar panel may provide the necessary energy by being incompatible with the rechargeable battery. The incompatibility enables ample solar energy collection and battery recharging in shade and overcast. It also means that direct sunlight may cause the solar panel to produce more output than may be stored in the battery. In many embodiments, a safety device is included to control the charge in the battery and eliminate adverse effects of the incompatibility. In many embodiments, the battery may be replaced by a supercapacitor. Batteries and supercapacitors are non-limiting examples of rechargeable storage devices, all of which have energy storage limitations which makes them unable to store all the output of an incompatible solar panel in direct sunlight.

Various prior art lights may have battery protection circuits. For example, a solar light with a shunt regulator, and a solar charge controller which includes costly PWM and logic circuits. It is believed that these lights may not operate indefinitely in shade.

In many embodiments, the safety device may differ from prior art devices by not preventing the rechargeable storage device from being overcharged by itself. Instead, it may have lower cost and better reliability through a synergistic cooperation with the environment where the solar light operates. The safety device may advantageously utilize the limited number of hours of each day and night to reliably and cost-effectively control the charge in the rechargeable storage device.

Abbreviations, Terms, and Equations 0.953 solar panel 3-year voltage aging factor, 1.6% decrease per year
0.982 solar panel 3-year current aging, 0.6% decrease per year
C total charge stored in the rechargeable storage device, in mAh
Cap a unit of capacitance, in Farads
Cat1 Spec solar panel output specification for Category 1 shade, sets limits for Ip1n and Vp1
Cchg amount of recharge added to the battery, in mAh
Cpo solar panel charge output, in mAh
Cn nominal charge storage capacity (planned capability) of the rechargeable storage device, in mAh
Dchg recharging duty cycle
DCR direct sunlight discharging current ratio specification
DCR1 Category 1 discharging current ratio specification
DS direct sunlight, DS=10,500+/−500 FC
DS Spec solar panel output specification for direct sunlight, sets limits for Iscn and Voc
E total energy stored in the battery, in Watt-Hr
Echg amount of energy added to the battery, in Watt-Hr
En nominal energy storage capacity (planned capability) of the rechargeable battery, in Watt-Hr
Epo solar panel energy output, in Watt-Hr
F a unit of capacitance, in Farads
FC a unit of luminosity, in foot-candles
hrs a unit of time, in hours
Ichg charging current, flows into the storage positive terminal while being recharged, in mA
Idis discharge current, flows away from the storage positive terminal while illuminating the LED, in mA
Iled LED current, in mA
Ipo solar panel output current, a variable corresponding to the light intensity on the solar panel, mA
Ip1 solar panel Category 1 short-circuit output current, set by the solar panel manufacturer, in mA
Ip1n Ip1 value from Category 1 measurement, normalized to 550 FC, in mA
Isc solar panel direct-sunlight short-circuit output current, set by the panel manufacturer, in mA
Iscn Isc value from direct sunlight measurement, normalized to 10,500 FC, in mA
Ithc safety device current limit, recharging parameter, in mA
Ithic low-light current threshold, in mA
Itrk safety device trickle current, discharging parameter, in mA
LED light emitting diode
mA a unit of current, in milliamperes
mAh a unit of charge, in milliampere hours
mS a unit of time, in milliseconds
mW a unit of power, in milliwatts
Psd safety device power dissipation
Pvc voltage converter power dissipation
Rsd resistance value of the safety device current limiting resistor
Tc current timer recharging period, in hours
Toff current-timer switch off-time, in mS
Ton current-timer switch on-time, in mS
Tnight duration of nighttime illumination of the LED, in hours
Ttheo theoretical battery-recharging time, in hours
V a unit of voltage, in volts
Vdrop safety device voltage drop in inactive mode, includes recharging switch voltage drop, in V
Vf forward conduction voltage of LED, in V
Vp1 solar panel Category 1 open-circuit output voltage, set by the solar panel manufacturer, in V
Vpo solar panel output voltage, a variable corresponding to the light intensity on the solar panel, in V
Vn nominal voltage of the rechargeable battery, set by the battery manufacturer, in V
Voc solar panel direct-sunlight open-circuit output voltage, set by the solar panel manufacturer, in V
Vsafety voltage drop of the safety device, in V
Vstor storage device voltage, in V
Vthic battery cutoff threshold of the Solar IC, set by the IC manufacturer, in V
Watt-Hr a unit of energy in watt-hours, mAh×Volts/1000

| Index | Equation | Description |
| --- | --- | --- |
| 1st | $0.50\ Cn/0.982 <= Iscn <= 250\ Cn$ | Required current range of the DS Spec. |
| 1st' | $1 \times Cn <= Iscn <= 250\ Cn$ | Preferred solar panel output current range of the DS Spec. |
| 2nd | $Voc >= (1.15\ Vn + V drop)/0.9/0.953$ | Preferred minimum solar panel output voltage of the DS Spec. |
| 3rd | $Voc <= (1.15\ Vn + V drop)/0.4$ | Preferred maximum solar panel output voltage of the DS Spec. |
| 4th | $Ttheo = 1.2\ Cn/Isc$ | Theoretical storage recharging time. |
| 5th | $DCR = Iscn/Idis >= 20$ | Required discharging current ratio. |
| 5th' | $DCR = Iscn/Idis >= 40$ | Preferred discharging current ratio. |
| 6th | $Ip1n > 0.04\ Cn/0.982$ | Required minimum solar panel output current of the Cat1 Spec. |
| 6th' | $Ip1n > 0.125\ Cn$ | Preferred minimum solar panel output current of the Cat1 Spec. |
| 7th | $Vp1 > (1.15\ Vn + V\ drop)/0.953$ | Preferred minimum solar panel output voltage of the Cat1 Spec. |
| 8th | $DCR1 = Ip1n/Idis > 0.5$ | Required discharging current ratio for Category 1. |
| 8th' | $DCR1 = Ip1n/Idis >= 1.5$ | Preferred discharging current ratio for Category 1. |
| 9th | $Rsd >= (Voc - V\ drop - Vn)/(0.25 \times Cn)$ | Minimum resistance value of safety device current limiting resistor. |
| 9th' | $Rsd >= (Voc - V\ drop - Vn)/(0.15 \times Cn)$ | Optimal minimum resistance value of safety device current limiting resistor. |

| Operating Mode | What Happens |
| --- | --- |
| Active Mode | An impedance device of the safety device decreases the charging current. |
| Inactive Mode | An impedance device of the safety device makes little or no change to the charging current. |
| Charging Mode | Recharging switch closes. Discharging switch opens. Solar panel recharges battery. |
| Illumination Mode | Recharging switch opens. Discharging switch closes. Storage device illuminates LED. |

In many embodiments of the present invention, an unconventionally large or powerful solar panel may be combined with a low capacity battery and a high-efficiency LED. All these components may be located together in shade, but they may be relocated to direct sunlight without any adverse effects. The mismatch between the solar panel and the rechargeable battery may ensure that the battery gets recharged, even if the solar panel never receives any direct sunlight. The mismatch must be properly managed. The incompatibility stems from the battery being unable to store all the energy output of the solar panel for a variety of reasons. The solar panel conforming to the DS Spec and/or the Cat1 Spec enables it to recharge the battery in shade, but they also makes it incompatible with the battery.

The adverse effects of the incompatibility may be eliminated at lower cost and with better reliability by a safety device cooperating with the environment to control the charge in the storage device. The safety device may have an impedance device to limit the charging current to the storage device to ensure that it gets recharged, but not substantially overcharged, during daytime hours. Since the charging current and hours are both limited, the total recharge delivered to storage is also limited.

In some alternate embodiments, the storage device has a larger storage capacity and the safety device has a discharge regulator which prepares the storage device at night by discharging it. The discharge regulator may remove some of the stored charge to reserve some capacity for receiving the day's energy output. In this embodiment, the maximum total recharge delivered to storage may be limited by the solar panel's current output in direct-sunlight and by the number of recharging hours per day.

An important new concept is that a solar panel is incompatible with a rechargeable storage device, such as, but not limited to, a battery. The incompatibility stems from the storage device's inability to store all the energy generated by the solar panel during a day. The reason it cannot store the energy is because the storage capacity Cn either is too small or may already be occupied by a charge making the device unprepared for recharging. The incompatibility is a consequence of the solar panel conforming to the DS Spec and/or the Cat1 Spec. The Specs enumerate the relationships between the solar panel voltage and current output measurements relative to the storage device voltage and capacity nominal specifications. They ensure that, in the embodiments herein, the solar panel can produce sufficient energy output in shade to recharge the storage and operate the light indefinitely on only solar power without direct sunlight. A safety device may be included to prevent adverse effects of the incompatibility.

A new term and concept is safety device. It distinguishes the present invention battery protection circuits from the prior art current shunts, shunt regulators, voltage regulators, or solar charge controllers. The prior art shunts are connected in parallel with solar panels or batteries. The prior art voltage regulators and solar charge controllers are connected in series with the solar panel and the battery.

The safety device differs from these prior art devices because it may have one or more impedance devices and/or discharge regulators. Furthermore, the safety device may not prevent the storage device from being overcharged by itself. Instead, it may have lower cost and better reliability through a synergistic cooperation with the environment in which the solar light operates. The safety device takes advantage of the limited number of hours that the storage is recharged or discharged each day to control the stored charge.

The safety device manages the parameters of recharging such as, but not limited to, intensity and/or time duration of the charging current to limit the charge delivered to storage. Or the safety device manages the parameters of discharging such as, but not limited to, intensity and/or time duration of the discharge current to prepare the storage device for a new recharge. The safety device and the environment may limit the recharging or the discharging during daytime and nighttime hours each day.

On average, the environment has 12 hours of day and 12 hours of night. In theory, the storage device may be recharged for 12 hours of daylight and discharged for 12 hours of night, on average. In practice, there may be hours of twilight, dusk, dawn, and overcast. The idle hours may be insubstantial for recharging while the LED is not illuminated. The solar light may be theoretically in the Charging Mode even though it is practically idle. The intensity of light on the solar panel may vary widely depending on the environment. And other nightlights may be bright enough to turn on the LED and decrease the number of discharge hours. When solar lights are designed per the teaching herein, the designer may consider these factors and plan the safety device and other circuits accordingly.

Another new concept is the classification of shaded areas by category.

Examples of four shade categories are given in FIGS. 16 through 21. Nominal light intensity measurements are provided, which are Category 1 is 550 FC, Category 2 is 250 FC, Category 3 is 150 FC, and Category 4 is 10 FC. The categories may be required to correctly identify the operating environment of the light.

More new terms are DS Test Procedure, DS Spec, Cat1 Test Procedure, and Cat1 Spec. These are for measuring solar panels and ensuring that the outputs are sufficient in shade to operate the light indefinitely on only solar power.

Another new concept is a theoretical battery-recharging time (Ttheo). It is a theoretical value for evaluating how quickly a solar panel may recharge a battery. It is calculated by a 4th equation $Ttheo = 1.2 Cn/Iscn$. The Ttheo time is determined by the DS Spec for the Iscn current. The minimum $Ttheo = 1.2 \times Cn/250Cn = 0.0048$ Hours (17.28 Seconds). The maximum $Ttheo = 1.2 \times Cn/0.5Cn = 2.4$ Hours. The value of the Ttheo time is theoretical. It excludes effects caused by the safety device and the other components.

Another new concept is a discharging current ratio (DCR number). It relates the solar panel current output in direct sunlight to the current drain load from storage of illuminating the LED. It is calculated by a 5th equation, $DCR = Iscn/Idis$, where Iscn is the normalized short-circuit output current of the solar panel direct sunlight and Idis is the average discharge current when the LED is illuminated in the Illumination Mode. The Idis current may be measured with a DC ammeter. The DCR is a number with no unit. It is a meaningful measure of the nighttime current drain on the rechargeable storage device relative to the DS current output of the solar panel. The DCR number must be greater than or equal to 20 to ensure that the storage is not drained too quickly relative to the recharging capability of the solar panel in shade. The higher the DCR number, the longer my light can illuminate the LED at night, and the dimmer the scattered sunlight may be where the light is located during recharging. Even better results (longer illumination at night and/or enabled operation in dimmer scattered sunlight) may be achieved when the DCR number is in the preferred range being at least 40. Such high DCR numbers indicate that the solar panel may be incompatible with the storage device because the solar panel output current produced in one day of direct sunlight is many times greater than the current consumed by the LED at night.

The DCR number may predict the theoretical duration of the nighttime illumination of the LED (Tnight). In a non-limiting example, assume that Iscn=1000 mA, DCR=20, Cn=400 mAh, and the solar panel is in Category 1 shade producing Ichg current averaging 50 mA per hour for 8 hours. The added charge resulting from the 8 hours of daylight is Cchg=(50 mA×8 Hr)/1.2=333 mAh. The average current discharge drain is calculated as Idis=1000 mA/20=50 mA. The nighttime LED illumination is predicted to be Tnight=333 mAh/50 mA=6.7 hrs. This illustrates that the given parameters may illuminate the LED for about 6.7 hours if the average discharge current is 50 mA during the 6.7 hours.

In another non-limiting example assume, that Iscn=1000 mA, DCR=40, Cn=400 mAh, and the solar panel is in Category 2 shade producing Ichg current averaging only 35 mA per hour for 8 hours. The added charge resulting from the 8 hours of daylight is Cchg=(35 mA×8 Hr)/1.2=233 mAh. The average drain is calculated as Idis=1000 mA/40=25 mA. The nighttime LED illumination is predicted to be Tnight=233 mAh/25 mA=9.3 hrs. This illustrates that increasing the DCR number may increase the illumination time even when the solar current is decreased by dimmer shade.

In another non-limiting example, assume that the previous light is operating in the Category 2 shade and overcast adds 1 point to create Category 3 shade. The addition of overcast decreases solar insolation and the storage receives only 27 mA per hour for 8 hours. The added charge is Cchg=(27 mA×8 Hr)/1.2=180 mAh. The drain is the same, 25 mA. The nighttime LED illumination is predicted to be Tnight=180 mAh/25 mA=7.2 hrs.

In another non-limiting example, assume that the previous light is moved to direct sunlight. The light has a safety device that limits the Ichg charging current to 15% of the battery capacity Cn. In 8 hours of sunlight, the storage receives the following charge currents; Ichg=40 mA for 2 hours, 55 mA for 1 hour, and for four hours the safety device is active to make Ichg=0.15/hrs×400 mAh=60 mA. The added charge is Cchg=(50 mA×2 hrs+55 mA×1 hrs+60 mA×4 hrs)/1.2=329 mAh. The drain is the same, 25 mA. The nighttime LED illumination is predicted to be Tnight=329 mAh/25 mA=13.2 hrs.

Another new concept is a DCR1 number. It is like the DCR number but it has direct sunlight changed to Category 1 shade. The DCR1 relates the solar panel Category 1 shade current output to the LED illumination load. It is calculated by an 8th equation, DCR1=Ip1n/Idis, where Ip1n is the normalized short-circuit output current of the solar panel in Category 1 shade and Idis is the illumination load current from storage. The DCR1 number has no unit. It quantifies the nighttime drain on the storage device relative to the solar panel current output in Category 1 shade. The DCR1 number must be greater than 0.5 to ensure that the storage is not drained too quickly relative to the recharging capability of the solar panel in shade. The higher the DCR1 number, the longer my light can illuminate the LED at night, and the dimmer the scattered sunlight can be where the light is located during recharging. Even better results may be achieved when the DCR1 number is in the preferred range being at least 1.5. Such high DCR1 numbers indicate that the solar panel may be incompatible with the storage device because the solar panel may be in direct sunlight, which can have 21 times greater luminosity than Category 1 shade, making the output current produced in one day many times greater than the current consumed by the LED at night.

The DCR1 number may predict the theoretical value of Tnight. In a non-limiting example, assume that Ip1n=40 mA, DCR1=1.5, Cn=400 mAh, and the Ichg current average is 40 mA per hour for 6 hours. The added charge resulting from the 8 hours of daylight is Cchg=(40 mA×6 Hr)/1.2=200 mAh. The drain is calculated as Idis=40 mA/1.5=26.7 mA. The nighttime LED illumination is predicted to be Tnight=200 mAh/26.7 mA=7.5 hrs. The recharge in this example creates a discharge capability of 26.7 mA×7.5 hrs=200.25 mA. Since Idis is an average current, the instantaneous Idis current may vary and yield the same illumination period. The illumination may be 30 mA for 5 hours and 20.1 mA for 2.5 hours or 32 mA for 2 hours, 29 mA for 4 hours, and 13.5 mA for 1.5 hours. These are practically the same regarding the recharge amount. In the first case, the discharge capability is (30 mA×5 hrs+20.1 mA×2.5 hrs)/1.2=176 mAh. In the second case the discharge capability is (32 mA×2 hrs+29 mA×4 hrs+13.5 mA×1.5 hrs)/1.2=176 mAh.

A novel feature of many embodiments may be the synergistic combination of the incompatible solar panel and the safety device. This innovation gives my light the following desired characteristics:

a. when located in Category 1 shade or dimmer, it may sufficiently recharge the storage device to illuminate a pathway with an LED continuously for at least 6 to 10 hours or more each night;

b. it may sufficiently recharge a battery in shade to avoid accelerated battery aging;

c. the solar panel may compensate a voltage drop caused by the recharging switch and/or an impedance device of the safety device;

d. the safety device may compensate for declining output of the solar panel due to aging; and e. the reliability and cost of the safety device is improved by decreased power dissipation.

In some embodiments, the solar pathway light may operate indefinitely in Category 1 shade or dimmer. It includes, but not limited to, an LED, a rechargeable battery, a recharging switch, a discharging switch, a control signal, a safety device, and a solar panel which is incompatible with the rechargeable battery. The solar panel is in the Category 1 shade or dimmer. By day, the control signal closes the recharging switch and opens the discharging switch to enable the solar panel to recharge the rechargeable battery. At night, the control signal opens the recharging switch and closes the discharging switch to enable the rechargeable battery to illuminate the LED.

In some embodiments, the solar pathway light may be for an environment that has predetermined durations of day and night. It includes, but not limited to, an LED, a rechargeable battery, an incompatible solar panel, and a safety device. The incompatible solar panel recharges the rechargeable battery. The rechargeable battery illuminates the LED. The safety device cooperates with the environment to control the charge in the rechargeable battery.

In some embodiments, the solar pathway light includes, but not limited to, an LED, a rechargeable battery, an incompatible solar panel, a discharging switch, and a twilight resistor. The incompatible solar panel recharges the rechargeable battery. The discharging switch conveys current from the rechargeable battery to the LED to illuminate the LED. The discharging switch is responsive to the luminosity of ambient light and the resistance value of the twilight resistor.

In some embodiments, the luminosity of scattered sunlight in the Category 1 shade or dimmer is at most 900 FC. In some embodiments, the battery illuminates the LED continuously for at least 5 hours each night. In some embodiments, the Category 1 shade or dimmer has a shadow and an unobstructed view of the sky. In some embodiments, the Category 1 shade or dimmer is Category 2 shade having scattered sunlight with luminosity in the range of 250+150/−75 FC. In some embodiments, the luminosity of light in the Category 1 shade is at least 21 times weaker than the luminosity of direct sunlight. In some embodiments, the solar panel is measured per the DS Test Procedure and conforms to the DS Spec (1st and 2nd equations). In some embodiments, the solar panel is measured per the DS Test Procedure and conforms to the DS Spec (1st, 2nd, and 3rd equations). In some embodiments, the solar panel is measured per the Cat1 Test Procedure and conforms to the Cat1 Spec (6th and 7th equations). In some embodiments, the DCR number is at least 20. In some embodiments, the DCR1 number is greater than 0.5. In some embodiments, the twilight resistor includes a LDR. In some embodiments, the solar light further includes a bypass controller for disabling the safety device in low light. In some embodiments, the solar light further includes a twilight controller comprising the twilight resistor. In some embodiments, the solar light further includes hysteresis for turning on the LED at a lower light level than it turns off. In some embodiments, the safety device includes a current limiter for decreasing a current flowing into the rechargeable storage device. In some embodiments, the safety device includes a discharge regulator for drawing current from the rechargeable storage device. In some embodiments, the safety device has a current limiting resistor for decreasing a charging current. In some embodiments, the safety device limits the solar panel output current to at most 25% of the rechargeable battery capacity when the solar panel is in direct sunlight. In some embodiments, the safety device comprises the recharging switch. In some embodiments, the safety device includes a current timer to manage parameters of recharging. In some embodiments, the safety device includes a shunt regulator to decrease a current flowing into the rechargeable storage device. In some embodiments, the safety device includes a solar charge controller to decrease a charging current. In some embodiments, the solar light further includes a solar IC comprising a gated oscillator, the recharging switch, and the discharging switch. In some embodiments, the solar light further includes discrete components comprising the recharging switch and the discharging switch. In some embodiments, the solar light further includes a gated oscillator comprising the discharging switch. In some embodiments, the solar light further includes an inverting gate comprising the discharging switch. In some embodiments, the discharge current is greater than 10 mA while the LED is illuminated. In some embodiments, the normalized short-circuit output current of the solar panel in direct sunlight is at least 500 mA. In some embodiments, the nominal battery voltage is at least 1.2V. In some embodiments, the nominal battery voltage is at least 3.2V. In some embodiments, the solar light further includes a stake for supporting the solar panel in the ground. In some embodiments, the solar light further includes a stake for supporting it in the ground. In some embodiments, the power dissipation of each electrical components in the safety device is less than 50% of its absolute maximum rating per its datasheet.

FIG. 1 is a perspective view showing an exemplary solar pathway light in category 3 shade, in accordance with an embodiment of the present invention. In the present embodiment, the solar pathway light may receive no direct sunlight for several months. A large tree (not shown) spans over a house and blocks the sky view. A fence and a group of nearby bushes (not shown) block light from entering sideways into the area. This is a challenging location for solar power because the scattered sunlight may be less than 200 Foot-Candles (FC) in luminosity. The present embodiment may include a pathway light 105. It was purchased from a hardware store and modified extensively to build a prototype. On top of the Light 105 is an Original Solar Panel 109 that was disconnected from an internal Circuit Board 702 (shown in FIG. 7). An Incompatible Solar Panel 102 may be mounted on a Tube 103 which has a removable plastic stake attached to the bottom. The stake is not shown because it is pushed into the ground below the Tube 103. A 2-conductor Wire 104, 42 inches long, goes from the Solar Panel 102, through the Tube 103, across the ground, through another Tube 106, and into the Pathway Light 105. Another removable plastic Stake 607 may be attached to bottom of the Tube 106. It may also be pushed in the ground and may be seen in a perspective view in FIG. 6. The stakes may enable the light and solar panel to be easily moved and supported upright. The stakes may be pushed into the ground where pathway lighting is desired.

Figure 2:
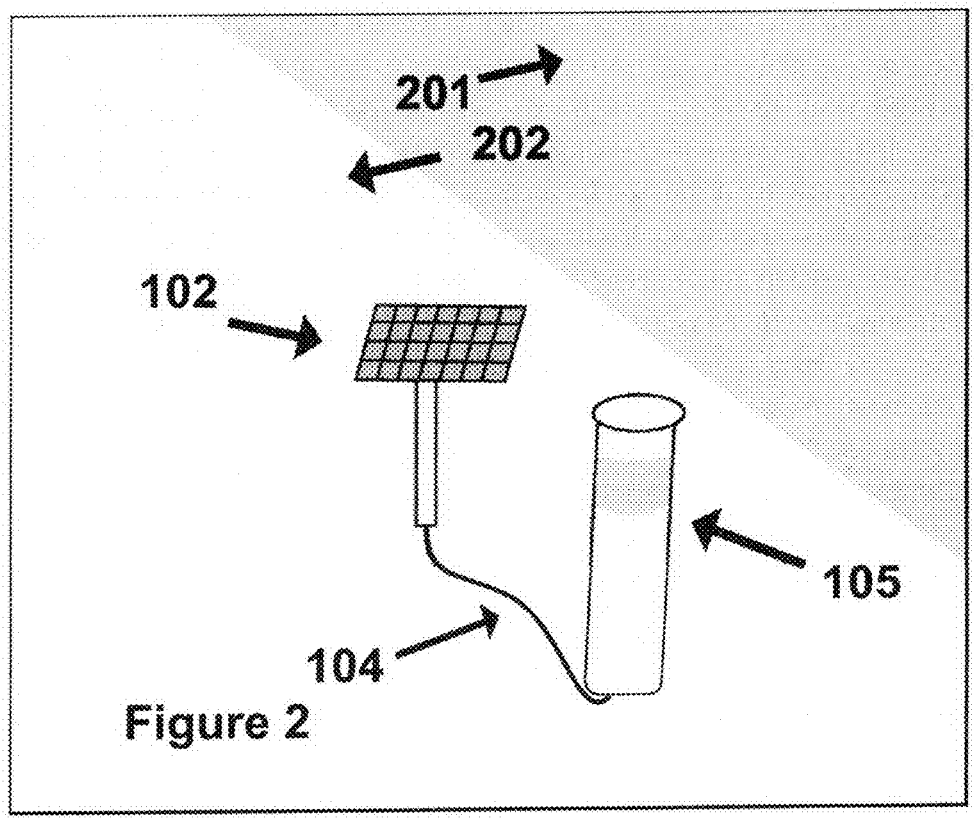
FIG. 2 is a perspective view showing an exemplary solar pathway light in direct sunlight, in accordance with an embodiment of the present invention.

FIG. 2 is a perspective view showing an exemplary solar pathway light in direct sunlight, in accordance with an embodiment of the present invention. This location is not shade due to the direct sunlight. A Category 1 Shade 201 is nearby. This solar light is not in shade. The Solar Panel 102 is receiving direct sunlight which is diminished in intensity because it strikes the Solar Panel 102 at an oblique angle.

Figure 3:
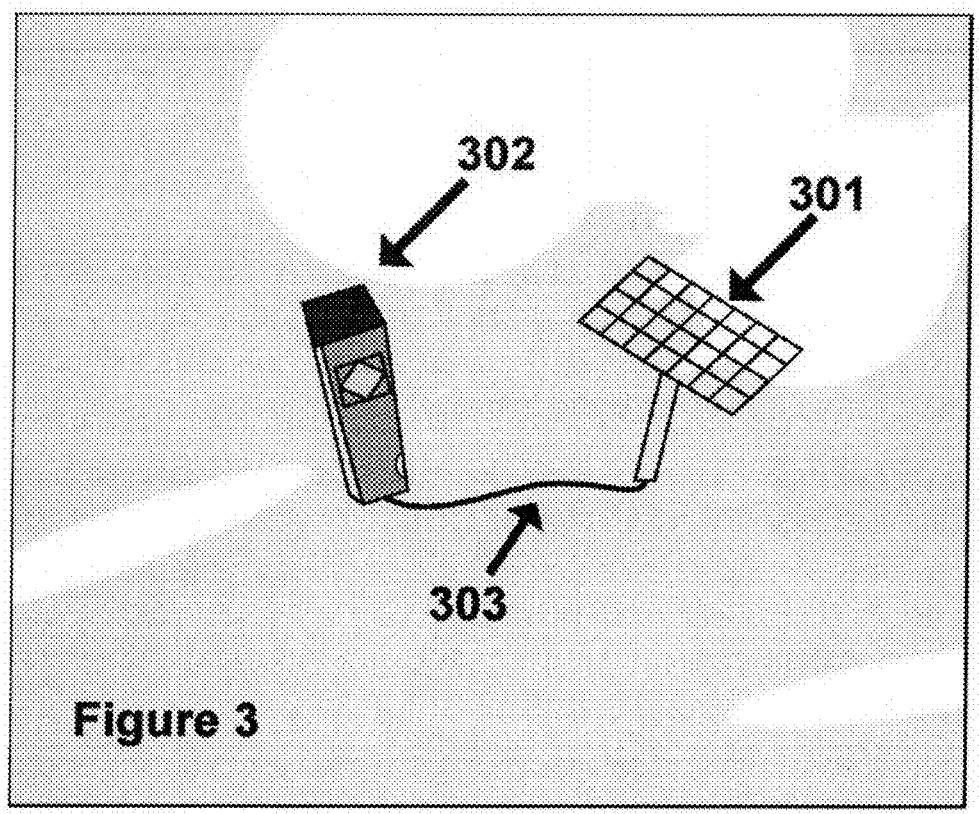
FIG. 3 is a perspective view showing an exemplary solar pathway light in category 3 shade, in accordance with an embodiment of the present invention.

FIG. 3 is a perspective view showing an exemplary solar pathway light in category 3 shade, in accordance with an embodiment of the present invention. In the present embodiment, the light may be located in a deciduous forest. In summer this location has multiple bushes and trees creating shadows. It is Category 3 with patches of direct sunlight that occasionally pass through the area during the day and strike the Solar Panel 102. The sunlight patches are not shade and may not be categorized. In winter, when the weather is clear, this location has direct sunlight and is not shade due to a lack of leaves on the trees.

Changes in the shading objects may affect the numerical index of any shade category. A deciduous tree has leaves in summer which may create a greater category index than in winter. In a non-limiting example, the shaded area of FIG. 18 may become Category 3 in summer if the foliage is so dense that light cannot filter through it sufficiently to maintain the Category 2 brightness. Or, the shaded area of FIG. 20 may become Category 1 in winter after leaves are fallen if the sky view is sufficiently unobstructed.

Changes in weather conditions may temporarily affect the numerical index of any shade category. Clouds, fog, humidity, rain, snow, etc. may increase the index. An overcast sky adds numerically to any shade category. A cloudy or overcast day may add 1 point making Category 1 become Category 2, Category 2 become Category 3, etc. Extremely heavy overcast can add 1.5 to 2 points or more. Thin clouds may add less than 1 point. In some parts of the world, such as, without limitation, Seattle, Wash., overcast may last for extended periods of time such as weeks or months. Clouds or overcast may produce the opposite effect. They may temporarily make a shaded area brighter by reflecting scattered sunlight into it. This phenomenon may be stronger when the sun is lower in the sky.

Changes in the orientation of the Solar Panel 102, or the sensor of a light meter, may affect the numerical index number of any shade category. In a non-limiting example, the shaded area of FIG. 20 may be Category 1 near its outer edge if the Solar Panel 102 is angled to project the sky view upward toward the sky and outward away from the Tree 2001. The angle can give the Solar Panel 102 an unobstructed sky view.

The time of day may affect the numerical index of any shade category. In morning or evening, for example, without limitation, Category 1 may be dimmer due to a low sun angle. But a nominal category index number may be assigned to a shaded area by its characteristics at noon.

Any shaded area may be Category 4 when objects, weather, or other factors make it so dim that its dimness triggers the Pathway Light 105 to illuminate its LED before sunset. The low ambient light of Category 4 may give a false trigger to the pathway light, whose low-light threshold is misled into activating too soon by the dimness. A characteristic of Category 4 shade is that it may illuminate the LED before sunset.

Precise measurements of ambient light in shade, in direct sunlight, and in other areas may be made with a light meter. The light meter's sensor may be located where a solar panel would normally be. The light measurements may be recorded, listed by increasing dimness (decreasing light intensity measurements), and then grouped into shade categories having similar readings. Limits can be created to define each category. Unknown shade locations may then be classified per the limits defined. Transitions between adjacent categories may be gradual and not abrupt. A margin of error (plus/minus tolerance limits) for each category can be applied. Overlaps between category limits is acceptable. Ambient light may include scattered sunlight which may have, for example without limitation, sunlight deflected from a straight path by a) irregularities in a propagation medium such as air, b) particles such as water vapor or dust, and/or c) a boundary between two media such as clear sky and clouds. Scattered sunlight may also include, for example without limitation, sunlight with deviations of reflection due to irregularities on a surface such as bushes and/or light deviated by passing through an opaque material such as leaves. Scattered light, whether sunlight or not, has irregularities which are random and dense enough that individual effects of straight path rays are averaged out. Ambient light may also include, without limitation, direct sunlight (which has insubstantial scattering and strikes the solar panel or sensor squarely or obliquely) and low light (or low ambient light), which may include the light of artificial sources (such as grid powered lights or flashlights), the light of a fire, the light of other solar lights, and moonlight. Low light may be weaker and less diffused than scattered sunlight. Low light and scattered sunlight are much less energetic than direct sunlight, which may have 21 times greater luminosity than the ambient light of Category 1 shade.

Figure 4:
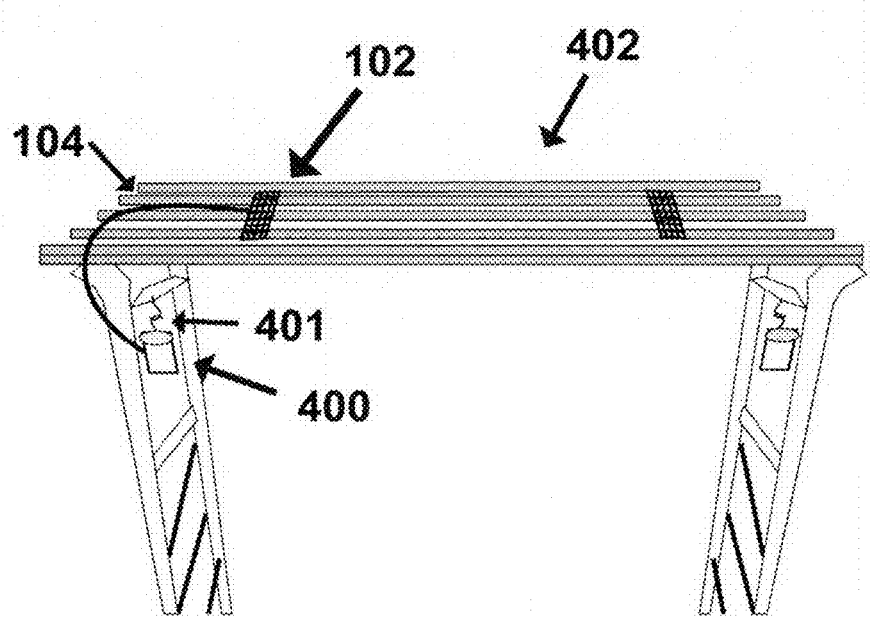
FIG. 4 is a perspective view showing an exemplary solar pathway light in category 2 shade, in accordance with an embodiment of the present invention.

FIG. 4 is a perspective view showing an exemplary solar pathway light in category 2 shade, in accordance with an embodiment of the present invention. FIG. 4 shows another embodiment known as a Hanging Pathway Light 400. It has a Hook 401 on its top. The Hook 401 hangs on another hook attached to a Trellis 402. The Incompatible Solar Panel 102 is on top of the Trellis 402. The Wire 104 connects the Panel 102 to the Light 400. The shaded area is Category 2. It has patches of direct sunlight which are not shade.

Figure 5:
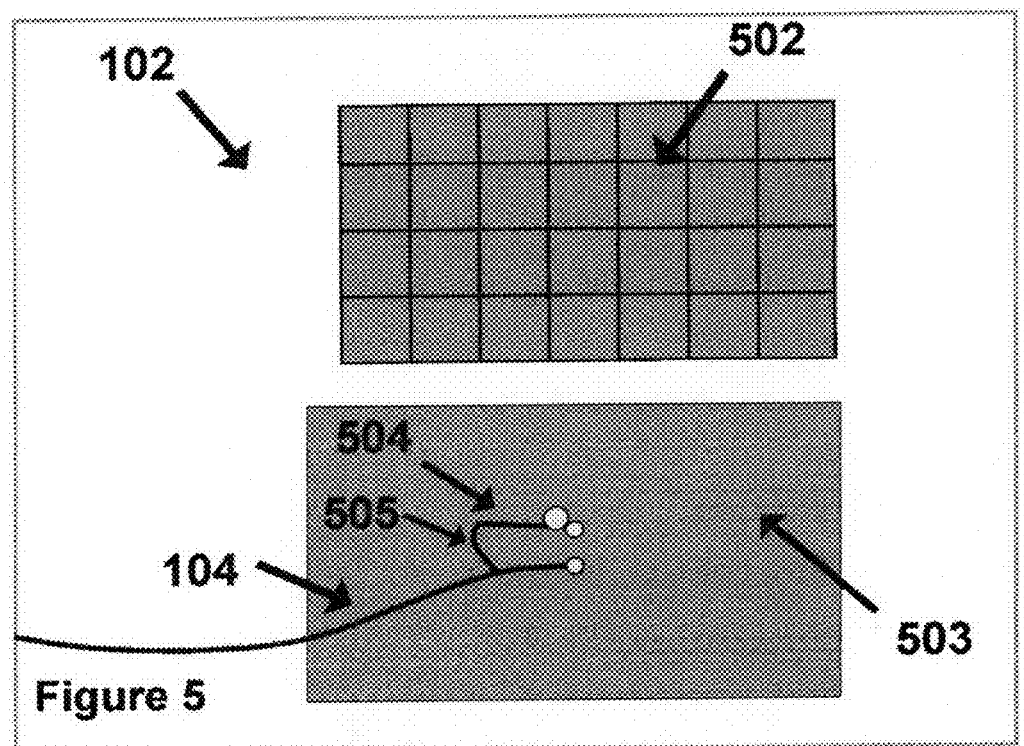
FIG. 5 is a perspective view showing a front and back sides of a solar panel, in accordance with an embodiment of the present invention.

FIG. 5 is a perspective view showing a front and back sides of a solar panel, in accordance with an embodiment of the present invention. FIG. 5 shows two views of the Incompatible Solar Panels 102. The Front Side 502 is the top view. The Back Side 503 is the bottom view. The Front Side 502 receives light and converts it to electrical energy. The Back Side 503 has the Tube 103 (of FIG. 1) removed to show a Safety Device 504 for impeding the flow of solar current from the solar panel.

Figure 6:
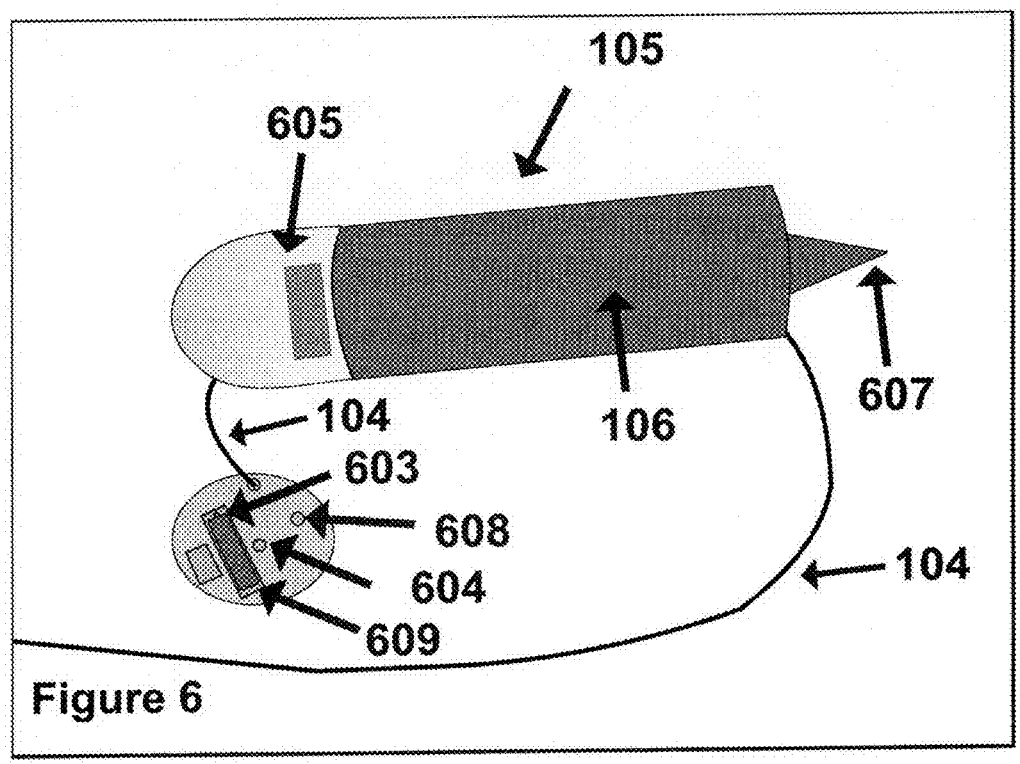
FIG. 6 is a perspective view showing an embodiment disassembled, in accordance with an embodiment of the present invention.

FIG. 6 is a perspective view showing an embodiment disassembled, in accordance with an embodiment of the present invention. FIG. 6 shows a perspective view of a Rechargeable Battery 603, which is a non-limiting example of a Rechargeable Storage Device 3200 of FIG. 32, the Battery Switch 608, and the LED 604. The Battery Switch 608 may be a mechanical device such as, but not limited to, a slide switch as shown. Or it may be a toggle switch, an electronic device such as, but not limited to, a transistor, or a Battery Holder 609.

Figure 7:
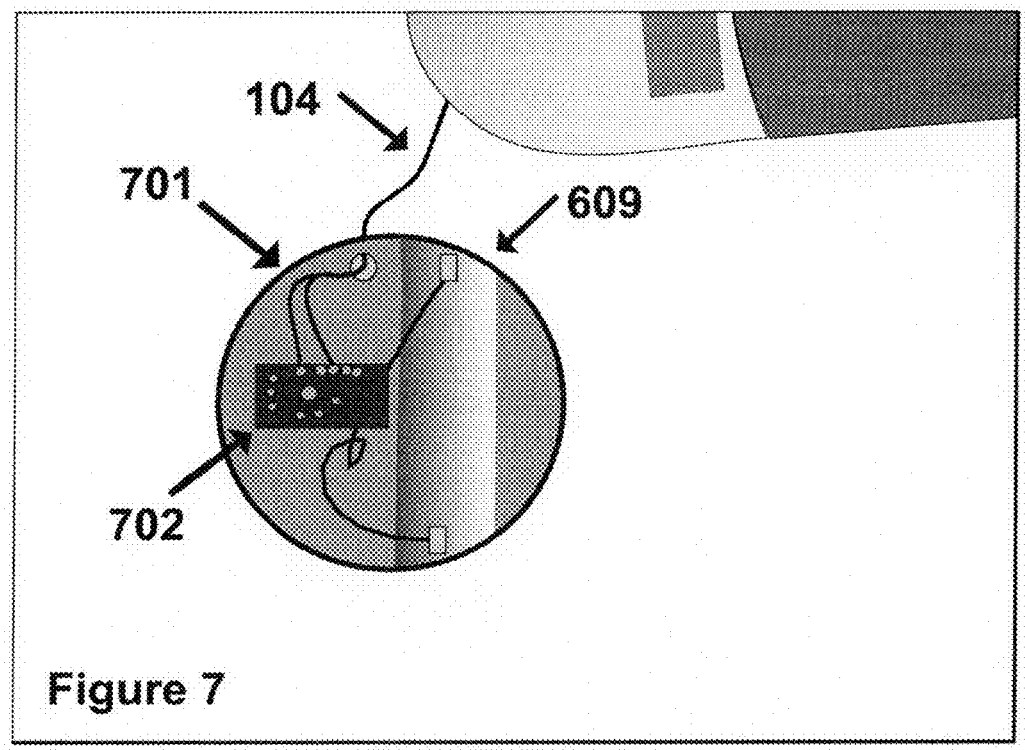
FIG. 7 shows a rear perspective view, in accordance with an embodiment of the present invention.

FIG. 7 shows a rear perspective view, in accordance with an embodiment of the present invention. When the Battery 603 is removed from the Battery Holder 609, the Battery Switch 608 is open, in effect. The Battery Switch 608 is closed, in effect, by installing the Battery 603 into the Battery Holder 609. A wire 701 is the end of wire 104 and is connected to circuit board 702.

Figure 8:
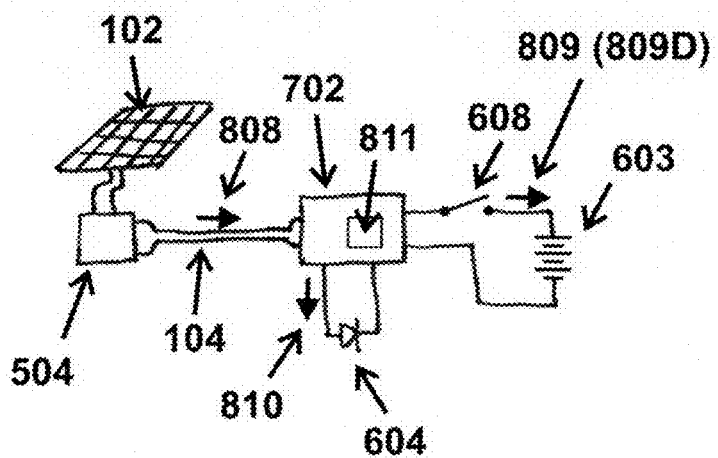
FIG. 8 is an exemplary schematic diagram of a pathway light, in accordance with an embodiment of the present invention.

FIG. 8 is an exemplary schematic diagram of a pathway light, in accordance with an embodiment of the present invention. FIG. 8 is an exemplary schematic diagram of the Pathway Light 105. It shows the Circuit Board 702, a Solar IC 811, the Safety Device 504, the Wire 104, a Solar Current 808 that flows in the Wire 104 when the Solar Panel 102 is exposed to light, the LED 604, an LED Current 810 that flows when the LED 604 is illuminated, a Battery Switch 608, the Rechargeable Battery 603, and a Charging Current 809 (Ichg) that flows to recharge the Battery 603. There is also a Discharge Current 809D (Idis) that flows in the opposite direction of the Current 809 when the Battery 603 is discharging and illuminating the LED 604 in the Illumination Mode. An arrow for the Current 809D is not shown because it simply points in the opposite direction as the Current 809 arrow. The Battery 603 may be a single cell 1.2V NiMH with 400 mAh capacity.

The Solar IC 811 is a part number YX8018. Its operation is explained in the YX8018 datasheet. The schematic diagram of the Circuit Board 702 is shown in the datasheet as the top left schematic on page 3, although any of the schematics may be modified to operate with the Solar Panel 102 and the Safety Device 504.

The Circuit Board 702 has an inductor connected between terminals 4 and 1 of the Solar IC 811. The LED 604 is connected between terminal 1 of the IC and a ground terminal. The Battery 603 is connected between the Battery Switch 608 and a ground terminal. The Battery Switch 608 switch is connected between the Battery 603 and the terminal 4 of the IC. The Safety Device 504 and the Solar Panel 102 are connected to terminals 4 and 3 of the IC via the Wire 104. (The Original Solar Panel 109 used to be connected to terminals 4 and 3.)

When the Battery Switch 608 is closed, the Circuit Board 702 automatically enters a Charging Mode at sunrise and an Illumination Mode at sunset. In the Charging Mode, the Solar Current 808 originates in the Solar Panel 102 as the solar panel output current Ipo. The current flows into the Safety Device 504 and then into the Circuit Board 702 via the Wire 104. When the Solar Current 808 is flowing, it triggers the Solar IC 811 to turn on (close) its recharging switch and turn off (open) its discharging switch. The Solar Current 808 is split. Most of the current flows out of the Circuit Board 702 to Battery 603. This current is shown as the Charging Current 809. A remaining small portion of the current flows into the Solar IC 811 to power its internal circuits. The Current 809 is practically equal to the Solar Current 808 because the Solar IC 811 consumes very little power in the Charging Mode.

At sunset, the Solar Current 808 decreases below a Low-Light Current Threshold (Ithic), which is predetermined by the manufacturer the Solar IC 811. The Solar IC turns off the recharging switch when this happens and it turns on the discharging switch. That puts the Circuit Board 702 into the Illumination Mode. The LED Current 810 is enabled and the Battery 603 illuminates the LED 604. The Charging Current 809 is replaced by the Discharge Current 809D (Idis) during the Illumination Mode.

The Battery 603 continues illuminating the LED 604 until sunrise or until the Battery 603 discharges to a voltage of about 0.7V. If the Battery 603 discharges to about 0.7V before sunrise, it means that the Battery 603 did not have enough stored energy to illuminate the LED 604 for the entire night. It also means that the Solar IC 811 stopped the Discharge Current 809D to protect the Battery 603 from damage due to deep discharging. The Solar IC 811 has a predetermined Battery Cutoff Threshold (Vthic) which is set by the manufacturer to a fixed voltage below about 0.75V. The Solar IC 811 turns off the Discharge Current 809D and the LED 604 when the Battery 603 voltage drops below the Vthic.

In the present embodiment, the Incompatible Solar Panel 102 has Iscn=1,160 mA and the Voc=3.83V. The Battery 603 has a nominal voltage Vn=1.2V and a capacity Cn=400 mAh. The Safety Device 504 includes a current limiter that has a current limit Ithc=100 mA and a Vdrop=0.65. The voltage drop of the YX8018 recharging switch may be insignificant.

The Solar Panel 102 conforms to the solar panel DS Spec 1st and 2nd equations, $0.50Cn/0.982 \leq Iscn \leq 250\,C$ and $Voc \geq (1.15Vn+Vdrop)/0.9/0.953$. The calculations are:

$$0.50/hrs \times 400mAh/0.982 \leq Iscn \leq 250/hrs \times 400mAh$$

$$203\,mA \leq 1{,}160\,mA \leq 100{,}000\,mA$$

and, $$Voc \geq (1.15Vn+Vdrop)/0.9/0.953$$

$$3.83V \geq 2.37V$$

and, Voc also conforms to the 3rd equation to decrease the Safety Device 504 power dissipation:

$$Voc \leq (1.15Vn+Vdrop)/0.4$$

$$3.83V \leq 5.08V$$

The 1,160 mA is an unprecedented high amount of charging current for only 400 mAh of battery capacity. It was discovered that the Battery 603 may be protected from substantial overcharging by limiting the Charging Current 809 to 25% of the battery capacity Cn or less. The 25% has a unit of 1/hrs. Substantial overcharging of the Battery 603 happens when the battery recharge Cchg is greater than the nominal battery capacity Cn to an extent that is greater than the prior lights are capable of. The battery charge can be estimated. It is Cchg=Ichg×T/1.2, where Ichg is the average charging current in mA during the time interval T in hours.

Figure 9:
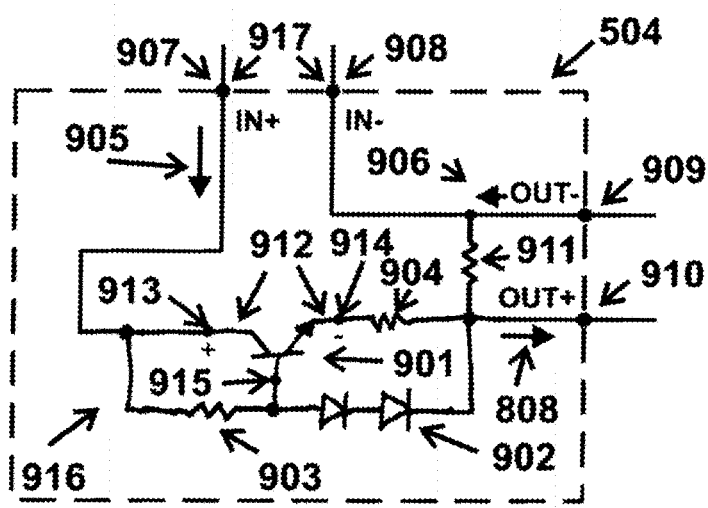
FIG. 9 is an exemplary schematic diagram of a safety device with an impedance device referred to as a current limiter, in accordance with an embodiment of the present invention.

FIG. 9 is an exemplary schematic diagram of a current-limiter safety device, in accordance with an embodiment of the present invention. FIG. 9 is a schematic diagram of the Safety Device 504. It may limit the Solar Panel Output Current 905 and the Charging Current 809 to a safe level that prevents substantially overcharging the Battery 603. It may also protect the Solar IC 811 from damage that could be caused by too much charging current flowing through its recharging switch.

The Safety Device 504 includes a Current Limiter 916 with a constant current source topology that includes a Bias Resistor 903, a Transistor 901, a Base Terminal 915, a Collector Terminal 913, an Emitter Terminal 914, a Current Sensing Resistor 904, and Voltage Reference Diodes 902. The Current Limiter 916 also has Input Terminals 907 and 908 which are connected to positive and negative output terminals of the Solar Panel 102 respectively, and Output Terminals 909 and 910 which are connected to the Circuit Board 702 via the Wire 102. The Solar Panel Output Voltage 917, Vpo, and the Solar Panel Output Current 905, Ipo, are applied to the Input Terminals 907 and 908. The Ipo current flows into the Safety Device 504 via the Terminal 907. The Current 905 passes through the Transistor 901 and exists the Safety Device 504 via Terminal 910, where it is referred to as the Solar Current 808. The Safety Device 504 also has a Twilight Resistor 911 for adjusting the Ithic threshold.

The Current Limiter 916 has two operating modes—an Active Mode and an Inactive Mode. In the Active Mode, it operates by providing an overall voltage drop (Vsafety) that adjusts to the incoming Current 905. The Vsafety voltage can be measured with a voltmeter connected between Terminals 907 and 910. The Vsafety voltage resists the incoming Current 905 by automatically increasing or decreasing as needed to keep the current at a predetermined limit, Ithc. The Ithc current limit is set by the resistance value of the Resistor 904. The higher the resistance, the lower the limit. The theoretical limit for the preferred embodiment is 15% of the battery capacity Cn. That is Ithc=0.15/hrs×400 mAh=60 mA.

In the Inactive Mode, the Vsafety voltage is equal to about one Vbe. It is referred to as the Vdrop voltage. One Vbe is the lowest value that the Vsafety ever has during normal operation. In the Inactive Mode, Vsafety=Vdrop, which is about one Vbe. In the Active Mode, Vsafety>Vdrop.

The Current Limiter 916 enters the Inactive Mode when the Solar Panel 102 is in shade because the Current 905 is typically less than 60 mA. The current passes through the limiter and is only minorly affected by the Vdrop voltage. The Current 905 flows into the Collector Terminal 913, the Resistor 903, the Base Terminal 915, and out through the Emitter Terminal 914, and the Resistor 904. The main constituent of the Vdrop voltage is a PN junction voltage (Vbe) between the Base Terminal 915 and the Emitter Terminal 914. The Transistor 901 is in saturation so the Collector Terminal 913 is at the same voltage potential as the Base Terminal 915. The Voltage Reference Diodes 902 are non-conducting so practically all the Current 808 passes through the Resistor 904. This sets the Vdrop equal to the Vbe plus a smaller voltage drop produced by the Current 808 passing through the Resistor 904.

The Current Limiter 916 enters the Active Mode when the Solar Panel 102 is in direct sunlight because the Vpo voltage increases and the Current 905 has the potential to be 1000 mA or more. The Transistor comes out of saturation and goes into a linear mode. It creates a Transistor Voltage 912 between the Collector Terminal 913 and the Emitter Terminal 914. The Voltage 912 adjusts automatically in response to the change in Vpo voltage, and increases the Vsafety voltage to oppose the Current 905. The more that Vpo increases, the greater is the Voltage 912. The limiter acts like a variable resistor that automatically increases in resistance value and limits the output Current 808 to approximately Ithc, which is 60 mA. The Vsafety voltage is equal to the Transistor Voltage 912 plus a smaller voltage drop of about one Vbe or less from the Resistor 904.

In the Active Mode, the power dissipation of the Safety Device 504 is Psd=Vsafety×60 mA. The Transistor 901 handles has most of power because the Transistor Voltage 912 is the greater constituent of the Vsafety voltage. The power dissipation can dramatically affect the Transistor 901, elevating its temperature and potentially decreasing its reliability and service life. For this reason, the present embodiment insures that the Vpo voltage does not increase too much when the Solar Panel 102 is in direct sunlight.

The 3rd equation of the DS spec provides the assurance. It limits the Vpo voltage of the Solar Panel 102 to an acceptable level by putting an upper limit on the solar panel's open-circuit voltage, Voc. It decreases the transistor's power dissipation and improves the reliability of the Safety Device 504.

As previously disclosed, the Solar Panel 102 may be incompatible with the Battery 603 due to the panel's high output current Iscn. The Solar Panel 102 may also be incompatible with the Solar IC 811 in two aspects. The first is the IC's current handling capability. The second is the IC's low-light current threshold, Ithic, which controls the IC's mode of operation.

The current handling capability of the IC is such that it may not tolerate a solar current of 1,160 mA without being damaged. The Safety Device 504 prevents damage. It limits the Solar Current 808 to 60 mA to control the charge in the Battery 603 and to protect the Solar IC 811 from overcurrent damage.

The IC's low-light current threshold is set too low by the IC manufacturer. The Ithic threshold is the transition point in the Solar Current 808 where the IC changes between the Charging Mode and the Illumination Mode. When the Solar Current 808 is above the threshold, the IC is in the Charging Mode and the LED 604 is off. When the Solar Current 808 is below the threshold, the IC is in the Illumination Mode and the LED 604 is on.

The IC is designed for a solar panel that is smaller than the Solar Panel 102 and has much lower output. Consequently, the IC is overly sensitive to low light because the Solar Panel 102 produces more Solar Current 808 in low light. This can cause an unexpected result by allowing the light of a nearby fire pit flame, campfire, or other solar light to interfere with the IC's illumination mode and turn off the LED 604 at night. The LED 604 can flash in sync with flicking flames. This adverse effect can be eliminated by the Twilight Resistor 911 bypassing some of the Solar Current 808 around the solar IC, which has the effect of moving the threshold to a higher level. The lower the resistance value, the higher the threshold, and the less vulnerable the IC is to low light making the LED flash or turn off.

Figure 10:
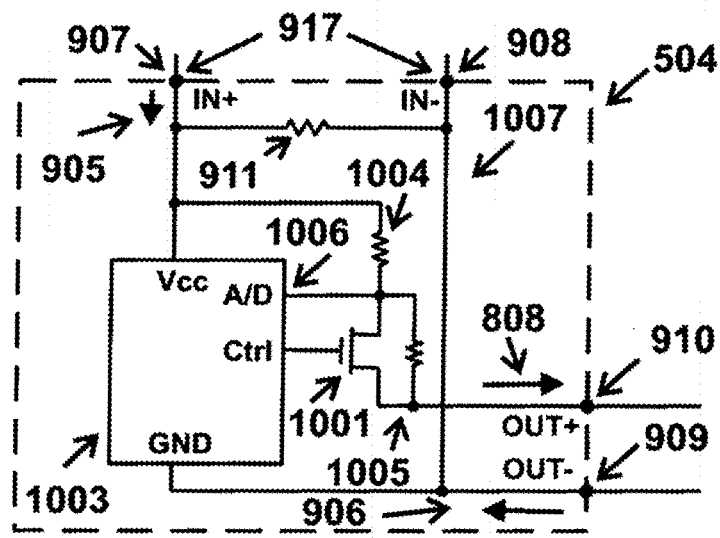
FIG. 10 is an exemplary schematic diagram of the Safety Device 504 with an impedance device referred to as a current timer, in accordance with an embodiment of the present invention.

FIG. 10 is an exemplary schematic diagram of the Safety Device 504 with a current timer, in accordance with an embodiment of the present invention. FIG. 10 is a schematic diagram of the Safety Device 504 with a Current Timer 1007. It has a Microcomputer IC 1003, a MOSFET Transistor Switch 1001, and a Current Sensing Resistor 1004. At sunrise, light hits the Solar Panel 102 and the Solar Panel Output Voltage 917, Vpo, and the Solar Panel Output Current 905, Ipo, are at Terminals 907 and 908. The Vpo voltage initializes the MCU 1003 which turns on the Transistor 1001 via its Ctrl output. The Current 808 flows to the Circuit Board 702, via the Resistor 1004 and the Transistor 1001, and then into the Battery 603. A Current 906 returns from the Battery 603 and Circuit Board 702 back to the Solar Panel 102. The Currents 808 and 906 are equal. The MCU 1003 is active and measures a current-sense voltage that occurs across the Resistor 1004 caused by the Current 808 flowing through. The current-sense voltage is proportional to the Current 808. The current-sense voltage is measured by the MCU 1003 via an A/D Converter Input 1006.

The MCU 1003 has firmware that calculates a current-time number that is proportional to the recharge Cchg added to storage. It is the multiplication of time in hours and the voltage across Resistor 1004. It quantifies the progress of the recharging. The current-time number can be calculated like the recharge Cchg in the example above, as a summation of current-time samples. The MCU 1003 turns off the Transistor 1001, in response to the current-time number exceeding a predetermined current-time threshold. By turning off the Transistor 1001, the current timer prevents substantially overcharging the Battery 603. A Bypass Resistor 1005 lets enough current flow around the turned-off Transistor 1001 until sunset so that the Solar IC 811 does not turn on the LED 604 when the Transistor 1001 is turned off. When the light diminishes at sunset, the MCU 1003 loses power and it shuts down until the procedure begins again with the next sunrise. The Transistor 1001 functions as an on-off switch so it therefore dissipates practically no power.

In this embodiment of the current timer, the firmware may not limit the Charging Current 809 to a fixed magnitude like the constant current source does. Instead, it allows the Current 905 to flow unrestricted to the Circuit Board 702 and the Battery 603 for a while after sunrise. When the current-time number reaches the predetermined current-time threshold, the MCU 1003 turns off the Transistor 1001 which disables the Charging Current 809.

The firmware sets the duration of a battery charging time interval to be inversely proportional to the magnitude of the Current 906. The Transistor 1001 is turned on during the battery charging time interval and turned off otherwise. In a non-limiting example, assume that if the Current 808 is 120 mA, the firmware turns on the Transistor 1001 for 4 hours. And if it is 60 mA, the firmware changes the battery charging interval and lets the Transistor 1001 stay on for 8 hours. In each case, the current-time number reaches a value of 120 mA×4 hours=60 mA×8 hours=480 mAh before the Transistor 1001 is turned off. The predetermined current-time threshold is 480 mAh. The charge added to the battery is Cchg=480 mA-hours/1.2=400 mAh.

In this example, the MCU 1003 firmware is programmed to tally the current-time number in real time. It samples the Resistor 1004 voltage drop periodically and increments the current-time number until it reaches 480 mAh. Then the firmware turns off the Transistor 1001 at 480 mAh. The Current 906 does not have to be constant while the Battery 603 is being recharged. It can vary with the amount of sunlight striking the solar panel. The firmware samples the current, calculates the time elapsed since the previous sample, calculates the product, adds it to the current-time number, and then turns off the Transistor 1001 when the current-time number reaches the predetermined current-time threshold.

In another embodiment of the current timer firmware, the MCU 1003 switches the Transistor 1001 on and off while the Battery 603 is recharging. The switching feature is an addition to the previous firmware embodiment that turns off the when the Transistor 1001 when the current-time number reaches the predetermined current-time threshold. The switching has an effect of decreasing the Solar Current 808 so that the heat created in the Battery 603 due to recharging is decreased. The switching can also protect the Solar IC 811 from being damaged by too much Solar Current 808. In a non-limiting example, assume that the on-time of the Transistor 1001 (Ton) is 4 milliseconds (mS) and the off-time (Toff) is 6 mS. The recharging duty cycle (Dchg) is the Ton divided by Ton plus Toff. Dchg=4 mS/(4 mS+6 mS)=40%. The battery heat created is theoretically 60% less than if the transistor were to be always-on (Dchg=100% duty cycle).

In this embodiment, the firmware can make the current timer like the constant current source with respect to the recharging heat created at the Battery 603. It may adjust the duty cycle in accordance with the average voltage drop at the Resistor 1004 to limit the charging current to a predetermined value, Ithc. More voltage drop across the Resistor 1004 causes lower duty cycle, less voltage drop cause higher duty cycle, resulting in the average Charging Current 809 being limited to the Ithc current limit.

In another embodiment of the solar light, there may be multiple interconnected safety devices to impede the solar current. Any of the impedance devices can be connected in series with each other. If one device fails by becoming a short circuit, the other becomes a fail-safe device. The safety devices can be connected in parallel to improve the overall reliability by sharing any power dissipation between them. Safety devices can also be connected in series-parallel where, for example, without limitation, two impedance devices are in a first parallel-connected set, and two other impedance devices are in a second parallel-connected set. Then both sets are connected in series with each other. The series-parallel connection provides fail-safe operation and improved reliability via shared power dissipation. To connect two safety devices in parallel, connect the Positive Input Terminals 907 of each device. Connect the Ground Input Terminals 908, if any, of each device. Connect the Positive Output Terminals 910 of each device. Connect the Ground Output Terminals 990, if any, of each device. Likewise, multiple safety devices for discharging the battery can be connected in parallel to share power dissipation.

Another embodiment of the solar light has both kinds of safety devices—at least one impedance device and one discharge regulator. The impedance device impedes the charging current. The discharge regulator manages preparatory discharging. This embodiment can be extremely safe and reliable. The energy storage capacity can be less than would otherwise be required to store a full day of direct-sunlight solar panel output due to the impedance device. The discharge regulator provides a greater margin of safety by ensuring that the rechargeable storage device is made ready for receiving a new recharge. It is beneficial for the discharge regulator to operate in this supporting manner, rather than independently without the impedance device, because a lesser storage capacity is required.

Figure 11:
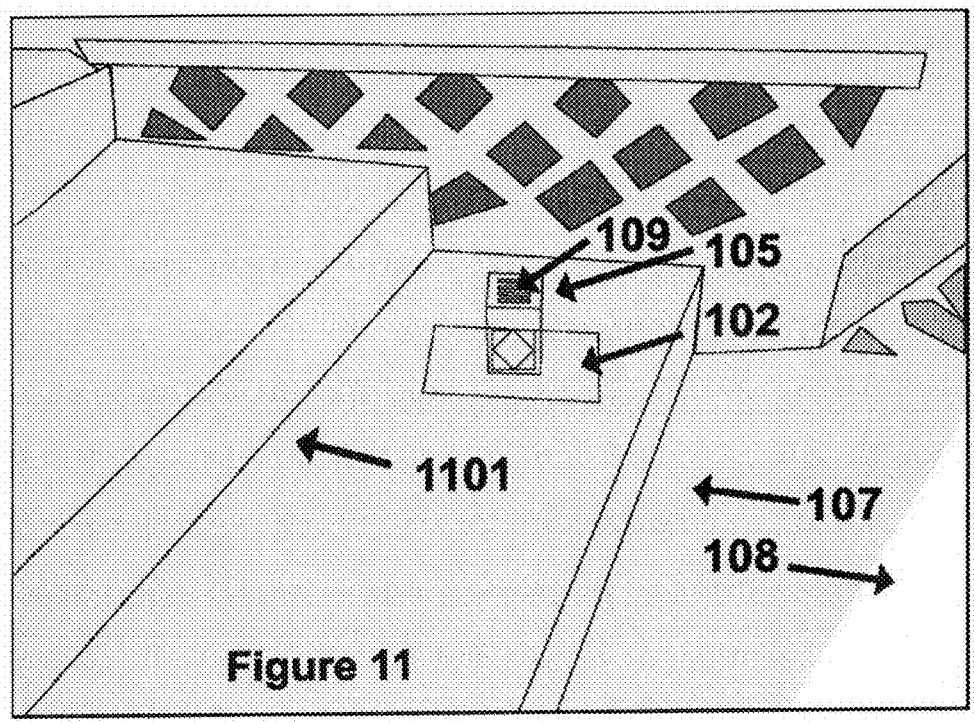
FIG. 11 is a perspective view showing an exemplary solar pathway light in category 1 shade, in accordance with an embodiment of the present invention.

FIG. 11 is a perspective view showing an exemplary solar pathway light in category 1 shade, in accordance with an embodiment of the present invention. It is in Category 1 shade during the day and it illuminates a Concrete Stairway 1101 at night. There are no stakes pushed into the ground. There is no wire tethering the Solar Panel 102 to the Pathway Light 105. The Solar Panel 102 is attached to the underside of the Pathway Light 105. The Wire 104 is hidden from view inside the Pathway Light 105. The Solar Panel 102 is on bottom. There are no active solar cells directly underneath the body of the Pathway Light 105. This embodiment sits on a step. It can be permanently affixed to the hard surface with glue, tape, or fasteners if desired.

Figure 12:
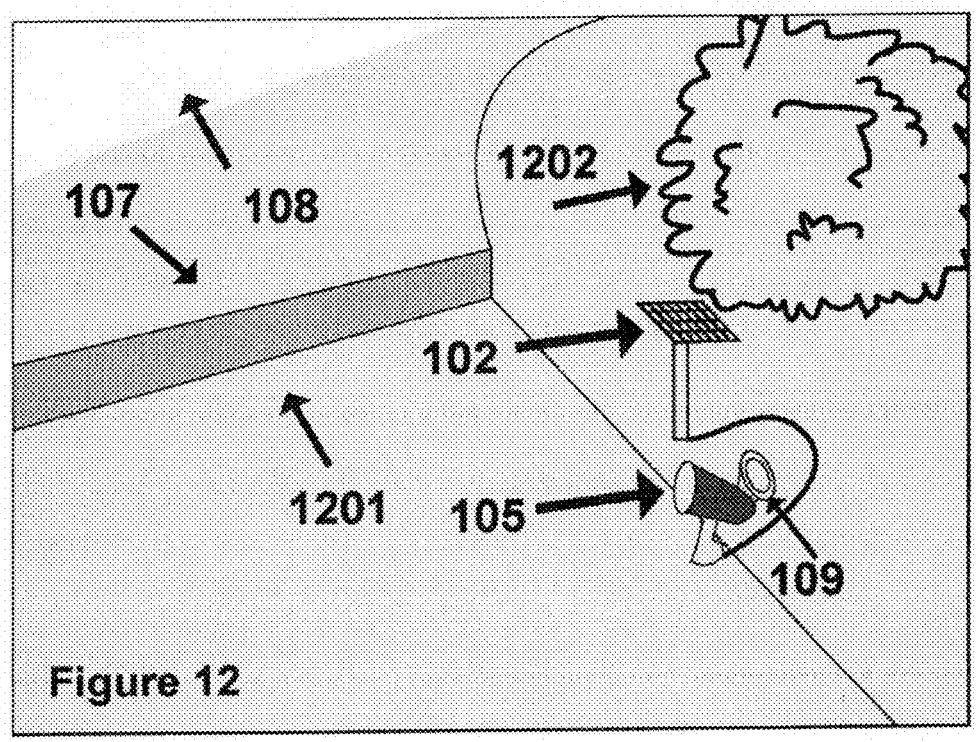
FIG. 12 is a perspective view showing an exemplary solar pathway light located in Category 2 shade, in accordance with an embodiment of the present invention.

FIG. 12 is a perspective view showing an exemplary solar pathway light located in Category 2 shade, in accordance with an embodiment of the present invention. FIG. 12 shows a solar pathway light having a spotlight with a light reflector (not shown) located behind the LED 604. It lights a Concrete Step 1201 at night. The location is Category 2 shade because a nearby Bush 1202 obstructs the sky view of the Solar Panel 102.

Figure 13:
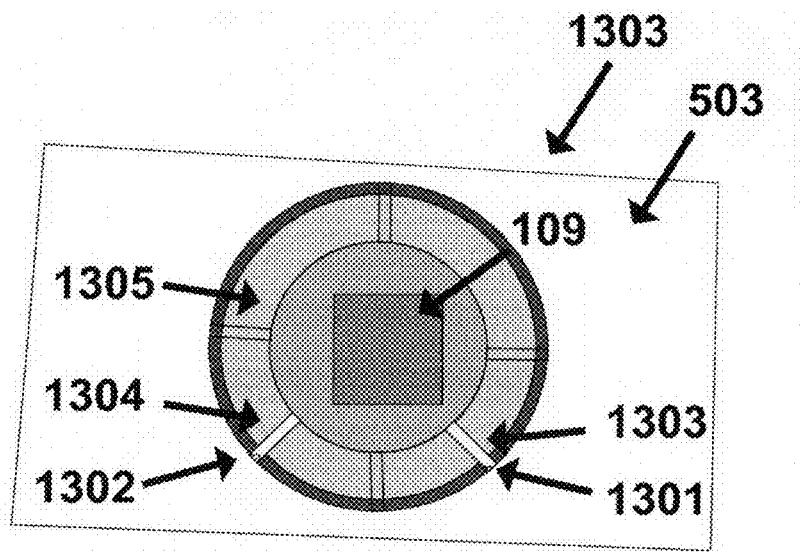
FIG. 13 is a plan view showing the backside a solar pathway light, in accordance with an embodiment of the present invention.

FIG. 13 is a plan view showing the backside a solar pathway light, in accordance with an embodiment of the present invention. The Solar Panel 102 is face-side down in this view. Its light-receiving surface is facing away from the reader. A Solar Step Light 1300 has a Pathway Light Body 1305 affixed to the Back Side 503 of the Solar Panel 102, and two LEDs 1301 and 1302 affixed to two Wire Stems 1303 and 1304 respectively. The stems can be manually bent to change the direction of the light outputs from the LEDs. The LEDs may be connected in series or in parallel. They replace the single LED 604 in the circuit of FIG. 8. The electrical components of FIG. 8 are located inside the Pathway Light Body 1305.

Figure 14:
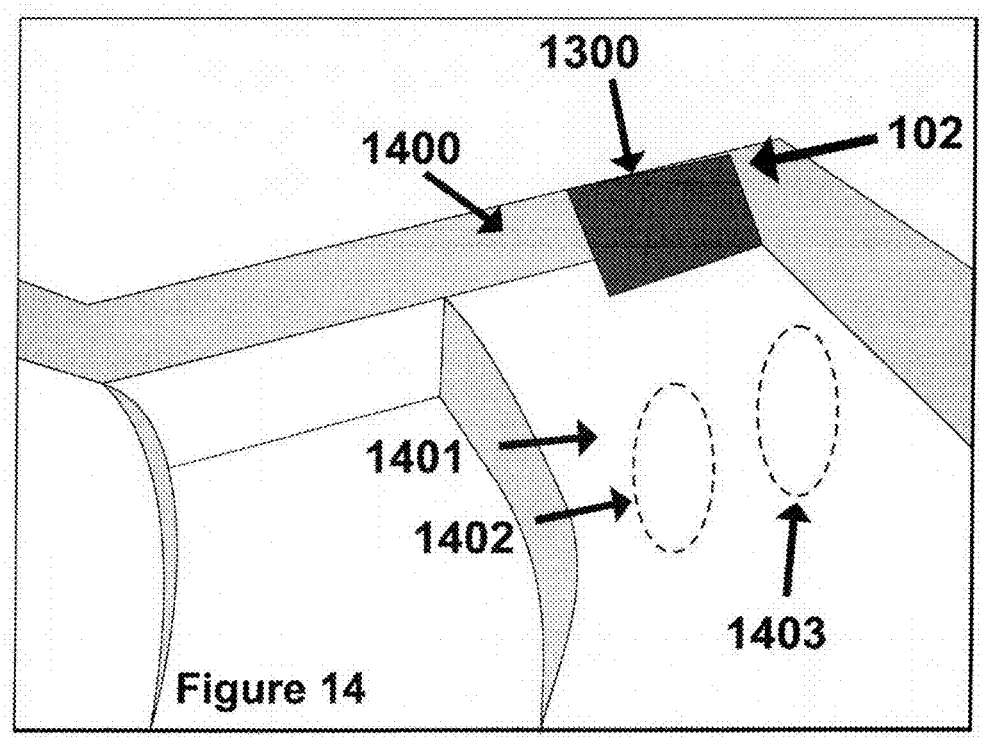
FIG. 14 is a perspective view showing the FIG. 13 embodiment in Category 1 shade, in accordance with an embodiment of the present invention.

FIG. 14 is a perspective view showing the FIG. 13 embodiment in Category 1 shade, in accordance with an embodiment of the present invention. Solar Step Light 1300 illuminates a Concrete Step 1401 at night. The Wire Stems 1303 and 1304 are adjusted as tiny spotlights to cast illumination patterns on the Step 1401. A Pattern of Light 1402 is from the LED A 1301 light beam intersecting the Step 1401. A Pattern of Light 1403 is from the LED B 1302 light beam intersecting the Step 1401.

FIG. 15 is a perspective view showing the FIG. 13 embodiment in Category 1 shade, in accordance with an embodiment of the present invention. Solar Step Light 1300 is moved to a new position on the Wall 1400. The Wire Stems 1303 and 1304 are readjusted to simultaneously illuminates two steps at night. A Pattern of Light 1502 is from the LED A 1301 light beam intersecting the Step 1401. A Pattern of Light 1503 is from the LED B 1302 light beam intersecting the Step 1501.

FIG. 16 is a line drawing showing an example of a Category 1 Shade, in accordance with an embodiment of the present invention. FIG. 16 illustrates an example of a Category 1 Shade 1600. A House 1601 casts a shadow over the Solar Panel 102. A characteristic of Category 1 shade is that it has an unobstructed view of the sky when observed from the Solar Panel 102. The sky view is an imaginary Cone 1603 with an Apex 1605 at the center of the Front Side 502 of the Solar Panel 102, and a Centerline 1604 that is perpendicular to the Front Side 502. The sky view is determined by the size and shape of the Solar Panel 102. The sky view is straight upward when the Solar Panel 102 is flat as shown. If the Solar Panel 102 has a hinge or a pivot joint, then the Centerline 1604 may not be perpendicular to the ground when the Solar Panel 102 is not parallel to the ground. If the Solar Panel 102 is curved, then the Cone 1603 is distorted.

FIG. 17 is a line drawing showing an example of a Category 1 Shade, in accordance with an embodiment of the present invention. FIG. 17 illustrates another example of a Category 1 Shade 1700. It has the Solar Panel 102 in the shadow of a Tall Building 1701. Another shading object, a Tall Building 1702, is in the vicinity. Its shadow does not fall on the Solar Panel 102 but it partially blocks scattered sunlight entering the Solar Panel 102 from the right side. The blockage is not enough to obstruct the sky view. If it did, then the area would be Category 2 instead of Category 1. The Building 1702 does not reflect direct sunlight onto the Solar Panel 102. If it did, then this example would not be shade of any kind and no shade category designation would apply.

FIG. 18 is a line drawing showing an example of a Category 2 Shade, in accordance with an embodiment of the present invention. FIG. 18 illustrates an example of a Category 2 Shade 1800. In addition to the House 1601 and its shadow, there is another shading object, a Large Tree 1801 that spans over the House 1601 and obstructs the sky view. Patches of scattered sunlight may filter through gaps between limbs and leaves of the Tree 1801. The amount of light reaching the Solar Panel 102 is determined by the Tree 1801 density, which is governed by many factors including tree variety, size, shape, height, leaf opacity, number of limbs, and number of leaves.

FIG. 19 is a line drawing showing another example of a Category 2 Shade, in accordance with an embodiment of the present invention. FIG. 19 illustrates another example of a Category 2 Shade 1900. In addition to the House 1601 and its shadow, there is a Brick Fence 1901 which has the Solar Panel 102 nearby. The Brick Fence 1901 obstructs the sky view by bisecting the Cone 1603 and it may cast a shadow over the Solar Panel 102. The obstruction prevents scattered sunlight from entering the Solar Panel 102 from a large enough portion of the sky to achieve Category 1 brightness, even though the sky is visible when viewed upward from the Solar Panel 102 location. The fence's shadow may further decrease the Solar Panel 102 output.

FIG. 20 is a line drawing showing another example of a Category 2 Shade, in accordance with an embodiment of the present invention. FIG. 20 illustrates another example of a Category 2 Shade 2000, which is underneath a Tree 2001 and in its shadow. The Tree 2001 casts a shadow on the Solar Panel 102 and it simultaneously blocks the sky view. Scattered sunlight can enter the shade from any side around the perimeter of the Tree 2001. Scattered sunlight or direct sunlight may filter through the Tree 2001 foliage. The intensity and scattering of the filtered light is governed by the tree density. Some patches of direct sunlight may penetrate the foliage and fall within the shaded area under the tree. The patches are not shade of any kind and no shade category designation applies to them. If the tree density is very low, light may enter through the foliage. It may be scattered by leaves and limbs. That could make the shaded area bright enough, and the sky view clear enough, that the shaded area is Category 1 instead of Category 2. If the leaves are sheer (thin or diaphanous), then direct sunlight may permeate through, cancel the shaded area, and make the area brighter than Category 2 or Category 1, which would make the area not shade and unable to have a shade category assignment.

FIG. 21 shows a line drawing of an example of a Category 3 Shade, in accordance with an embodiment of the present invention. FIG. 21 illustrates an example of a Category 3 Shade 2100. It is like the shaded area of FIG. 20 with the addition of more shading objects, a Group of Bushes 2101, which block some of the light from entering sideways underneath the Tree 2001.

FIG. 22 is a schematic diagram of a simplified embodiment having a Solar IC and a one-resistor safety device, in accordance with an embodiment of the present invention. FIG. 22 shows a schematic diagram of a simplified embodiment of a solar pathway light which has the Solar IC 811 (part number YX8018), the Incompatible Solar Panel 102, the Rechargeable Battery 603, the LED 604, the Battery Switch 608, a Twilight Resistor 911, a Recharging Switch 2201, a Discharging Switch 2202, a Control Signal 2203, an Inductor 2204, a Gated Oscillator 2205, which is a non-limiting example of the Voltage Converter 3201 of FIG. 32, a Low-Light Sensor 2206, and the Safety Device 504 which has a Current Limiting Resistor 2207 for impeding the flow of a Solar Current 808. The nominal battery voltage Vn is less than the forward conduction voltage Vf of the LED. The one-resistor safety device is beneficial due to extremely low cost and high reliability.

When the Battery Switch 608 is closed and scattered sunlight of shade strikes the Solar Panel 102, the solar panel generates a Solar Panel Output Voltage 917, Vpo, and a Solar Panel Output Current 905, Ipo. The Vpo voltage is sufficient to cause the Solar Current 808 to flow with sufficient magnitude to be greater than the low-light current threshold Ithic. The Low-Light Sensor 2206 detects this condition and goes into the Charging Mode where it sets the Control Signal 2203 to close the Recharging Switch 2201 and disable the Gated Oscillator 2205 which opens the Discharging Switch 2202.

The Solar Current 808 flows in a circuit comprising the Recharging Switch 2201, the Solar Panel 102, the Current Limiting Resistor 2207, the Battery Switch 608, and the Battery 603. The Charging Current 809 is practically equal to the Solar Current 808 in magnitude because the Discharging Switch 2202 is opened. In the Charging Mode, the LED 604 is off and the Battery 603 is recharged.

When the light on the Solar Panel 102 diminishes at sunset, the Solar Current 808 drops below the Ithic current threshold. The Low-Light Sensor 2206 goes into the Illumination Mode where it turns off the Recharging Switch 2201 and enables the Gated Oscillator 2205. The Oscillator 2205 repeatedly toggles the Discharging Switch 2202 on and off thousands of times per second. The toggling energizes the Inductor 2204 which converts the battery's DC voltage into multiple higher voltage pulses that illuminate the LED 604. The pulses may be greater than nominal battery voltage Vn and about the same or greater than the forward conduction voltage of the LED 604. The toggling has the effect of closing the discharging switch to convey stored energy to the LED. The Recharging Switch 2201, now opened, disconnects the Battery 603 from the Solar Panel 102 to prevent any battery current from coming into the solar panel.

When the Solar Panel 102 is in twilight or dusk, the Twilight Resistor 911 diverts (shunts) a portion of the solar panel current away from the Low-Light Sensor 2206 in the IC 811. The Twilight Resistor 911 decreases the Solar Current 808 to raise the Ithic current threshold, in effect. Without the Twilight Resistor 911, the Low-Light Sensor 2206 is too sensitive to low light and may allow nearby low-light sources, such as fire pit flames or other solar lights, to change the Illumination Mode to the Recharging Mode, which makes the LED turn off or flash. The Low-Light Sensor 2206 has this hypersensitivity because the Solar Panel 102 produces more low-light output current and voltage than the IC 811 is intended for.

The Current Limiting Resistor 2207 in the Safety Device 504 is an impedance device that limits the Charging Current 809 to 25% of the nominal capacity Cn or less. In other words, Ithc=0.25/hrs×Cn or less, where 0.25 has a unit of 1/hrs. The value of the Resistor 2207 can be determined by this 9th equation, Rsd>=(Voc−Vdrop−Vn)/(0.25×Cn), where Rsd is the resistance value of the Resistor 2207 in Ohms, the Voc voltage is the solar panel direct-sunlight open-circuit output voltage, the Vdrop voltage is the voltage across the Recharging Switch 2201 when it is closed, Vn is the nominal battery voltage, and Cn is the nominal capacity in mAh.

A non-limiting example illustrates the effect of the Current Limiting Resistor 2207 in operation. Assume that Voc=3.83V, Vdrop=0V, Vn=1.2V, and Cn=300 mAh. Ithc=0.25/hrs×300 mAh=75 mA. The Rsd resistance value is therefore at least (3.83V−0V−1.2V)/75 mA=35.1 Ohms. Next assume that the Solar Panel 102 is the X103 device which has 31 mA of Ipo output current and 3.22V of Vpo output voltage in Category 1 shade when the light measurement is 376 FC. The Safety Device 504 tries to limit the Solar Current 808 to (3.22V−1.2V)/35.1 Ohms=57.5 mA, theoretically. But that is more current than the solar panel can provide at 376 FC. So, the Solar Current 808 is limited primarily by the 31 mA of Ipo current output and to a lesser extent, by the Current Limiting Resistor 2207.

Figure 23:
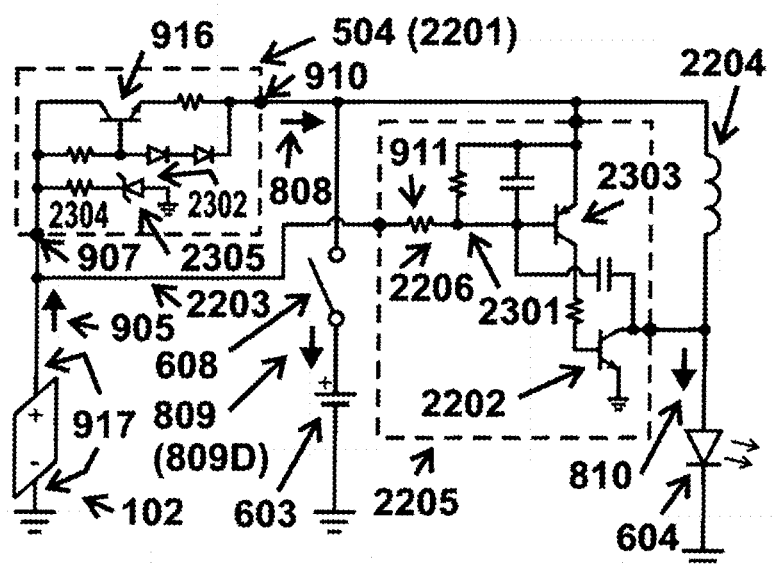
FIG. 23 is a schematic diagram of a simplified embodiment having discrete components, in accordance with an embodiment of the present invention.

FIG. 23 is a schematic diagram of a simplified embodiment having discrete components, in accordance with an embodiment of the present invention. FIG. 23 is a schematic diagram of another simplified embodiment where the Solar IC 811 is replaced by discrete components. It includes, the Incompatible Solar Panel 102, the Rechargeable Battery 603, the LED 604, the Battery Switch 608, the Twilight Resistor 911, a Pullup Resistor 2301, the Discharging Switch 2202, the Control Signal 2203, the Inductor 2204, the Gated Oscillator 2205, the Low-Light Sensor 2206, the Safety Device 504 which includes the impedance device Current Limiter 916, the Low-Light Sensor 2206 which includes a PNP Transistor 2303, and an Optional Shunt Regulator 2302 having a Zener Diode 2305 and an Optional Protection Resistor 2304. This discrete component embodiment operates like the solar-IC embodiment, with some differences.

One difference is that the Safety Device 504 includes the Recharging Switch 2201 because the Current Limiter 916 includes the Transistor 916, which has a PN junction between its base and emitter terminals. The PN junction is a non-limiting example of the Bipolar Device 3202 of FIG. 32. The junction functions like a diode when the Transistor 916 is not limiting the Solar Current 808. The PN junction prevents the Solar Panel 102 from discharging the Battery 603. It prevents current from flowing out of the Battery 603 and into the Solar Panel 102. The PN junction is controlled by the Control Signal 2203, which is the solar panel output voltage Vpo in this embodiment. When the Vpo voltage is less than the battery voltage Vn, the PN junction acts like an open switch. It stops the solar panel from discharging the battery because current can flow through the PN junction from left to right but it cannot flow from right to left. When the Vpo voltage is greater than the battery voltage Vn, the PN junction acts like a closed switch, with a voltage drop of one Vbe, allowing the Solar Current 808 to flow from left to right.

Another difference is that the Twilight Resistor 911 and the Low-Light Sensor 2206 are incorporated into the Gated Oscillator 2205. The PNP Transistor 2303 is in cutoff when the solar panel output voltage Vpo is greater than the battery voltage, i.e. recharging the battery. The Vpo voltage pulls the base input high via the Twilight Resistor 911 cutting of the transistor. When the Vpo voltage decreases, due to the Ipo current decreasing in dim light, the Twilight Resistor 911 draws a small current from the Battery 603 via the base input of the PNP Transistor 2303, which takes the PNP Transistor 2303 out of cutoff. That enables the Gated Oscillator 2205 to oscillate, toggle the Discharging Switch 2202, and illuminate the LED 604.

The Twilight Resistor 911 does not divert the Solar Current 808 from the Low-Light Sensor 2206 like the circuit of FIG. 22. Instead, the Twilight Resistor 911 draws some battery current through the base input, when the Vpo voltage is less than the battery voltage. The resistance value of the Twilight Resistor 911 can be increased to raises the Ithic current threshold, in effect, and prevent nearby low light sources from cancelling the Illumination Mode.

Another difference is the Optional Shunt Regulator 2302. The Zener Diode 2305 has a sufficiently high threshold voltage so that it conducts significant current only when the Current Limiter 916 is in the Active Mode. The Zener shunts some current away from the Current Limiter 916 to decrease its power dissipation. The Zener Diode 2305 is an optional device that may be deleted.

Figure 24:
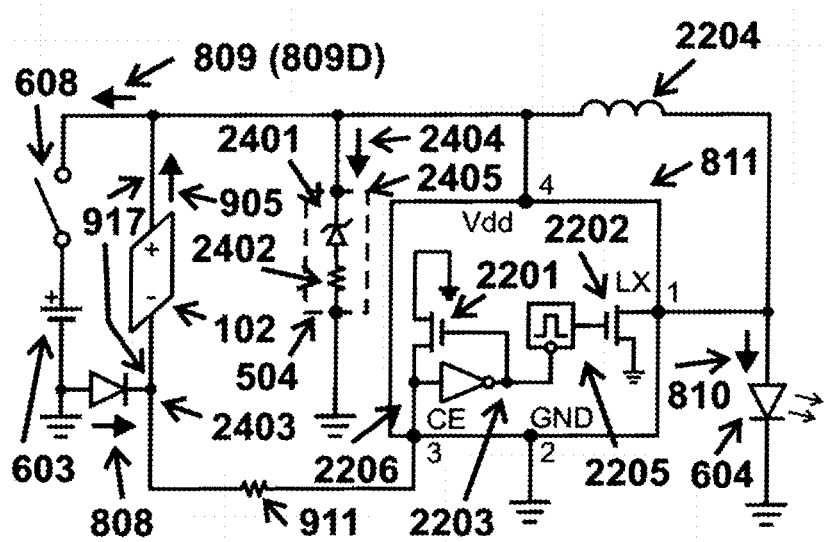
FIG. 24 is a schematic diagram of an alternative embodiment of a solar pathway light having a high-capacity battery and a Safety Device with a discharge regulator, in accordance with an embodiment of the present invention.

FIG. 24 is a schematic diagram of an alternative embodiment of a solar pathway light having a higher-capacity battery and a discharge regulator, in accordance with an embodiment of the present invention. FIG. 24 shows another embodiment of the solar light where the Safety Device 504 has a Discharge Regulator 2405 for managing the parameters of discharging of the Battery 603 which has a larger nominal capacity. It includes the Solar IC 811, the LED 604, the Incompatible Solar Panel 102, the Battery Switch 608, the Twilight Resistor 911 and a Bypass Diode 2403. The Bypass Diode 2403 is a non-limiting example of the Bipolar Device 3202 of FIG. 32. The Battery 603 has a storage capacity Cn sufficiently large to store all the output of the Solar Panel 102 from a day of direct sunlight. For an example, without limitation, assume that the Solar Panel 102 has Iscn=1,160 mA. The Battery 603 has a capacity of Cn=1,160 mA×8 Hours/1.2=7,330 mAh or more.

In the Charging Mode, the Solar Current 808 flows mainly through the Bypass Diode 2403 instead of the Recharging Switch 2201. The Twilight Resistor 911 passes enough current to operate the Low-Light Sensor 2206. The Twilight Resistor 911 protects the Solar IC 811 from damage if the Ipo current is ever too great. It also raises the Ithic current threshold, in effect, and prevents low-light sources making the LED 604 flash or turn off at night when it is supposed to be on steadily. The higher the resistance value of the Twilight Resistor 911, the higher the Ithic current threshold, in effect.

The Safety Device 504 has a Zener Diode 2401 and a Trickle Resistor 2402. These comprise the Discharge Regulator 2405, which is not a shunt regulator. It cannot prevent the Solar Panel 102 from overcharging the Battery 603 because the Resistor 2402 does not have a low enough resistance value. Instead, the Discharge Regulator 2405 draws a Trickle Current 2404 which has a magnitude that is dependent on the battery's recharge status or voltage. The more the Battery 603 is recharged, the higher its voltage, and the greater the Trickle Current 2404. If the Battery 603 is undercharged, then its voltage is lower and the Trickle Current 2404 is less or insubstantial. The Discharge Regulator 2405 can have different embodiments. It can include for example, but not limited to, a Vbe multiplier, a precision voltage reference IC such as LM4041, a microcomputer, and/or other circuits. These can provide greater precision, better temperature compensation, and/or lower threshold voltage than the Zener 2401. It may also include the LED 604 for draining some excess recharge current away from the Battery 603 through illumination during the Charging Mode.

In the Illumination Mode, the Trickle Current 2404 is a drain on the Battery 603 in addition to the drain of illuminating the LED 604. It increases the Discharge Current 809D to slowly discharge the Battery 603 throughout the night without directly affecting the current flowing to the LED. The discharge parameters are managed by the Trickle Current 2404, which is variable, and the LED Current 810, which may be less variable or constant. The Discharge Regulator 2405 automatically adjusts the Trickle Current 2404, a discharging parameter per the battery status or voltage. It is noted that the Trickle Current 2404 should be ignored, not included in Idis, when calculating the DCR number or the DCR1 number of this embodiment.

By morning, the Safety Device 504 and the LED 604 may have removed the battery's charge, without over discharging it or causing battery damage. This prepares the Battery 603 to receive the day's recharge. By managing the discharging parameters, the Safety Device 504 diminishes the charge in the Battery 603 and prepares it for receiving a new recharge to protect it from substantial overcharging.

In a non-limiting example, assume that the Solar Panel 102 has Iscn=1,160 mA. The Battery 603 has a capacity of Cn 10,000 mAh. The average Discharge Current 809D, without the Trickle Current 2404 is Idis=25 mA. The Solar Panel 102 gives the Battery 603 a recharge of 7,330 mAh in 8 hours of direct sunlight. There are 12 hours of LED 604 illumination where the nighttime output current Ipo of the Solar Panel 102 is below the low-light current threshold Ithic. There are 4 hours where the Ipo current is insubstantial for recharging but is still above the Ithic threshold. The average Trickle Current 2404 for 16 hours of non-recharging time is therefore Itrk=(7,330 mAh−25 mA×12 hrs)/16 hrs=439 mA.

Next assume that the light is relocated to Category 1 shade where the Battery 603 receives a smaller recharge in 8 hours of shade of only 349 mAh. Consequently, the Battery 603 has a slightly lower voltage at the end of the recharging cycle. As a result, the Safety Device 504 automatically adjusts the average Trickle Current 2404 for the 16 hours of non-recharging time to become Itrk=(349 mA−25 mA×12 Hr)/16 hrs=3.06 mA.

Figure 25:
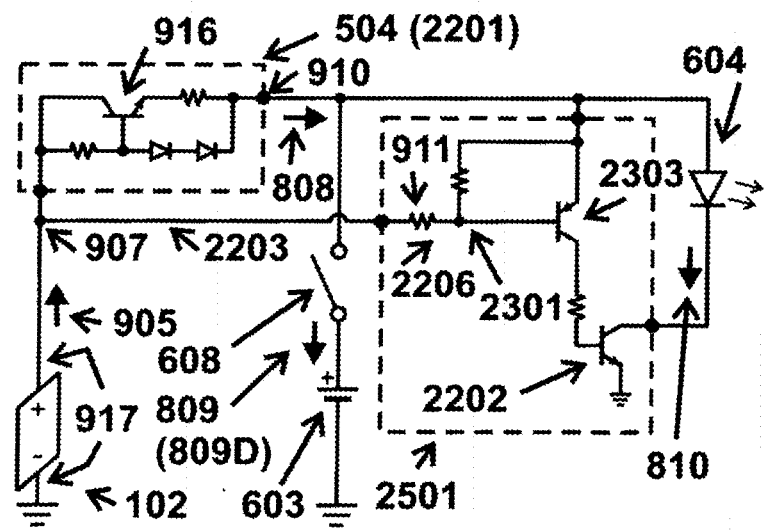
FIG. 25 is a schematic diagram of an alternative embodiment of a solar pathway light with an inverting gate, in accordance with an embodiment of the present invention.

FIG. 25 is a schematic diagram of an alternative embodiment of a solar pathway light with an inverting gate, in accordance with an embodiment of the present invention. FIG. 25 shows another embodiment of the solar light where the Inductor 2204 is deleted and the Gated Oscillator 2205 is replaced by an Inverting Gate 2501, which does not oscillate. The Inverting Gate 2501 has the Twilight Resistor 911, the Low-Light Sensor 2206, the PNP Transistor 2303, and the Discharging Switch 2202. Neither the PNP Transistor 2303 nor the Discharging Switch 2202 oscillate in this embodiment. Instead, they are switches. When the Control Signal indicates the Illumination Mode, the Twilight Resistor 911 pulls the base input of the PNP Transistor 2303 low which pulls the base input of the Discharging Switch 2202 high and turns on the Discharging Switch 2202 to illuminate the LED 604.

The Control Signal 2203 directly controls the Discharging Switch 2202 without the intermediary Gated Oscillator 2205. To the naked eye, it is not possible to detect whether the LED 604 is illuminated only by the battery voltage, as illustrated here, or by higher voltage pulses as shown in other embodiments, when the illumination brightness is the same, because the gated oscillator frequency may be greater than 1 KHz.

This embodiment can decrease cost and improve reliability with fewer components, provide greater efficiency by converting stored energy into LED light with no power lost in voltage conversion, and increase LED light luminosity from higher battery voltage and current. But the solar panel and battery are replaced, optimized, or manufactured to operate at higher voltage.

The Battery 603 has a higher nominal voltage to illuminate the LED 604 without an oscillator, voltage converter, or higher voltage pulses. The nominal voltage of the Battery 603 is greater than the forward conduction voltage of the LED 604 to enable the battery to illuminate the LED. This can be accomplished by connecting multiple batteries in series or by the Battery 603 being manufactured to have a higher nominal voltage. The forward conduction voltage may also be referred to as the knee voltage or cut-in voltage. It may be equal to the barrier potential of a p-n junction of the LED 604.

The Solar Panel 102 may have a higher voltage which conforms to the DS Spec and/or the Cat1 Spec to ensure adequate recharging in shade of the higher voltage Battery 603. The Safety Device 504, which is also the Recharging Switch 2201, limits the Solar Panel 102 Output Current 905 to 25% of the Battery 603 capacity or less.

The Low-Light Sensor 2206 includes the PNP Transistor 2303 to invert the Control Signal 2203 for the Discharging Switch 2202. Inverting enables the Control Signal 2203 to close Discharging Switch 2202 while simultaneously opening the Recharging Switch 2201 and vice versa. Similarly, in FIG. 22, the Gated Oscillator 2205 is shown having an inverting input for the Control Signal 2203 to signify that the Discharging Switch 2202 is closed while the Recharging Switch 2201 is opened and vice versa. A different solar IC or another arrangement of discrete components can move these inverters elsewhere in the circuits if the polarity of the control signal is modified as well. The inverters can be deleted if one of the switches responds oppositely to the control signal, or if there is a second control signal having an opposite polarity.

In some embodiments of the solar light, the battery has a nominal voltage Vn of 1.2V and a capacity Cn of 400 mAh, 900 mAh, or more, or less. The Battery 603 of FIG. 25 may have a nominal voltage Vn of 3.2V and a capacity Cn of 1000 mAh. Some embodiments of the present invention may be modified to accommodate other batteries with various nominal voltages and capacities by appropriately changing the solar panels and other components per the specifications and examples herein.

In most of the embodiments shown, the control signal opens the recharging switch while simultaneously closing the discharging switch and vice versa. This is beneficial but not required. Both switches can be opened or closed simultaneously. When both switches are opened, or closed, the light is in neither the Charging Mode nor the Illumination Mode. When both are opened, my solar light is disabled. When both are closed, the solar panel can recharge or discharge the storage device, depending on the ambient light, and the storage device can illuminate the LED if recharged. The both-on mode can beneficially divert some of the solar current away from the storage device to prevent overcharging when bright sunlight is on the solar panel. Various modifications can be made to simultaneously open or close both switches. For examples, without limitation, a delay circuit can be added to delay the control signal to either switch. Or two control signals can be provided, as in FIG. 28.

Figure 26:
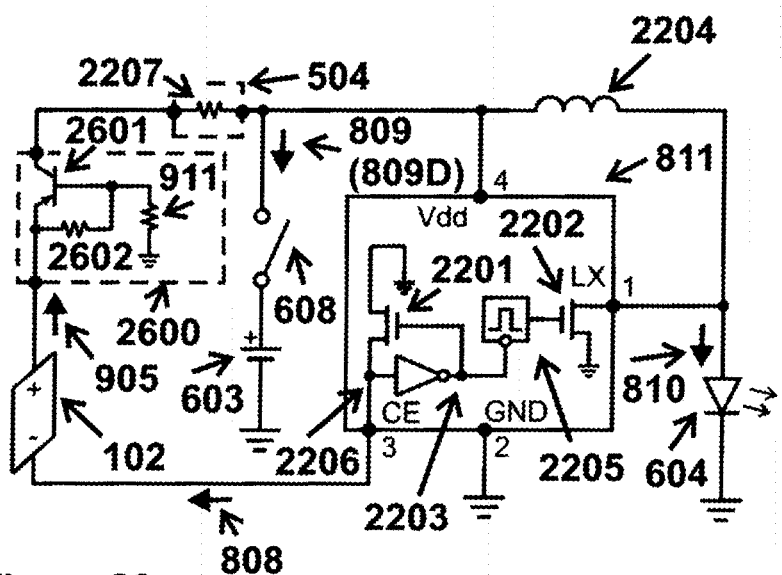
FIG. 26 is a schematic diagram of an alternative embodiment of a solar pathway light with a twilight controller, in accordance with an embodiment of the present invention.

FIG. 26 is a schematic diagram of an alternative embodiment of a solar pathway light with a twilight controller, in accordance with an embodiment of the present invention. FIG. 26 shows an alternate embodiment of the solar light having a Twilight Controller 2600, which includes a PNP Transistor 2601, a Pullup Resistor 2602, and the Twilight Resistor 911. This embodiment provides greater flexibility when adjusting the low-light current threshold, Ithic, because the threshold is determined by the ratio of the Resistor 911 to the Resistor 2602. The higher the resistance value of the Twilight Resistor 911, the higher the ratio, and the higher the Ithic threshold, effectively. In an alternative embodiment, the Pullup Resistor 2602 and the Twilight Resistor 911 are swapped in positions within the circuit. The higher the resistance value of the Twilight Resistor 911, the higher the ratio, and the lower the Ithic threshold, effectively.

Figure 27:
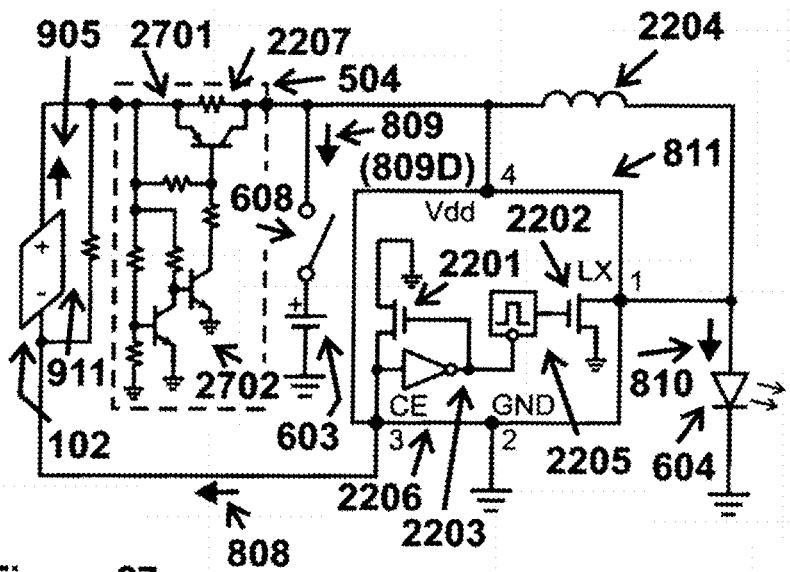
FIG. 27 is a schematic diagram of an alternative embodiment of a solar pathway light with a bypass transistor and bypass controller, in accordance with an embodiment of the present invention.

FIG. 27 is a schematic diagram of an alternative embodiment of a solar pathway light with a bypass transistor and bypass controller, in accordance with an embodiment of the present invention. FIG. 27 shows an alternate embodiment of the solar light where the Safety Device 504 has the Current Limiting Resistor 2207 and a Bypass Controller 2600 comprising a Bypass Transistor 2701, a left NPN transistor, a NPN right transistor, and 5 resistors. In direct sunlight, the solar panel output voltage turns off the Bypass Transistor 2701 and the Current Limiting Resistor 2701 limits the Solar Current 808 like the circuit of FIG. 22. But in low ambient light, the solar panel output voltage drops and turns off the left NPN transistor, which turns on the right NPN transistor and the Bypass Transistor 2701. In effect, this practically removes the Current Limiting Resistor 2207 from the circuit and increases the Solar Current 808. The Bypass Controller 2600 disables the Safety Device 504 in low ambient light by effectively creating a short circuit around the impedance device. The Bypass Controller 2600 can be incorporated into the embodiment of FIG. 26, for example, creating a new embodiment that has a twilight controller and a bypass controller.

Figure 28:
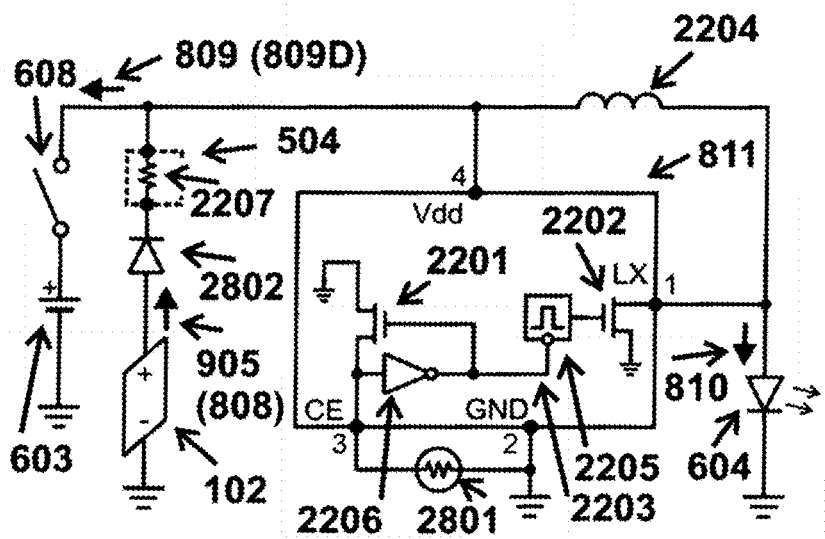
FIG. 28 is a schematic diagram of an embodiment having a photo cell, in accordance with an embodiment of the present invention.

FIG. 28 is a schematic diagram of an embodiment having a photocell, in accordance with an embodiment of the present invention. FIG. 28 shows a schematic diagram of another embodiment of the solar light with the fixed value Twilight Resistor 911 replaced by an LDR Twilight Resistor 2801, which may have a decreasing resistance value as the luminosity of incident light increases. The Low-Light Sensor 2206 produces a bias current that flows through the LDR Twilight Resistor 2801. The bias current replaces the Solar Current 808 enabling the Low-Light Sensor 2206 to detect luminosity via the LDR Twilight Resistor 2801. Also included are a Diode Recharging Switch 2802 and the Solar Current 808 which is identical to the Solar Panel Output Current 905. The low-light current threshold Ithic, affects only the Control Signal 2203 to turn the LED 604 on or off via the Discharging Switch 2202. The recharging switch is the Diode 2802, which is controlled by the solar panel output voltage, Vpo. The Diode 2802 is a non-limiting example of the Bipolar Device 3202 of FIG. 32. The on/off states of the Discharging Switch 2202 and the Diode Recharging Switch 2802 are independent and synchronized only insofar as the ambient light affects the solar panel output and the LDR. Therefore, the recharging switch and the discharging switch may both be opened or closed simultaneously, at least temporarily at dusk or dawn. The LDR Twilight Resistor 2801 does not produce an output current like the solar cell. Instead, it includes a light dependent resistor, LDR, photoresistor or photocell whose resistance value decreases when the luminosity of incident light increases. There are various photoresistors commercially available having different resistance values at predetermined luminosity. One can be selected to turn on the discharging switch at a predetermined ambient light threshold. If a suitable LDR cannot be obtained, a twilight controller can be added. It has the LDR and other components to provide a modified or adjusted LDR output to the pin 3 of the Solar IC 811.

Figure 29:
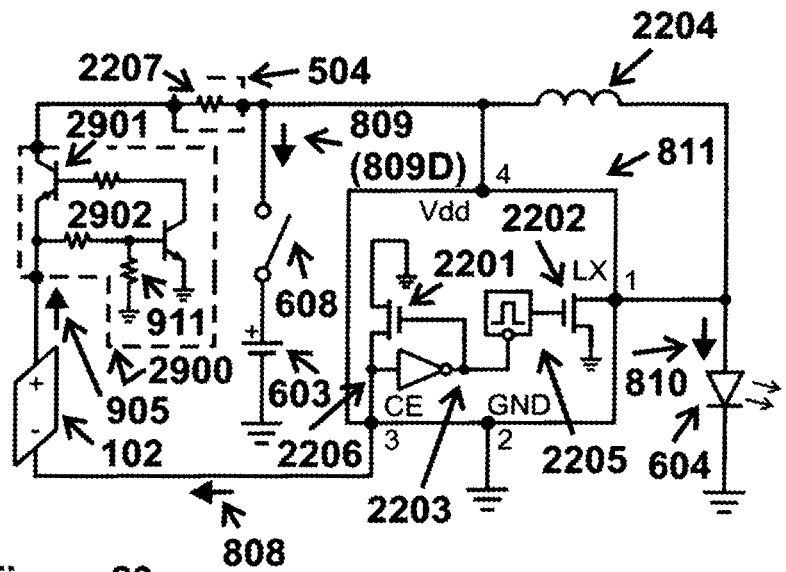
FIG. 29 is a schematic diagram of an alternative embodiment with an improved twilight controller, in accordance with an embodiment of the present invention.

FIG. 29 is a schematic diagram of an alternative embodiment with an improved twilight controller, in accordance with an embodiment of the present invention. FIG. 29 shows an alternate embodiment of the solar light having an Improved Twilight Controller 2900, which includes a PNP Transistor 2901, an Input Resistor 2902, an NPN transistor, and the Twilight Resistor 911. This embodiment has greater flexibility on adjusting the low-light current threshold, Ithic, because the threshold is determined by the ratio of the te to the Input Resistor 2902 to the Twilight Resistor 911. The higher the ratio, the higher the Ithic threshold, effectively. The NPN transistor gives an advantage because it provides greater base current for the PNP Transistor 2901, which puts it further into saturation, decreases the collector-emitter saturation voltage, and increases the Charging Current 809. In an alternative embodiment of the solar light, the Twilight Resistor 911 and the Input Resistor 2902 have swapped positions in the circuit. The higher the ratio, the lower the Ithic threshold, effectively. The swapped Input Resistor 2902 may be removed, leaving only the Resistor 911 to convey input current from the Solar Panel 102 to the base input of the NPN transistor, to set the Ithic threshold even lower, effectively.

In any embodiment of the solar light having a solar IC, the IC can be replaced by discrete electrical components forming circuits that provide similar functionality. Circuits can be modified to replace bipolar transistors with MOSFET transistors and vice versa. Circuits can also be modified to transpose component polarities, such as for examples, but not limited to, bipolar transistors from NPN to PNP, MOSFETS transistors from N-Channel to P-Channel, and vice versa.

Figure 30:
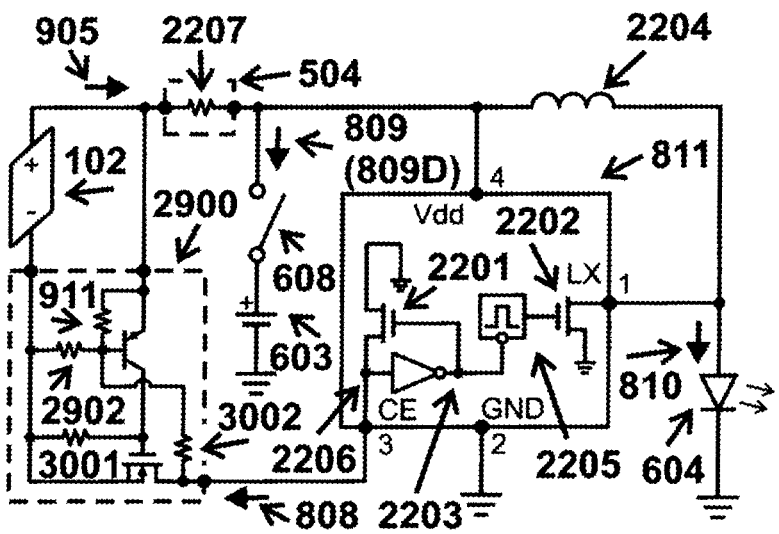
FIG. 30 is a schematic diagram of an alternative embodiment of the solar light with transposed components, in accordance with an embodiment of the present invention.

FIG. 30 is a schematic diagram of an alternative embodiment of the solar light with transposed components, in accordance with an embodiment of the present invention. FIG. 30 shows an embodiment having transposed components. This embodiment is like FIG. 29 except that the active components of the Improved Twilight Controller 2900 are transposed in polarity and modified in type. The FIG. 30 schematic has a Hysteresis Resistor 3002. The embodiment of FIG. 29 is similar but without hysteresis. The PNP Transistor 2901 of FIG. 29 is transposed in polarity and modified in type to an N-Channel MOSFET Transistor 3001. The NPN transistor of FIG. 29 is transposed in polarity to a PNP transistor. The Twilight Resistor 911 and the Input Resistor 2902 are the same. The Twilight Controller 2900 terminals are modified in their connection points to the unchanged components.

The Hysteresis Resistor 3002 adds hysteresis to the Twilight Controller 2900. It creates two transition points where the solar light changes mode of operation. With or without hysteresis, the first transition happens at a predetermined level of ambient light where the light changes from the Recharging Mode to the Illumination Mode. It is a light-to-dark transition that turns on the LED. There is also a second transition point where the light changes from the Illumination Mode to the Recharging Mode. This is a dark-to-light transition that turns off the LED. Without hysteresis, the two transition points happen at about the same ambient light level. With hysteresis, the transitions occur at different ambient light levels, the LED turns on at a lower light level than it turns off. Hysteresis can improve the low-light situation by making my light less sensitive to having its operating mode disrupted by another nearby light, which can turn off the LED, or by flicking flames of a nearby fire pit, which can flash the LED in synchronous with the flickering flames.

Any Twilight Resistor 911 can comprise multiple resistors. The resistance value of the Pullup Resistor 2301 of FIG. 23 for may be set to provide a desired Ithic threshold. In the FIG. 30 embodiment, the Ithic threshold and the two transition points are predetermined by the resistance values of the Twilight Resistor 911, the Pullup Resistor 2301, and the Hysteresis Resistor 3002. The Ithic threshold is predetermined by the resistance values of the Twilight Resistor 911 and the Input Resistor 2902. The Twilight Resistor 911 may be deleted. If it is deleted, the Input Resistor 2902 may function as an input resistor and as a twilight resistor.

Likewise, other embodiments can be modified to add or delete hysteresis, and the Twilight Resistor 911 can comprise one resistor or multiple resistors to provide the desired Ithic threshold and transition points. Alternatively, the Twilight Resistor 911 may be replaced by various components such as a current source, a voltage source, or a diode.

An incandescent light bulb may be utilized as a variable resistor. The bulb's filament resistance increases with increasing current flow through the filament. The light bulb does not have to illuminate brightly to provide a useful rise in resistance. Avoiding bright illumination may greatly increase the service life of the filament. Light bulbs may be added to improve performance of various circuits. Or resistors can be replaced by bulbs, such as, for example without limitation, the Current Limiting Resistor 2207 of FIGS. 22-31, the Current Sensing Resistor 904 of FIG. 9, the Current Sensing Resistor 1004 of FIG. 10, the Optional Protection Resistor 2304 of FIG. 23, and/or the Trickle Resistor 2402 of FIG. 24. One advantage of a light bulb utilized as a current limiting resistor is that it may provide little or no voltage drop, Vdrop, at low current (during the Inactive Mode).

Figure 31:
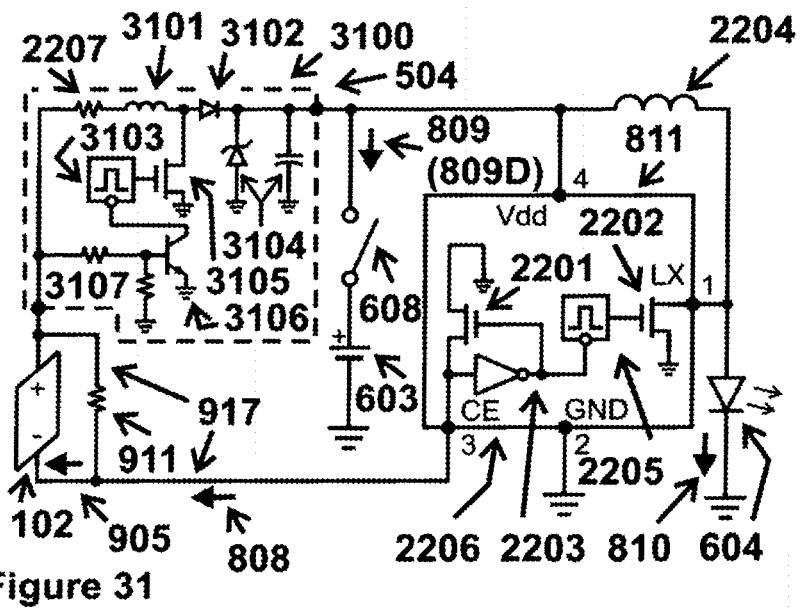
FIG. 31 is a schematic diagram of an alternative embodiment of a solar light with a voltage multiplier, in accordance with an embodiment of the present invention.

FIG. 31 is a schematic diagram of an alternative embodiment of a solar light with a voltage multiplier, in accordance with an embodiment of the present invention. FIG. 31 shows an alternate embodiment of the solar light where the Safety Device 504 has a Voltage Multiplier 3100, which increase voltage and also operates as an impedance device. It includes an Inductor 3101, a Diode 3102, a Gated Oscillator 3103, a Zener Diode and Capacitor 3104, a MOSFET Transistor 3105, a PNP Transistor 3106, and Input Resistors 3107. When the Solar Panel Output Voltage, Vpo, 917 is too low to adequately recharge the Battery 603, the Input Resistors 3107 turn off the PNP Transistor 3106. That enables the Gated Oscillator 3103, which energizes the Inductor 3101, and effectively increases (multiplies) the solar panel output voltage, Vpo. The increased voltage enables a current to flow through the Diode 3102 so that the Solar Current 808 can recharge the Battery 603 when the Solar Panel 102 is in shade.

When the Solar Panel 102 is in direct sunlight, the Vpo voltage is sufficient to turn on the PNP Transistor 3106 via the Input Resistors 3107 which disables the Gated Oscillator 3103. The Current Limiting Resistor 2207 limits the Solar Current 808 to prevent substantially overcharging the Battery 603. The Current Limiting Resistor 2207 can be a fixed resistor as shown or it may be the intrinsic resistance of the Inductor 3101 and/or the Solar Panel 102. The Charging Current 809 may be limited by any of these or by the inductance of the Inductor 3101 or the oscillation frequency and the duty cycle of the Gate Oscillator 3103.

The Zener Diode and Capacitor 3104 are optional and may be included to prevent unnecessarily high voltage from being produced when the Battery Switch 608 is open during the Charging Mode. The threshold voltage of the Zener diode may be set to a predetermined value higher than the battery voltage.

This embodiment has lower efficiency because some of the solar energy is lost as power dissipated by the Voltage Multiplier 3100. It may have higher cost as well. With the Voltage Multiplier 3100, the Solar Panel 102 does not have to conform to the 2nd or 3rd equations of the DS Spec, or the 7th equation of the Cat1 Spec. The Solar Panel 102 still conforms to the 1st equation of the DS Spec and/or the 6th equation of the Cat1 Spec. But the 2nd, 3rd, and 7th equations are optional.

Figure 32:
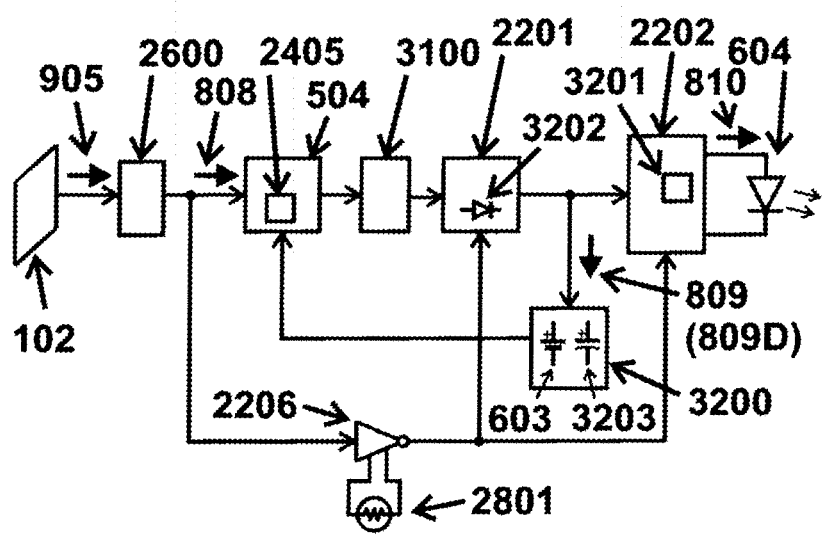
FIG. 32 illustrates a block diagram of a solar light, in accordance with an embodiment of the present invention.

FIG. 32 illustrates a block diagram of a solar light, in accordance with an embodiment of the present invention. It includes the Solar Panel 102, the optional Twilight Controller 2600, the Safety Device 504 which may include any of the impedance devices and/or discharge regulator, the optional Voltage Multiplier 3100, the Recharging Switch 2201 which may have an optional Bipolar Device 3202, the Rechargeable Storage Device 3200 which may have a Rechargeable Battery 603 and/or a Supercapacitor 3203, the Discharging Switch 2202 which may have an optional Voltage Converter 3201, the LED 604, and the Low-Light Sensor 2206 which may have the optional LDR Twilight Resistor 2801. The solar panel may provide the necessary energy by being incompatible with the Storage Device 3200. The incompatibility may be required to enable ample solar energy collection and battery recharging in shade and overcast. The incompatibility may cause direct sunlight on the solar panel to produce more output than can be stored in the Storage Device 3200. The Safety Device 504 controls the charge in the Storage Device 3200 and eliminates adverse effects of the incompatibility. The incompatibility may be established by the solar light conforming to at least one of the DS Spec, the Cat1 Spec, the DCR number, and the DCR1 number. The solar light does not have to conform to all the Specs and numbers. Conforming to only one or more is sufficient.

The Solar Current 808 may flow from the Solar Panel 102, through the Safety Device 504, the Voltage Multiplier 3100, and the Recharging Switch 2201 to provide the Charging Current 809 which recharges the Rechargeable Storage Device 3200. The Discharge Current 809D may flow from the Rechargeable Storage Device 3200 through the Discharging Switch 2202 to provide the LED Current 810 which illuminates the LED 604.

There are two modes of operation—the Charging Mode and the Illumination Mode. Daylight enables the Charging Mode. Night enables the Illumination Mode. The transition between the modes may be controlled by amount of light received by the Solar Panel 102. The Twilight Controller 2600, if present, may adjust or modify transitions between Charging Mode and the Illumination Mode. The Twilight Controller 2600 may include hysteresis which makes the transition from Charging Mode to Illumination Mode happen at a lower ambient light level than the transition from Illumination Mode to Charging Mode.

In the Charging Mode, ambient light hits the Solar Panel 102 (and the LDR Twilight Resistor 2801 if it is included). The Low-Light Sensor 2206 responds by turning off the Discharging Switch 2202 which turns off the LED 604. The Low-Light Sensor 2206 may also turn on the Recharging Switch 2201 to enable the Solar Panel 102 to recharge the Storage Device 3200. If the Bipolar Device 3202 is included, the connection between the Low-Light Sensor 2206 and the Recharging Switch 2201 may be deleted because the Recharging Switch 2201 may be turned on by being forward biased into conduction by output voltage from the Solar Panel 102 or the Voltage Multiplier 3100. If the LDR Twilight Resistor 2801 is included, the connection between the Low-Light Sensor 2206 and the Solar Panel 102 may be deleted if the LDR 2801 provides an input for the Sensor 2206.

The Solar Panel Output Current 905 and the Solar Current 808 may be equal in magnitude since the current drains of the Low-Light Sensor 2206 and the optional Twilight Controller 2600 are negligible. The Solar Current 808 flows to the Safety Device 504 which protects the Rechargeable Storage Device 3200 from substantial overcharging. The Safety Device 504 may impede the Solar Current 808. If the Discharge Regulator 2405 is included, the Safety Device 504 may prepare the Storage Device 3200 for energy storage by discharging it prior to recharging. The Voltage Multiplier 3100 may be included to increase the voltage from the Solar Panel 102 above the Storage Device 3200 voltage so that the Charging Current 809 flows into storage.

In the Illumination Mode, the ambient light is insufficient to overcome the Low-Light Current Threshold (Ithic) of the Low-Light Sensor 2206. The necessary input to detect this condition may be provided to the Low-Light Sensor 2206 by the Solar Panel 102 or the LDR Twilight Resistor 2801. The Discharging Switch 2202 is turned on by the Low-Light Sensor 2206 in response to the decreased ambient light. The Low-Light Sensor 2206 may also turn off the Recharging Switch 2201 if the Bipolar Device 3202 is not included. If the Bipolar Device 3202 is included, the Recharging Switch 2201 may be turned off by a decrease in the output voltage of the Solar Panel 102 or the Voltage Multiplier 3100. The Recharging Switch 2201 prevents current from flowing backwards from the Storage Device 3200 into the Solar Panel 102. If the Discharging Switch 2202 does not include the Voltage Converter 3201, the LED Current 810 and the Discharge Current 809D may be practically the same. If the Discharging Switch 2202 includes the Voltage Converter 3201, the converted voltage which is delivered to the LED (the LED voltage) may be greater than the Storage Device 3200 voltage. The LED voltage may include DC voltage and/or voltage pulses. The LED voltage may be measured with a DC voltmeter to learn the average LED voltage, and an oscilloscope to measure the DC voltage and/or the voltage pulses. The average LED voltage may be about the same as the storage device voltage even though the voltage pulses may about the same as the forward conduction voltage of the LED 604. The Voltage Converter 3201 may modify the LED Current 810 making it significantly different than the Discharge Current 809D. The Voltage Converter 3201 may modify the magnitude, polarity, and/or the AC/DC of the LED Current 810. For a non-limiting example, the LED Current 810 may be derived from the Discharge Current 809D, which is a DC current, and converted into a DC current component and possibly an AC current component of the LED Current 810. Measurements of the discharge current and the LED current with a DC ammeter may indicate that the average LED current is less than the average discharge current. This may be the result of the converter stepping up the LED voltage, making it greater than the storage device voltage. The LED current may be inversely proportional to the LED voltage. Any power dissipated by the voltage converter may further decrease the LED current relative to the discharge current. The LED current may be predicted by the equation Iled=((Idis×Vstor)−Pvc)/Vf, where Iled is the LED Current 810, Idis is the Discharge Current 809D, Vstor is the Storage Device 3200 voltage, Pvc is the power dissipation of the Voltage Converter 3201, and Vf is the forward conduction voltage of the LED.

If the Safety Device 504 includes the Discharge Regulator 2405, it may discharge the Storage Device 3200 to prepare it for recharging. If the Discharge Regulator 2405 is not included, the connection between the Safety Device 504 and the Rechargeable Storage Device 3200 may be deleted.

In other alternative embodiments, a Category 1 output specification (Cat1 Spec) is an alternative for the DS Spec. The Cat1 Spec has two equations that define limits for solar panel outputs which are measured when the solar panel is in Category 1 shade. The limits are:

$$Ip1n > 0.04Cn/0.982, \text{ and} \qquad \text{6th Equation}$$

$$Vp1 > (1.15Vn + Vdrop)/0.953 \qquad \text{7th Equation}$$

The Ip1n current and the Vp1 voltage are characteristics of the solar panel that are determined when it is manufactured. The Ip1n current is a normalized short-circuit output current of the solar panel. It is measured while the solar panel is in a Category 1 shaded area that measures 550+/−50 FC. It is specified in mA. The measurement is normalized to 550 FC. The 0.04 coefficient has a unit of 1/hrs. The Vp1 voltage is an open-circuit output voltage of the solar panel. It is measured under the same conditions as Ip1. It is specified in Volts. The procedure for measuring the Ip1 current and the Vp1 voltage is in the Cat1 Test Procedure, which is like the DS Test Procedure, but it is done in the shade of Category 1 instead of direct sunlight.

In a non-limiting example, assume that a battery has nominal ratings of Vn=1.2V and Cn=400 mAh. Neither the impedance device of the safety device nor the recharging switch has a voltage drop so Vdrop=0. The required solar panel outputs in Category 1 shade are therefore Ip1n>0.04/hrs×400 mAh/0.982=16.3 mA, and Vp1>(1.15×1.2V+0)/0.953=1.45V. When the Cat1 Spec is utilized, the 6th equation is required to ensure that the solar panel produces sufficient output current in shade. Optimally, the Ip1n output is greater than specified by the equation to achieve better results. The preferred 6th equation is Ip1n>0.125Cn, where 0.125 has a unit of 1/hrs. In this example, the 6th equation indicates that a charge may be added to storage in the amount of Cchg=8 hrs×12.2 mA/1.2=81.3 mAh, if the 12.2 mA is constant for 8 hours. Theoretically, the charge may illuminate the LED for Tnight=81.3 mAh/12 mA=6.8 hrs, if the average discharge current, Idis, is 12 milliamperes. In contrast, the preferred 6th equation indicates that a charge may be added to storage in the amount of Cchg=8 hrs×(0.125×400 mAh)/1.2=333 mAh, with the same environmental recharging conditions. The greater recharge of 333 mAh (vs 81.3 mAh) may enable longer operation at 12 mA of battery drain, more than 12 mA of battery drain, and/or recharging in deeper shade. The 7th equation is beneficial but not required. The solar panel may produce sufficient voltage to recharge the battery without a voltage multiplier by conforming to the 7th equation.

The solar panel may include multiple solar cells connected into an array, or it can be a single cell, if it conforms to the DS Spec or the Cat1 Spec. The solar panel may have a flexible or adjustable member such as a hinge or a pivot joint. The adjustable member may be between the Solar Panel 102 and the Tube 103. The flexible or adjustable member enables the Solar Panel 102 to be orientated so that it faces a source of scattered sunlight such as an opening under a tree in Category 2 Shade for example. That enables it to receive more scattered sunlight and produce greater output current. The flexible or adjustable member also enables the Solar Panel 102 to be angled to better shed any accumulation of water, leaves, ice or snow which can decrease its output.

In the many embodiments, the Solar Panel 102 has a rectangular shape and a polycrystalline construction. Other shapes and types may be acceptable. It may be curved or flexible. For example, but not limited to, it may be wrapped around the perimeter of a tube, a post, a stake, or a body of the Pathway Light 105. The Solar Panel 102 can have a plurality of interconnected solar panels or solar cells (segments). Each segment may have output wires. The segment outputs may be combined through diodes. The segments' outputs may be fed to the Safety Device 504 which impedes the collective solar current produced by all segments, or they may be fed to individual safety devices which impede each segment's solar current independently, and then appropriately combined into the overall solar current.

In some embodiments, mirrors, reflectors, lenses, or other add-on devices may be utilized to reflect or focus light onto the solar panel and boost its output. The effects of these add-on devices should be included when the solar panel is measured to determine whether it conforms to the DS Spec or the Cat1 Spec.

Another embodiment of the solar light has the Safety Device 504 comprising a current timer instead of the current limiter to impede the solar current. Like the current limiter, the current timer is an impedance device which controls the stored charge in cooperation with the environment. The current timer has a MOSFET transistor which operates as a switch to provide the current limiter functionality. The MOSFET transistor practically eliminates the safety device power dissipation which can improve its reliability.

The timer begins its daily operation in the Inactive Mode, when shade or sun is on the solar panel, to recharge the storage device. When the timer reaches the end of a recharging period (Tc), it puts the safety device into the Active Mode to stop or limit the recharging. The Vdrop of the current timer is negligible because the MOSFET transistor has low internal on-resistance.

Many embodiments have a solar panel output specification (DS Spec) that sets limits on the solar panel outputs of Iscn current and Voc voltage. The Iscn current is the normalized short-circuit output current of the solar panel in direct sunlight. The Voc voltage is the open-circuit output voltage in direct sunlight. The Iscn current and the Voc voltage are measured when the solar panel is in direct sunlight that measures 10,500+/−1000 FC. The Iscn current is normalized to 10,500 FC. The DS Spec ensures that the solar panel can produce sufficient energy output in shade to operate my light indefinitely on only solar power without adverse effects.

The Ics current and Voc voltage can be measured to verify conformance with the DS Spec. A procedure for measuring Ics and Voc is below. Conformance testing of the Iscn current utilizes a 1st equation $0.50Cn/0.982 <= Iscn <= 250Cn$. The Iscn conforms if it is in the DS Spec range. This equation has units of milliamperes (mA). The storage capacity, Cn, is in mAh. The 0.50 and 250 coefficients each have units of 1/hrs. The 0.982 coefficient is an aging factor for the solar panel output current. It has no unit.

Conformance testing of the Voc voltage utilizes a 2nd equation $Voc >= (1.15Vn+Vdrop)/0.9/0.953$, where Vn is the nominal battery voltage. The Vn and the Vdrop have the units of volts (V). The 0.9 coefficient has no unit. The 0.953 coefficient is an aging factor for the solar panel output voltage. It has no unit. The Vdrop voltage is included in the 2nd equation to compensate the overall recharging circuit for any voltage drop of the safety device that may impede the charging current. If the recharging switch has a voltage drop, it too can be compensated by adding it to the Vdrop voltage.

In a non-limiting example of the DS Spec, assume that Vn=1.2V, Cn=400 mAh, and Vdrop=0.65V. The DS Spec is as follows. The minimum Iscn=0.50/hrs×400 mAh/0.982=204 mA. The maximum Iscn=250/hrs×400 mAh=100,000 mA. The minimum Voc=(1.15*1.2V+0.65V)/0.9/0.953=2.37V. The solar panel conforms to the DS Spec if the DS Test Procedure indicates that Iscn is between 204 mA and 100,000 mA (inclusive), and that Voc is 2.37V or greater. When the DS Spec is utilized, the 1st equation is required. The lower limit (minimum Iscn) of the 1st equation is 0.50Cn/0.982. It ensures that the solar panel produces sufficient output current in shade. The upper limit (maximum Iscn) of the 1st equation is 250Cn. It ensures that the solar panel is not unnecessarily large or powerful. Optimally, the Iscn output is greater than specified by lower limit to achieve better results. The preferred lower limit is 1×Cn. In other words, the preferred 1st equation is $1 \times Cn <= Iscn <= 250Cn$, where 1 has a unit of 1/hrs. In this example, the 1st equation indicates that a charge may be added to storage in the amount of Cchg=8 hrs×204 mA×(550 FC/10,500 FC)/1.2=71.2 mAh, if the solar panel is exposed to 8 hours of Category 1 illumination at 550 FC and the solar panel output current is proportional to the illumination received. Theoretically, the recharge could illuminate the LED for Tnight=71.2 mAh/11 mA=6.5 hrs, if the average discharge current, Idis, is 11 milliamperes. In contrast, the preferred 1st equation indicates that a charge may be added to storage in the amount of Cchg=8 hrs×400 mAh×(550 FC/10,500 FC)/1.2=140 mAh, with the same environmental recharging conditions. The greater recharge of 140 mAh (vs 71.2 mAh) may enable longer operation at 11 mA of current drain, more than 11 mA of drain, and/or recharging in deeper shade. The 2nd equation is beneficial but not required. It is beneficial because the solar panel may produce sufficient voltage for recharging without a voltage multiplier when it conforms to the 2nd equation. The 3rd equation is beneficial but not required. When the solar panel conforms to the 3rd equation, it may not unnecessarily increase the power dissipation (and cost) of the safety device.

The aging factors 0.982 and 0.953 are included in the DS Spec to compensate for solar panel aging effects. The uncompensated minimum Iscn current is 0.50 C. The DS Spec adds 1−0.982=1.8% to the minimum Iscn to compensate for an anticipated decline in the Ipo current as the solar panel ages. The DS Spec lets the solar panel lose up to 0.6% of its Ipo per year for 3 years and still can adequately recharge the storage device. The uncompensated minimum Voc is (1.15Vn+Vdrop)/0.9. The DS Spec adds 1−0.953=4.7% to the minimum Voc to compensate for an anticipated decline in the Vpo voltage as the solar panel ages. The DS Spec lets the solar panel lose up to 1.6% of the Vpo per year for 3 years and still can adequately recharge the storage device.

The DS Spec has a maximum short-circuit current of Iscn=250Cn. In theory, this portion of the DS Spec implies that the solar panel could recharge a battery in about 17 seconds of direct sunlight on the solar panel. The theoretical calculation is 1.2/250 C=0.0048 hours (17.28 seconds). That is extremely fast and without precedent. The safety device slows down the recharging or ensures that the storage device has sufficient unfilled capacity, to prevent adverse effects that may be caused by the incompatibility.

Many embodiments utilize a 3rd equation of the DS Spec. This equation may decrease the power dissipation of impedance devices in the safety device by establishing an upper limit for the solar panel output voltage. It is Voc (1.15Vn+Vdrop)/0.4. The 3rd equation is beneficial because a solar panel that conforms to it does not produce an unnecessarily high output voltage. Collectively, the three equations of the DS Spec govern direct sunlight performance to ensure that the solar panel produces sufficient output in shade and an output in direct sunlight that does not unnecessarily increase the cost and power dissipation of the safety device. Alternatively, the two equations of the Cat1 Spec can be used to plan and evaluate solar lights. These 6th and 7th equations govern the solar panel performance in Category 1 shade to ensure that it produces sufficient output. The Cat1 Spec does not have the kinds of limits as the DS Spec that ensure the solar panel is not unnecessarily powerful or that direct sunlight does not unnecessarily increase the power dissipation (and cost) of the safety device. The designer may consider these factors and plan the solar panel accordingly using one or both Specs. The designer may also "work backwards" by selecting a solar panel and utilizing the DS Spec and/or the Cat1 Spec to plan other system components and operating parameters accordingly.

ADS Test Procedure for measuring the short-circuit current Isc and the open-circuit voltage Voc of the solar panel in direct sunlight follows. The Isc is measured by connecting the panel's output wires to a DC ammeter and exposing the panel to direct sunlight. Orient the front of the panel to obtain the greatest numerical value displayed by the meter. Record the Isc in milliamperes (mA). Measure the Voc likewise, in volts (V), with the ammeter replaced by a DC voltmeter. Measure the direct sunlight luminosity with a light meter at the same time. Collect this information while the sun is not obscured by humidity, haze, clouds, smog, fog, rain, etc. Collect the information when the direct sunlight is 10,500+/−1000 foot-candles (FC) utilizing a light meter while the air temperature is between 60 and 80 degrees Fahrenheit. Do not allow the solar panel to heat up in the sun. If the direct sunlight measurement is not 10,500 FC, then mathematically adjust the Isc current measurement to the normalized Iscn current utilizing the normalizing factor of 10,500 FC as shown in this non-limiting example Ex.14; Assume Isc=1,170 mA @ 10,600 FC. The normalized Iscn=1,170 mA×10,500 FC/10,600 FC=1,160 mA. The Voc voltage measurement, if not done at 10,500 FC, cannot be normalized with this method. The measured Voc may be accepted temporarily and then re-tested at the earliest opportunity in 10,500+/−100 FC direct sunlight to collect the Voc and Iscn measurements. When the direct sunlight measurement is 10,500 FC, Iscn=Isc.

A Cat1 Test Procedure for measuring the short-circuit output current Ip1 and the open-circuit voltage Vp1 of the solar panel in Category 1 shade follows. The Ip1 is measured by connecting the panel's output wires to a DC ammeter and locating the panel in Category 1 shade. Orient the front of the panel to obtain the greatest numerical value displayed by the meter. Record the Ip1 in milliamperes (mA). Measure the Vp1 likewise, in volts (V), with the ammeter replaced by a DC voltmeter. Measure the luminosity of light near the solar panel with a light meter at the same time. Collect the information when the luminosity measurement is 550+/−50 FC utilizing a light meter while the air temperature is between 60 and 80 degrees Fahrenheit. Move the solar panel and light meter within the shaded area to find 550+/−50 FC luminosity. Do not allow the solar panel to heat up in the sun before the measurement. If the direct luminosity measurement is not 550 FC, then mathematically adjust the Ip1 current measurement to the normalized Iscn current utilizing the normalizing factor of 550 FC as shown in this non-limiting example Ex.15; Assume Ip1=110 mA @ 520 FC. The normalized Ip1n=110 mA×550 FC/520 FC=116 mA. The Vp1 voltage measurement, if not done at 550 FC, cannot be normalized with this method. The measured Vp1 may be accepted temporarily and then re-tested at the earliest opportunity in 550+/−10 FC Category 1 shade to collect the Vp1 and Ip1n measurements. When the Category 1 shade measurement is done at 550 FC, Ip1n=Ip1.

The DC ammeter and the DC voltmeter may be used to measure average current and average voltage respectively, whether the parameter being measured is steady (DC) or a combination of DC and AC. This feature of DC meters may be useful for recording and reporting average measurements. Other devices, such as but not limited to, an oscilloscope, a spectrum analyzer, or a waveform analyzer may be useful for recording and reporting instantaneous measurements. Unless specified otherwise, voltages and currents may be measured as averages with the DC voltmeter and the DC ammeter respectively. Wires should be kept as short as possible to minimize stray capacitance, inductance, and resistance. To insure accurate measurements, the internal resistance of the DC voltmeter should be at least 10 times the impedance of the measured circuit. The internal resistance of the DC ammeter should be at most 0.1 times the impedance of the measured circuit. If these internal resistances are not possible, the measured parameters may be mathematically adjusted to compensate for meter resistance accordingly.

Experimental data from DS, Category 0 sunlight, and shaded areas of Category 1, 2, and 3 follows. Light measurements were made in mid-December near Tucson, Ariz. During the measurements, the standard conditions were as follows; direct sunlight measured 10,500+/−500 FC, ambient temperature 60 to 70 degrees Fahrenheit, elevation 2,400 feet above sea level, clear sky, no clouds, relative humidity 45+/−20%, and time of day noon to 2:30 PM. Sunset was about 5:20 PM.

| Category | Nominal (FC) | Tolerance | Comparative | Comments |
|---|---|---|---|---|
| DS | 10,500 | +/−500 | 1 | Not a shade category. |
| 0 | >900 | n/a | 6.8 | Not a shade category. |
| 1 | 550 | +350/−175 | 21 | Sky view is unobstructed. |
| 2 | 250 | +150/−75 | 42 | Sky view may be obstructed. |

| Category | Nominal (FC) | Tolerance | Comparative | Comments |
|---|---|---|---|---|
| 3 | 150 | +50/−150 | 70 | No sky view. |
| 4 | 10 | n/a | 1050 | LED is on 15 minutes before sunset. |

Notes:
The "Category" column lists each category number.
DS and 0 are non-shade categories. They are included for reference.
The "Nominal" column lists nominal light measurements in each category.
The "Tolerance" column lists tolerances for each category. Example, Category 1 shade has shaded areas where the light was measured to be between 550 − 175 = 375 FC and 550 + 350 = 900 FC, inclusive.
Category 0 is not shade and has no tolerance. It exists in any location that has greater than 900 FC. It can have sunlight which may be direct, reflected, focused, oblique, bright, or for some reason too intense to be in a shade category. Category 0 can become shade temporarily when weather conditions decrease its luminosity down to a shade category.
Category 4 has no tolerance. A solar pathway light (that normally turns on at sunset when in a direct sunlight location) is in Category 4 shade if it illuminates 15 minutes or more before sunset.
The "Comparative" column lists the luminosity of each column relative to direct sunlight, DS. It shows that the nominal light intensity of Category 1 shade may be 21 times less than direct sunlight.
The "Comments" column has notes about each category.

Light measurements were made with a model EA33 light meter manufactured by FLIR Commercial Systems Inc. Units are foot-candles (FC).

Mean values are from Arizona measurements.

Tolerances values are a summary of measurements made under various conditions in Arizona, Indiana, and Washington state.

There are overlaps between Categories 1 and 2 and between Categories 2 and 3. A shaded area with luminosity value in an overlap between categories may be in both categories simultaneously or it may be assigned to either category.

There is no overlap between categories 3 and 4. Category 4 shade can be defined not only by luminosity but also by the solar light operating in it. Two similar lights with different low-light current thresholds, Ithic, can be at adjacent locations. If one turns on 15 minutes before sunset, while the other does not, the earlier one may be in Category 4 shade while the later one may be in Category 3 shade.

Outputs of various solar panels were measured when searching for solar panels for constructing prototypes. Direct sunlight measurements for the tested solar panels are as follows:

| Index | Isc (mA) | Voc (V) | DS (FC) | Iscn | mA/FC |
|---|---|---|---|---|---|
| X103 | 1,170 | 3.83 | 10,600 | 1,160 | 0.110 |
| X102 | 550 | 7.89 | 10,900 | 530 | 0.050 |
| X101 | 520 | 7.28 | 10,900 | 501 | 0.048 |
| S118 | 410 | 5.64 | 10,900 | 395 | 0.037 |

The X103 solar panel was chosen for prototypes because it has the greatest Iscn current and the Voc voltage is greater than the battery Vn voltage. The following data are output measurements of the X103 solar panel in Category 1 shade and dimmer. The test conditions were as follows; Category 1 shade, ambient temperature 65 degrees Fahrenheit, elevation 2,400 feet above sea level, clear sky, no clouds, relative humidity 45+/−20%, and times of day were noon, 4 PM, and 15 minutes before sunset to 15 minutes after sunset as shown below.

| Ip1 (mA) | Vp1 (V) | Shade (FC) | DS (FC) | mA/FC | Notes |
|---|---|---|---|---|---|
| 54.2 | 3.32 | 550 | 10,500 | 0.097 | 12PM. Location A in Cat1. |
| 31.0 | 3.22 | 376 | 10,000 | 0.082 | 4PM. Location A in Cat1. |
| 20.5 | 3.10 | 241 | 4,000 | 0.085 | Minutes before sunset. |
| 18.9 | 3.09 | 216 | 1,000 | 0.088 | Minutes after Sunset. |
| 16.2 | 3.05 | 191 | — | 0.085 | Minutes after Sunset. |
| 15.8 | 3.05 | 180 | — | 0.088 | Minutes after Sunset. |
| 15.0 | 3.05 | 170 | — | 0.088 | Minutes after Sunset. |
| 14.3 | 3.04 | 160 | — | 0.089 | Minutes after Sunset. |
| 13.5 | 3.02 | 150 | — | 0.090 | Minutes after Sunset. |
| 12.6 | 3.00 | 140 | — | 0.090 | Minutes after Sunset. |
| 11.7 | 2.98 | 130 | — | 0.090 | Minutes after Sunset. |
| 10.8 | 2.97 | 120 | — | 0.090 | Minutes after Sunset. |
| 9.93 | 2.94 | 110 | — | 0.090 | Minutes after Sunset. |
| 9.02 | 2.91 | 100 | — | 0.090 | Minutes after Sunset. |

This data was collected utilizing the Cat1 Test Procedure during daylight and sunset. The Ip1 currents and Vp1 voltages were measured and listed in columns 1 and 2 respectively. The ambient light near the solar panel was measured and listed in the third column. Direct sunlight was not on the solar panel. The current measurements are not normalized. The rows where shade is below 350 FC are dimmer than Category 1. The mA/FC column shows that the output current, Isc, per unit of luminosity varied about 15% with the given changes in luminosity.

The total charge stored in the rechargeable storage device may be represented by C and is specified in milliampere hours, mAh. It can be converted to an approximation of the total energy stored utilizing this equation, $En=C \times Vn/1000$. The result is in watt-hours. A charge added to the rechargeable storage device may be represented by Cchg and is specified in mAh. For a rechargeable battery, it may be the average charging current Ichg in mA, multiplied by the recharging time in hours, divided by 1.2. It can be converted to an estimation of the energy added to storage by this equation, $Echg=Cchg \times Vn/1000$. The result is in watt-hours.

The nominal charge storage capacity of the rechargeable storage device Cn is specified in milliampere hours, mAh. This is the planned capacity or capability. It is the planned, total average discharge current capability Idis in mA, multiplied by the total discharging time in hours. It may be converted to an approximation of the nominal energy storage capacity or capability utilizing this equation, $En=Cn \times Vn/1000$. The result is in watt-hours.

The rechargeable storage device may have a single battery cell or supercapacitor, a plurality of interconnected cells or supercapacitors, or a battery pack consisting of a plurality of interconnected supercapacitors, batteries or cells. In another embodiment in accordance with the present invention, a plurality of solar lights each having a storage device, solar IC (or similar circuitry), and LED. It includes a solar panel with an impedance safety device that provides and limits current for recharging the storage device. For analysis with DCR, DCR1, DS Spec or Cat1 Spec, the designer may consider the combined capacities of the storage device and the sum-total of discharge currents. An alternative of this embodiment may include each light having its own safety device instead of, or in addition to, the solar panel's impedance safety device. In another embodiment, a plurality of solar lights each have a solar IC (or similar circuitry) and an LED. It includes a solar panel, a safety device, and a storage device that provides discharge current to the LEDs. For an analysis, the designer may consider the capacity of the storage device and the sum-total of discharge currents to all the LEDs. In many of the embodiments the battery may be replaced by another rechargeable storage device such as, but not limited to, an extremely high-capacity capacitor (supercapacitor). The DS Spec and the Cat1 Spec can be utilized to evaluate and plan solar panels and supercapacitors by converting the capacity to milliamp-hours (mAh) using the equation Cn=Cap.times.V/3.6, where Cn is the calculated storage capacity of the supercapacitor in mAh, Cap is the capacitance in Farads, and V is the supercapacitor's change in voltage during operation or it maximum charge voltage. If the supercapacitor is not planned to discharge to zero volts before recharging, or is not planned to recharge to its maximum voltage, then the resulting Cn may be adjusted accordingly. An easier analysis evaluates the solar panel with the DCR number and/or the DCR1 number because neither number depends on energy storage capacity. The DCR and DCR1 numbers can evaluate solar lights with any kind of rechargeable storage device because storage capacity is not included in the calculations. The designer should consider that, unlike battery manufacturers, the manufacturers of supercapacitors may not publish a nominal voltage. The designer may assign a nominal voltage as the maximum working voltage of the supercapacitor. Or the designer may assign the planned operating voltage as the nominal voltage. Furthermore, the current/voltage relationship of supercapacitors in general is not the same as batteries. The designer may consider these factors and plan the supercapacitor, the solar panel, the safety device, and the other components accordingly. For a non-limiting example, the Current Limiting Resistor 2207 of FIG. 22 may be increased in resistance value when the Battery 603 is replaced by a supercapacitor, to ensure that the supercapacitor is not substantially overcharged by the solar panel being in direct sunlight. Supercapacitors and batteries have different benefits. Batteries may cost less. Supercapacitor may have longer service life and slower aging.

In another embodiment, the Discharging Switch 2202 may be deleted or permanently closed. This may illuminate the LED during the Charging Mode (during the day). In another embodiment, the Recharging Switch 2201 is deleted or permanently closed which may cause the storage device to be discharged through the solar panel during the Illumination Mode (at night).

The output charge of the solar panel Cpo is specified in milliampere hours, mAh. It is the solar panel average output current Ipo in mA, multiplied by time in hours. It can be converted to energy output of the solar panel by this equation, Epo=Cpo×Volts/1000. The result is in watt-hours.

In some embodiments, the safety device has an Ithc limit of 25%×Cn. The charging current Ichg is limited to prevent the solar panel from substantially overcharging the battery in direct sunlight. The 25% limit may be required for the one-resistor safety device of FIG. 22 and the current-limiter safety device of FIG. 9. The 25% limit is not always required because some safety device embodiments may have variable current limits. These are, without limitation, the current timer of FIG. 10, the solar controller, and the incandescent light bulb. But for an embodiment with a fixed current limit, the 25% limit is required. There is also a preferred limit which is lower, being Ithc=15%×Cn. The 15% limit may provide an extra margin of safety against variations in manufactured components, such as, but not limited to, the actual storage capacity being less than planned and the safety device Ithc limit being greater than planned.

The recharge current may exceed 25% of storage capacity Cn temporarily, and be referred to as having current peaks, if the storage device and other components are not damaged. The current timer and the incandescent light bulb are non-limiting examples of safety devices that may allow current peaks (via variable current limits) without substantially overcharging the storage device or causing damage. The variable current limit may be beneficial because patches of direct sunlight may cause the current peaks allowing them to increase the average recharge current and put more charge into storage.

In another embodiment, the power handling capability of the solar panel, safety device, and storage device may be increased, and the LED replaced by an AC inverter. The discharging switch may be deleted or permanently closed. The solar panel may provide power for the AC inverter by day and the storage device may provide it power at night. The AC inverter may produce mains power for one or more electrical appliances such as, but not limited to, computers, networking equipment, refrigerators, and air conditioners, etc. The designer may increase the solar panel output to accommodate the daytime load of the AC inverter. The Cat1 Spec and/or the DCR1 number may be utilized for planning by subtracting the AC inverter's daytime current drain from the solar panel current output in shade. This embodiment may enable the electrical appliance to operate continuously, all day and all night, in the shade on only solar power. In another embodiment, the power supply of the electrical appliance is modified or selected to operate on DC voltage. The AC inverter may be deleted and the power supply may receive DC voltage from the storage device and solar panel.

When the Twilight Controller 2600 includes hysteresis, it may make the transition from Charging Mode to Illumination Mode happen at a lower ambient light level than the transition from Illumination Mode to Charging Mode. This means the LED turns on in a dimmer ambient light at dusk than it turns off at dawn. Such hysteresis can be beneficial because the light is less sensitive to having its operating mode disrupted by another nearby light (which can turn off the LED), or by flicking flames of a nearby fire pit (which can flash the LED in synchronous with the flickering flames) . The hysteresis can be deleted or reversed. When deleted, the transitions may happen at the same light ambient levels. Deletion may be beneficial for reducing cost by eliminating the Twilight Controller 2600. When hysteresis is reversed, the LED turns on in a brighter ambient light at dusk than it turns off at dawn. Reversing may be beneficial for terminating the LED illumination earlier in the morning. It may also be utilized to signal whether another nearby light disrupted the illumination mode because the LED may be tripped-out (prematurely and permanently extinguished before sunrise until being re-illuminated by the next sunset).

In another embodiment, which is similar to FIG. 24, the Discharge Regulator 2405 may increase the LED Current 810 when the Battery 603 has a greater recharge. For non-limiting examples, this may be achieved by decreasing the DC resistance of the Inductor 2204, decreasing the on-resistance of the Discharging Switch 2202, decreasing the oscillation frequency of the Gated Oscillator 2205, increasing the duty cycle of the Gated Oscillator 2205, modifying the Gated Oscillator 2205 and/or the Discharging Switch 2202 to automatically adjust the LED Current 810 to a higher level when the battery voltage is greater.

Many of the embodiments may be modified to adjust or vary the LED Current 810. The LED current may be a discharging parameter for controlling the charge in the storage device. Decreasing the LED current may preserve the charge. Increasing the LED current may release the charge faster. Decreasing the LED current may beneficially preserve the charge longer and increase the LED illumination time at night. Adjustments or variations of the LED current may be made manually or automatically. For non-limiting examples, the LED current may be adjusted or varied at the gated oscillator by changing the oscillation frequency, the duty cycle, and/or the drive signal to the discharging switch. When the discharging switch has a MOSFET transistor (like FIG. 22), the drive signal may be a gate voltage of the transistor. When the discharging switch has a bipolar transistor (like FIG. 23), the drive signal may be a base current of the transistor. The drive signals may be modified by changing or deleting any existing components, or by adding more components. Additional devices such as, but not limited to, one or more potentiometers, resistors, capacitors, inductors, diodes, transistors, and integrated circuits may process the drive signals. The additional devices may be connected to the discharging switch and/or the LED. The additional devices may include a slower timer for controlling the gated oscillator or the discharging switch. The slower timer may increase or decrease the LED current at a fixed or variable rate. The slower timer may have a fixed, variable, or random period in milliseconds, seconds, minutes, hours, or days, or longer. The slower timer may run continuously or in response to external stimulus. The slower timer period may be responsive to ambient light. A random number generator may be added for controlling the gated oscillator or the discharging switch. The random number generator may increase or decrease the LED current randomly. Any potentiometers may enable manual adjustments of parameters affecting the LED current. A motion sensor may be added to control the discharging switch or the gated oscillator. The motion sensor may vary, but not extinguish, the LED current in response to the absence of motion near the light. The motion sensor may increase the LED current in response to motion being sensed near the light. An input device such as, but not limited to, an audio microphone, an input signal connector, a magnetic sensor, a temperature sensor, a moisture sensor, an air flow sensor, a light sensor, and a Bluetooth device may be added to control the discharging switch or the gated oscillator. The input device may vary, enable, or disable the LED current in response to sound, light, or other stimulus near the light. The input device may increase the LED current in response to sound, light, or other stimulus near the light. The input device may modulate the LED current in response to music or speech. The input device may control the slower timer or the random number generator. The teaching of the present invention may be applied to various solar powered lights such as, but not limited to, walkway light, motion activated light, spotlight, floodlight, landscape light, waterproof light, deck light, dock light, lamp-post light, security light, post-cap light, pillar light, fence light, post-mount light, flag light, string of lights, rope light, planter light, wall light, path marker light, patio light, lantern, Chinese lantern light, color-changing light, Christmas lights, Halloween light, waterproof light, barn light, camping light, marker light, streetlight, arbor light, outdoor floor lamp light, free standing light, etc.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC § 112 (1), all claims must be supported by sufficient disclosure in the present patent specification, and any material known to those skilled in the art need not be explicitly disclosed. However, 35 USC § 112 (6) requires that structures corresponding to functional limitations interpreted under 35 USC § 112 (6) must be explicitly disclosed in the patent specification. Moreover, the USPTO's Examination policy of initially treating and searching prior art under the broadest interpretation of a "mean for" claim limitation implies that the broadest initial search on 112(6) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC § 112 (6) when such corresponding structures are not explicitly disclosed in the foregoing patent specification. Therefore, for any invention element(s)/structure(s) corresponding to functional claim limitation(s), in the below claims interpreted under 35 USC § 112 (6), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC § 112 (6) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any $3^{rd}$ parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC § 112 (6), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC § 112 (6). Applicant(s) note that all the identified documents above which are incorporated by reference to satisfy 35 USC § 112 (6) necessarily have a filing and/or publication date prior to that of the instant application, and thus are valid prior documents to incorporated by reference in the instant application.

Having fully described at least one embodiment of the present invention, other equivalent or alternative methods of implementing solar pathway lights according to the present invention will be apparent to those skilled in the art. Various aspects of the invention have been described above by way of illustration, and the specific embodiments disclosed are not intended to limit the invention to the particular forms disclosed. The particular implementation of the solar pathway lights may vary depending upon the particular context or application. By way of example, and not limitation, the solar pathway lights described in the foregoing were principally directed to solar pathway lights for shady areas implementations; however, similar techniques may instead be applied to any solar panel charging system where sunlight is limited, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. That is, the Abstract is provided merely to introduce certain concepts and not to identify any key or essential features of the claimed subject matter. It is submitted with the understanding that it will not be used to limit or interpret the scope or meaning of the claims.

The following claims are hereby incorporated into the detailed description, with each claim standing on its own as a separate embodiment.

What is claimed is:

1. An apparatus comprising:
    a light emitting diode being configured for at least illuminating a pathway;
    a rechargeable storage device being configured for at least providing a discharge current for a period of nighttime;
    a solar panel being configured for supplying a charging current to said rechargeable storage device, the ratio of a short-circuit output current of said solar panel, in ambient light of 550+/−50 foot-candles, to the discharge current being greater than 0.5;
    a safety device being configured for protecting said rechargeable storage device from substantial overcharging during exposure of direct sunlight;
    a recharging switch being at least configured for supplying the charging current to said rechargeable storage device during a charging mode;
    a discharging switch being at least configured for supplying the discharge current to illuminate said light emitting diode during an illumination mode; and
    a low light sensor being at least configured for effecting a switching between the charging mode and the illumination mode.

2. The apparatus as recited in claim 1, further comprising a twilight controller being at least configured for adjusting the switching between the charging mode and the illumination mode.

3. The apparatus as recited in claim 1, further comprising a voltage multiplier being at least configured for increasing a voltage from said solar panel to a level above a voltage of said rechargeable storage device.

4. The apparatus as recited in claim 1, in which said safety device further comprises at least one current limiting resistor for impeding said charging current.

5. The apparatus as recited in claim 1, in which said safety device further comprises a discharge regulator being at least configured for discharging said rechargeable storage device prior to charging.

6. The apparatus as recited in claim 1, in which said recharging switch further comprises a bipolar device being at least configured for effecting a switching to said charging mode in response to a voltage from said solar panel.

7. The apparatus as recited in claim 1, in which said discharging switch further comprises a voltage converter being at least configured for a) increasing a voltage of said rechargeable storage device to said light emitting diode, and b) providing an LED current to said light emitting diode, said LED current being less than said discharge current.

8. The apparatus as recited in claim 1, in which said low light sensor further comprises a light dependent resistor.

9. The apparatus as recited in claim 1, in which the period of nighttime is at least 5 hours.

10. The apparatus as recited in claim 1, in which the charging current of said solar panel in direct sunlight is within a range of 0.51 to 250 times a nominal storage capacity of said rechargeable storage device.

11. The apparatus as recited in claim 1, in which said rechargeable storage device includes a rechargeable battery, and a voltage of said solar panel in direct sunlight is in a range of $(1.15Vn+Vdrop)/0.9/0.953$ to $(1.15Vn+Vdrop)/0.4$, where $Vn$ is a voltage of said rechargeable battery and $Vdrop$ is a voltage drop of said safety device.

12. The apparatus as recited in claim 1, in which the short-circuit output current of said solar panel in the ambient light of 550+/−50 foot-candles is at least 0.041 times a nominal storage capacity of said rechargeable storage device.

13. The apparatus as recited in claim 1, in which said rechargeable storage device includes a rechargeable battery, and a voltage of said solar panel in the ambient light of 550+/−50 foot-candles is at least $(1.15Vn+Vdrop)/0.953$, where Vn is a nominal voltage of said rechargeable battery and Vdrop is a voltage drop of said safety device.

14. The apparatus as recited in claim 1, in which a ratio of the short-circuit output current of said solar panel in direct sunlight to the discharge current being at least 20.

15. An apparatus comprising:
a light unit being configured for at least illuminating;
a rechargeable storage device being configured for at least providing a discharge current the light unit for a period of at least 5 hours;
a solar panel being configured for supplying a charging current to the rechargeable storage device;
a safety device being configured for protecting the rechargeable storage device from substantial overcharging; and
a specification for providing ample solar energy collection in shade;
wherein the specification conforms to at least one element selected from the group consisting of a DS Spec including at least a 1st equation being 0.50Cn/0.982<=Iscn<=250Cn, a Cat1 Spec including at least a 6th equation being Ip1n>0.04Cn/0.982, a DCR number including at least a 5th equation being DCR=Iscn/Idis>=20, and a DCR1 number including at least an 8th equation being DCR1=Ip1n/Idis>0.5.

16. The apparatus as recited in claim 15,
wherein the light unit comprises a light emitting diode;
wherein the apparatus further comprises at least one switching member selected from the group consisting of
a recharging switch being at least configured for supplying the charging current to the rechargeable storage device; and
a discharging switch being at least configured for supplying the discharge current to the light unit; and
wherein the light unit provides an LED current to the light emitting diode.

17. The apparatus as recited in claim 15,
wherein the specification conforms to the at least one element selected from the group consisting of
a DS Spec at least including a first short-circuit output current of the solar panel in direct sunlight being within a range of 0.51 to 250 times a nominal storage capacity of the rechargeable storage device;
a Cat1 Spec at least including a second short-circuit output current of the solar panel in an ambient light of 550+/−50 foot-candles being at least 0.041 times the nominal storage capacity of the rechargeable storage device;
a DCR number at least including the ratio of the first short-circuit output current of the solar panel in the direct sunlight to the discharge current being at least 20; and
a DCR1 number at least including the ratio of a short-circuit output current of the solar panel, in ambient light of 550+/−50 foot-candles, to the discharge current being greater than 0.5.

18. The apparatus as recited in claim 15, wherein the safety device further comprises at least one member for decreasing the charging current, the at least one member being selected from the group consisting of an impedance device, a current timer, a microcomputer, a current sensing resistor, and a MOSFET transistor operating as a switch.

19. An apparatus comprising:
a light emitting diode being configured for at least illuminating a pathway;
a rechargeable storage device being configured for at least providing a discharge current for a period of nighttime of at least 5 hours;
a solar panel being configured for supplying a charging current to said rechargeable storage device, the ratio of a short-circuit output current of said solar panel, in ambient light of 550+/−50 foot-candles normalized to 550 foot-candles, to the discharge current being at least 1.5;
a safety device being configured for protecting said rechargeable storage device from substantial overcharging during exposure of direct sunlight, said safety device further comprising at least one member selected from the group consisting of a) an impedance device for impeding said charging current in direct sunlight, and b) a discharging regulator for discharging said rechargeable storage device prior to charging;
a recharging switch being at least configured for supplying the charging current to said rechargeable storage device during a charging mode, said recharging switch being at least configured for effecting a switching to said charging mode in response to a luminosity increase of scattered light;
a discharging switch being at least configured for supplying the discharge current to illuminate said light emitting diode during an illumination mode, said discharging switch being at least configured for effecting a switching to said illumination mode in response to a luminosity decrease of the scattered light;
a low light sensor being at least configured for effecting a switching between the charging mode and the illumination mode; and
a twilight controller being at least configured for adjusting the switching between the charging mode and the illumination mode.

20. The apparatus as recited in claim 19, in which: the short-circuit output current of said solar panel in direct sunlight is within a range of 1 to 250 times a nominal storage capacity of said rechargeable storage device; and an open-circuit output voltage of said solar panel in direct sunlight is in a range of (1.15Vn+Vdrop)/0.953 to (1.15Vn+Vdrop)/0.4, where Vn is a nominal voltage of said rechargeable storage device and Vdrop is a voltage drop of said safety device.

* * * * *